United States Patent [19]

Boone et al.

[11] 4,074,351
[45] Feb. 14, 1978

[54] VARIABLE FUNCTION PROGRAMMED CALCULATOR

[75] Inventors: Gary W. Boone, Sunnyvale, Calif.; Michael J. Cochran, Richardson, Tex.

[73] Assignee: Texas Instruments Incorporated, Dallas, Tex.

[21] Appl. No.: 771,498

[22] Filed: Feb. 24, 1977

Related U.S. Application Data

[60] Continuation of Ser. No. 529,251, Dec. 2, 1974, abandoned, which is a division of Ser. No. 420,999, Dec. 3, 1973, which is a continuation of Ser. No. 163,565, July 19, 1971, abandoned.

[51] Int. Cl.² .......................................... G06F 15/04
[52] U.S. Cl. .................................................. 364/200
[58] Field of Search ..................................... 364/200

*Primary Examiner*—Gareth D. Shaw
*Assistant Examiner*—C. T. Bartz

*Attorney, Agent, or Firm*—James T. Comfort; John G. Graham

[57] ABSTRACT

A variable function calculator utilizes a fixed program memory array such as a programmed read only memory in which a number of programs are stored depending upon the desired functions of the calculator. The calculator also includes a program counter, an instruction register, control decoders, jump-condition circuits, a clock generator, a timing generator, digit and FLAG mask decoders, key input logic, a register and FLAG data storage array, a decimal and FLAG arithmetic logic unit, an output decoder, and a digit scanner which scans both the keyboard and display outputs. Aside from providing basic desk top calculator functions, the read only memory may be programmed so that the system provides metering functions, arithmetic teaching functions, control functions, etc. A preferred embodiment of the invention is capable of being fabricated as a monolithic integrated semiconductor system utilizing contemporary metal-insulator-semiconductor techniques.

20 Claims, 76 Drawing Figures

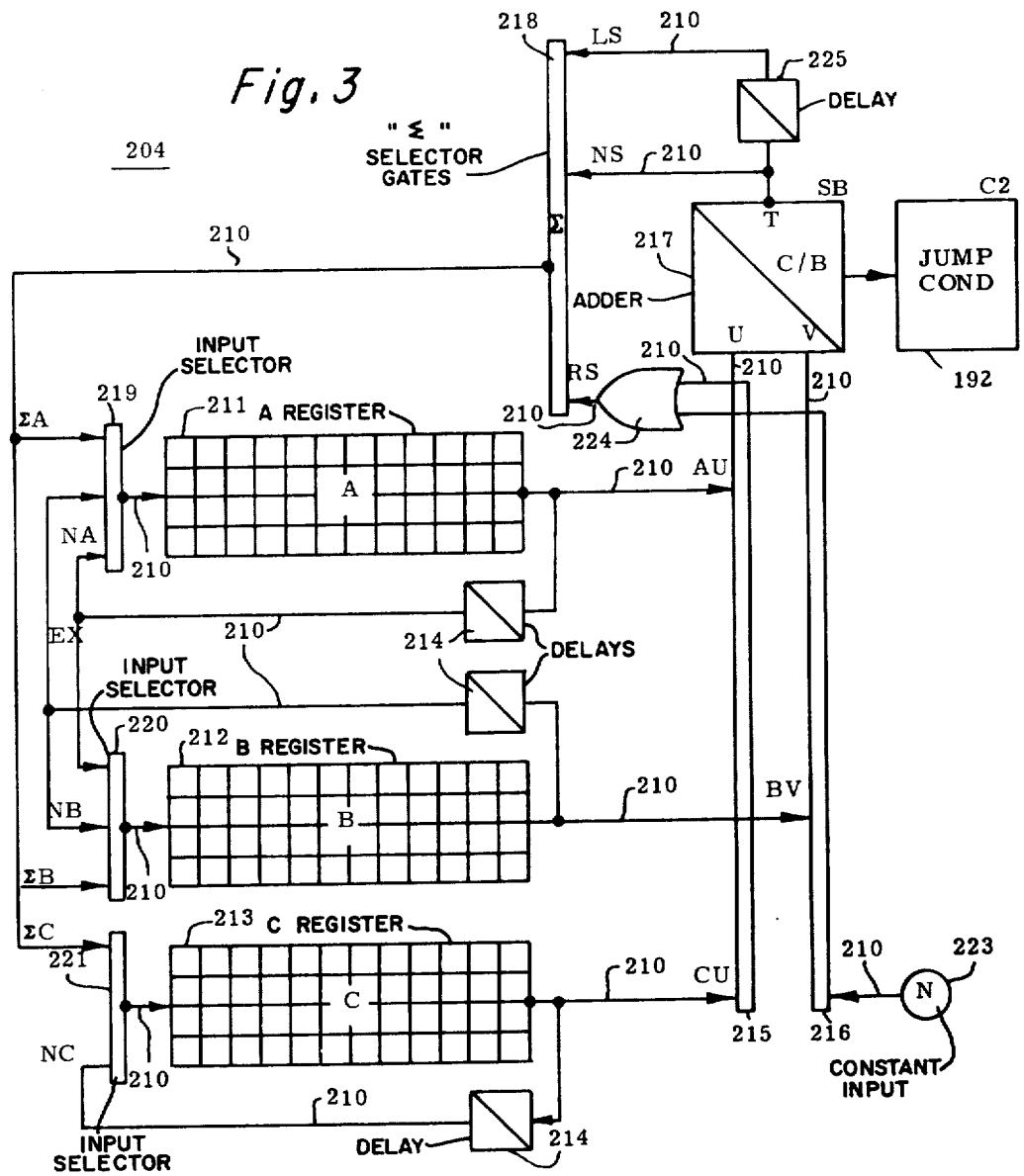
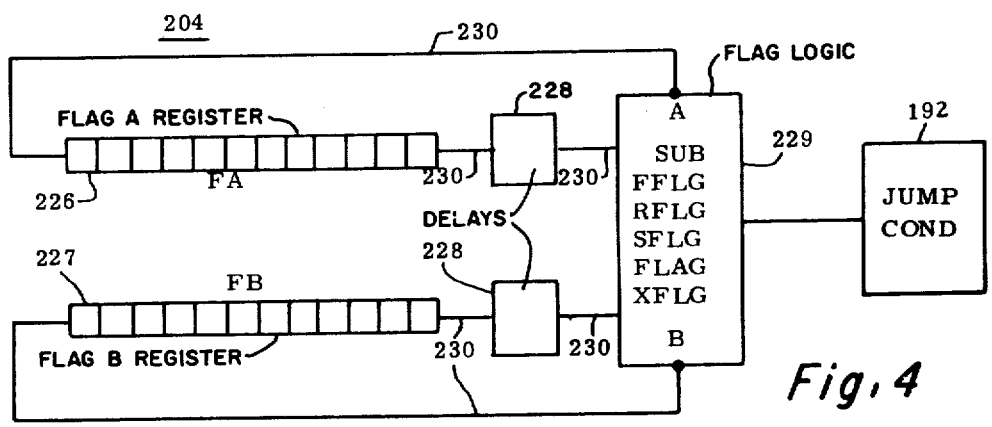

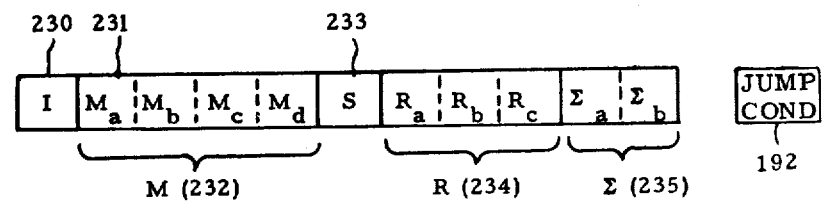
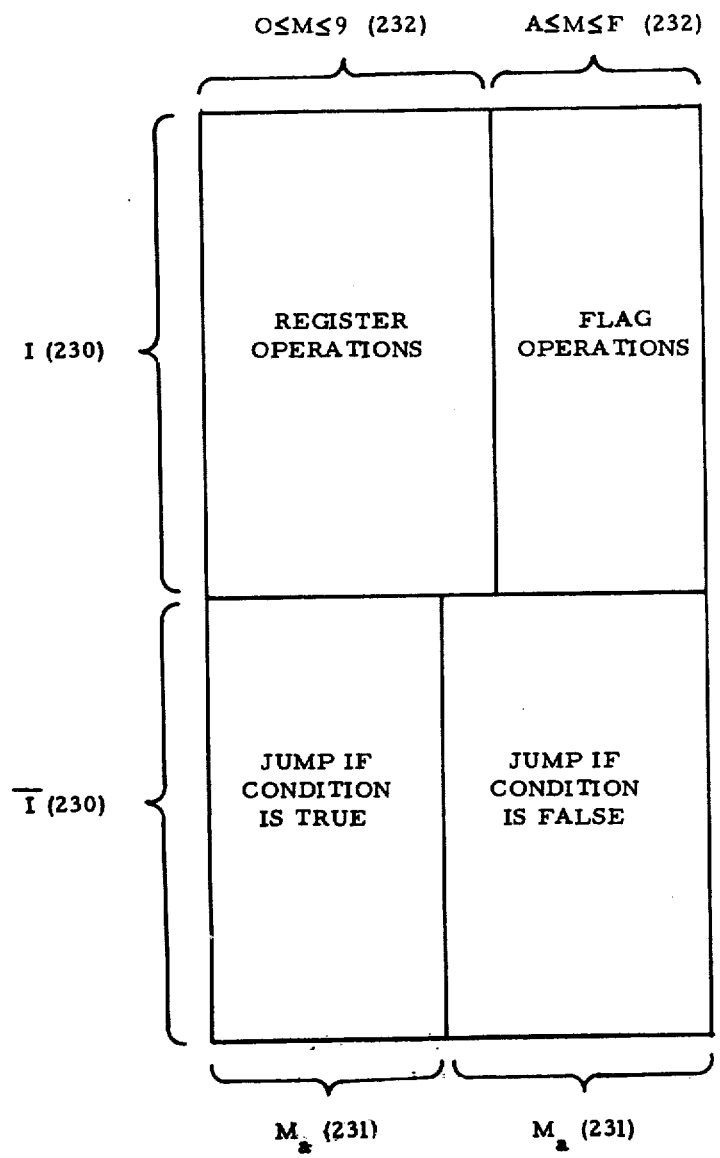
Fig. 5

| Fig.17A | Fig.17B | Fig.17C | Fig.17D |
|---------|---------|---------|---------|
| Fig.17E | Fig.17F | Fig.17G | Fig.17H |
| Fig.17I | Fig.17J | Fig.17K | Fig.17L |
| Fig.17M | Fig.17N | Fig.17O | Fig.17P |
| Fig.17Q | Fig.17R | Fig.17S | Fig.17T |
| Fig.17U | Fig.17V | Fig.17W | Fig.17X |
|         | Fig.17Y | Fig.17Z |         |

Fig.17

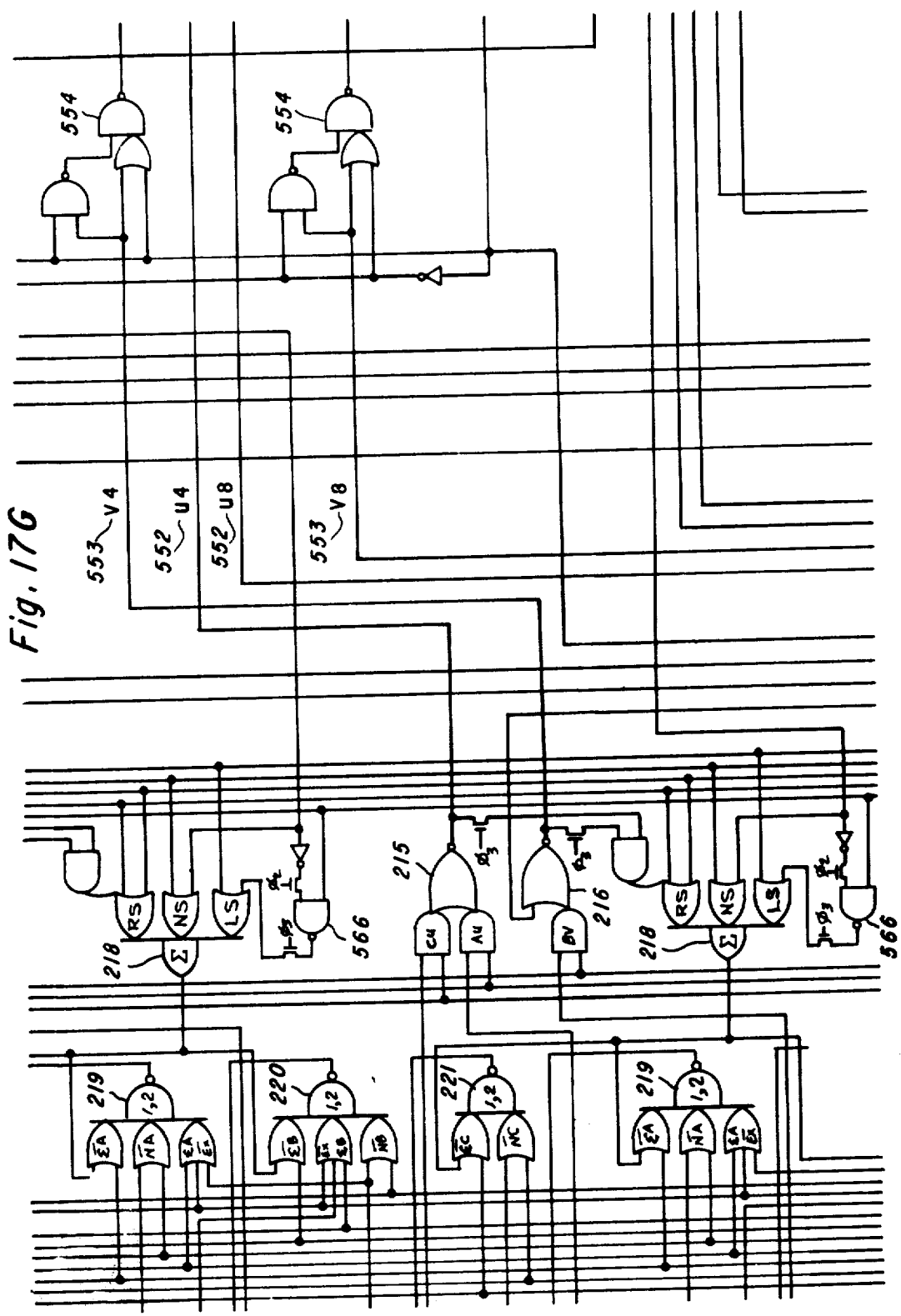

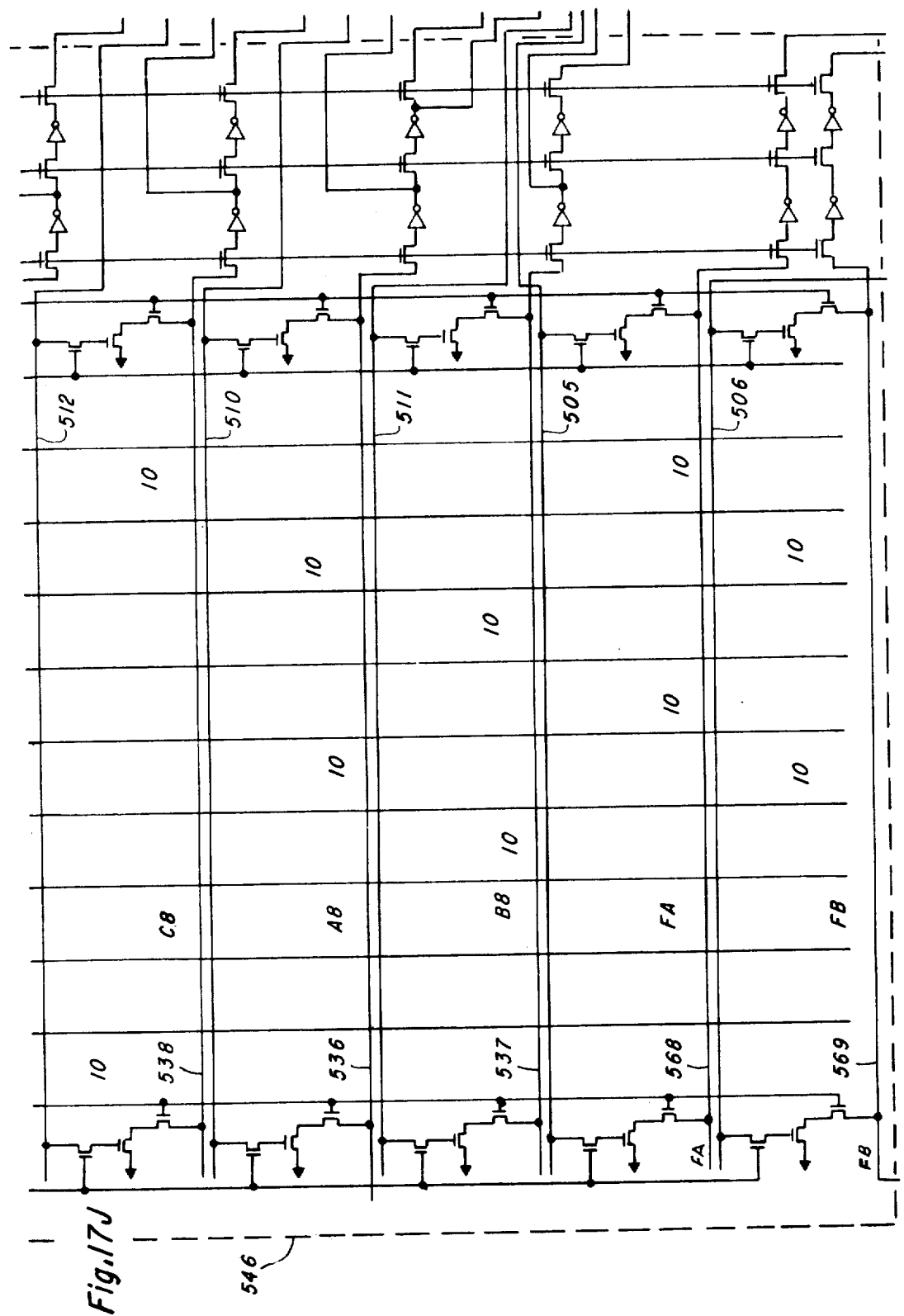

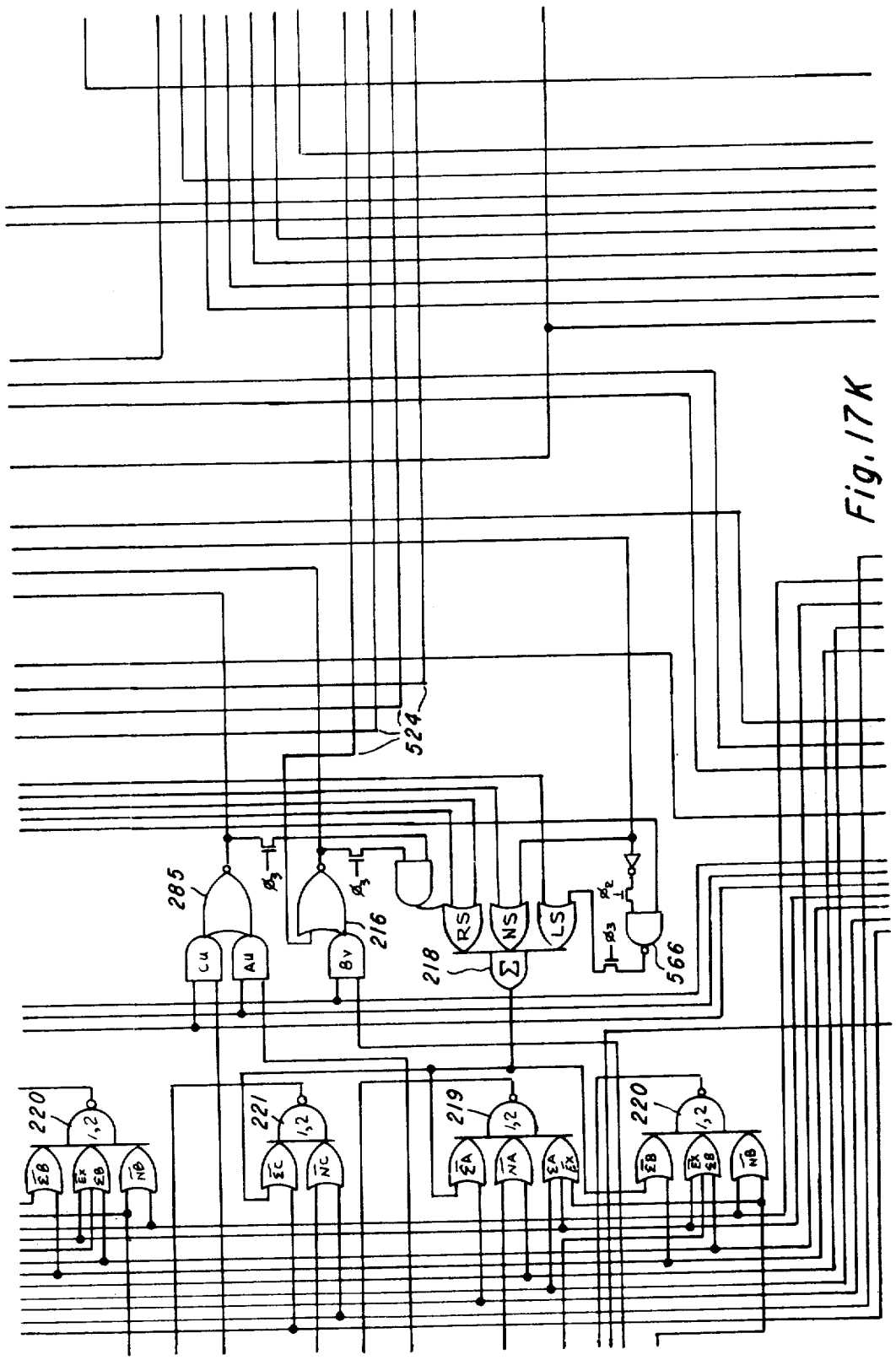

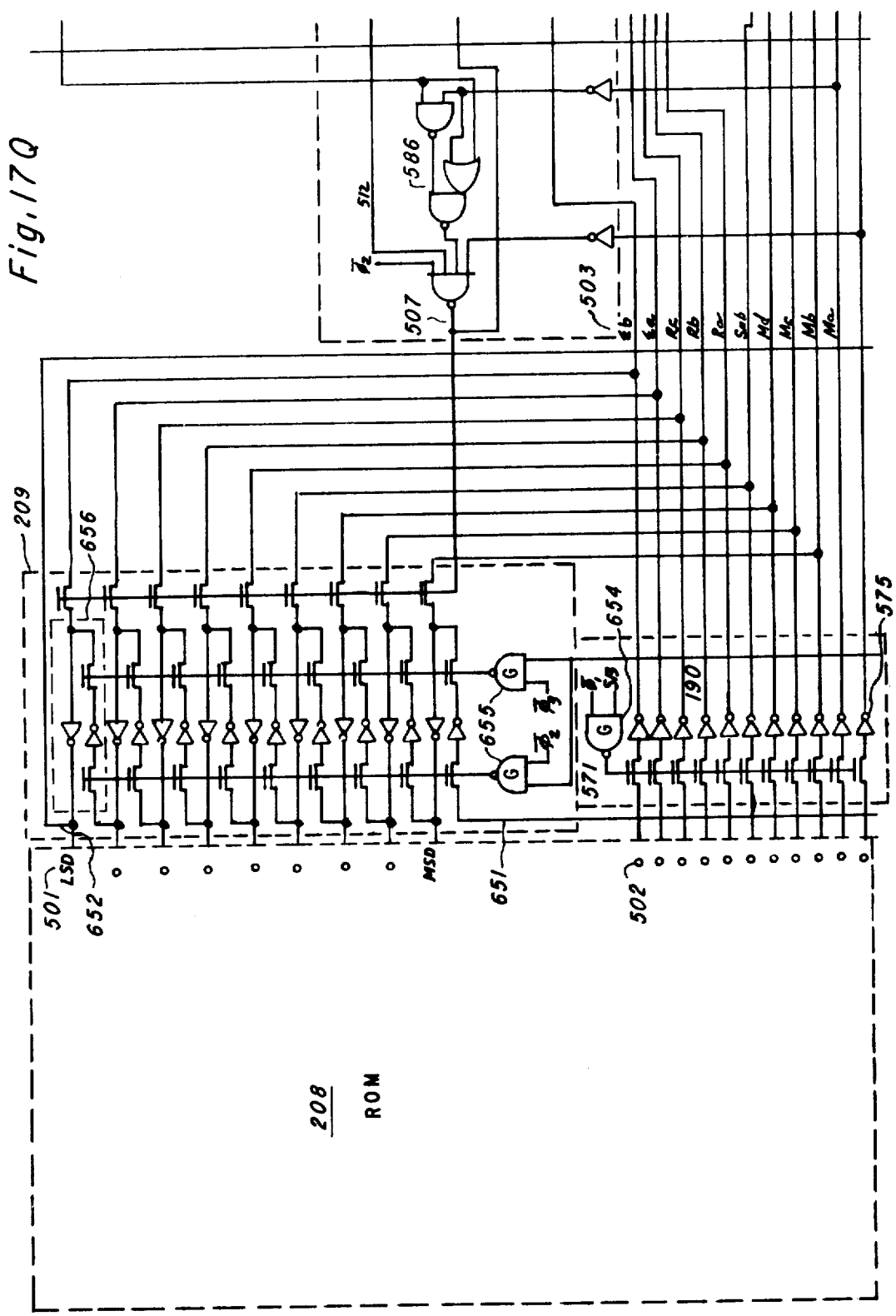

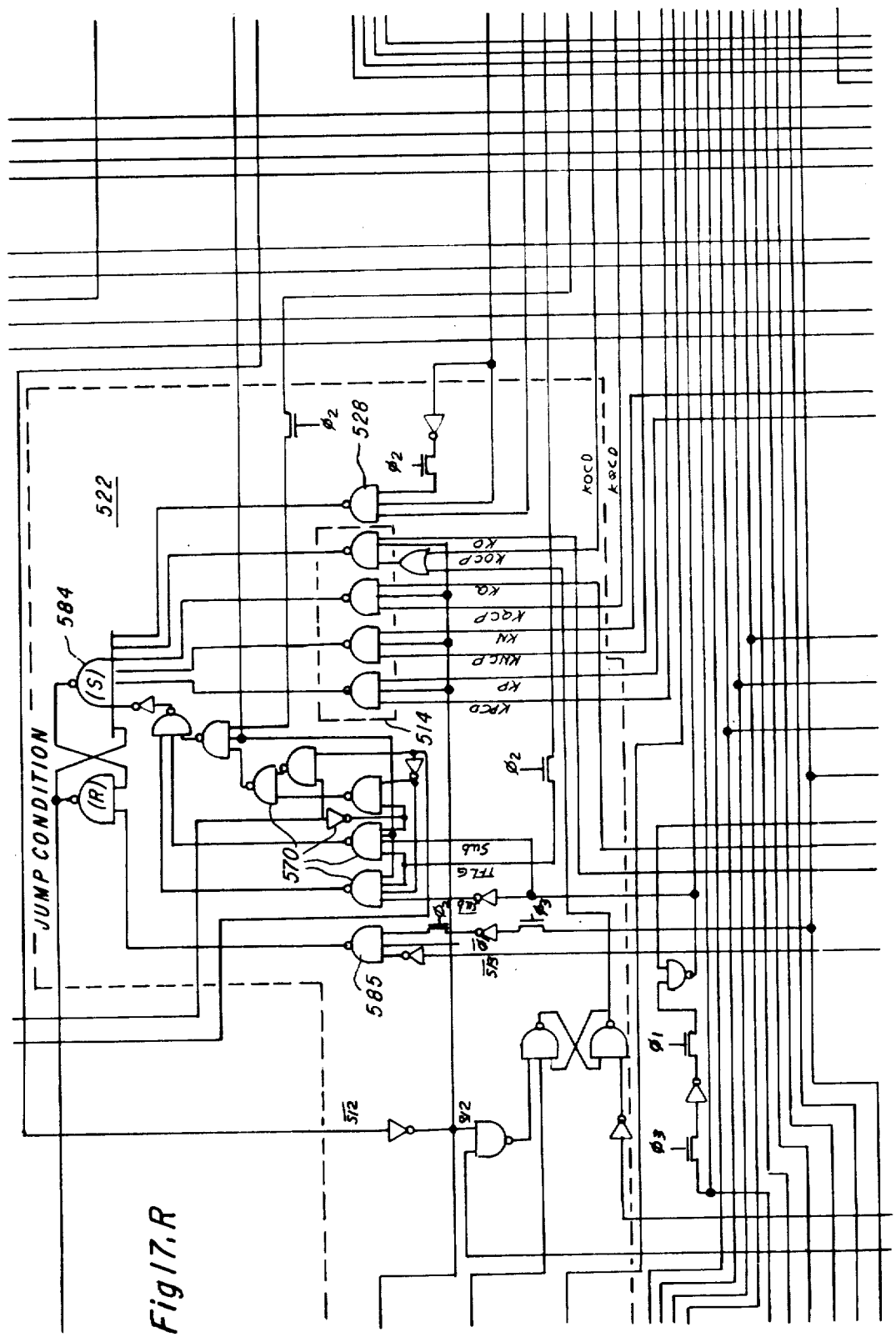
Fig 17,R

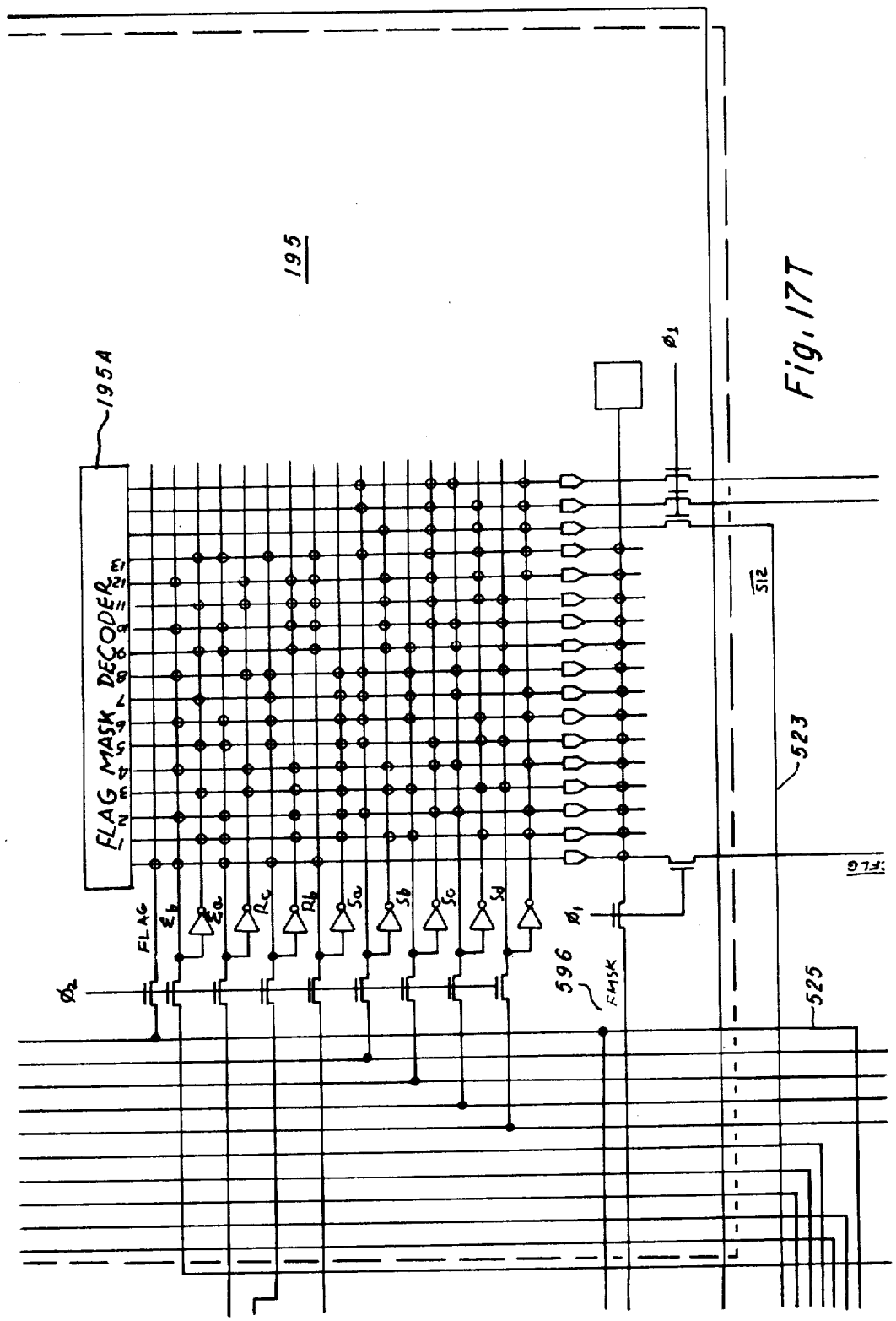

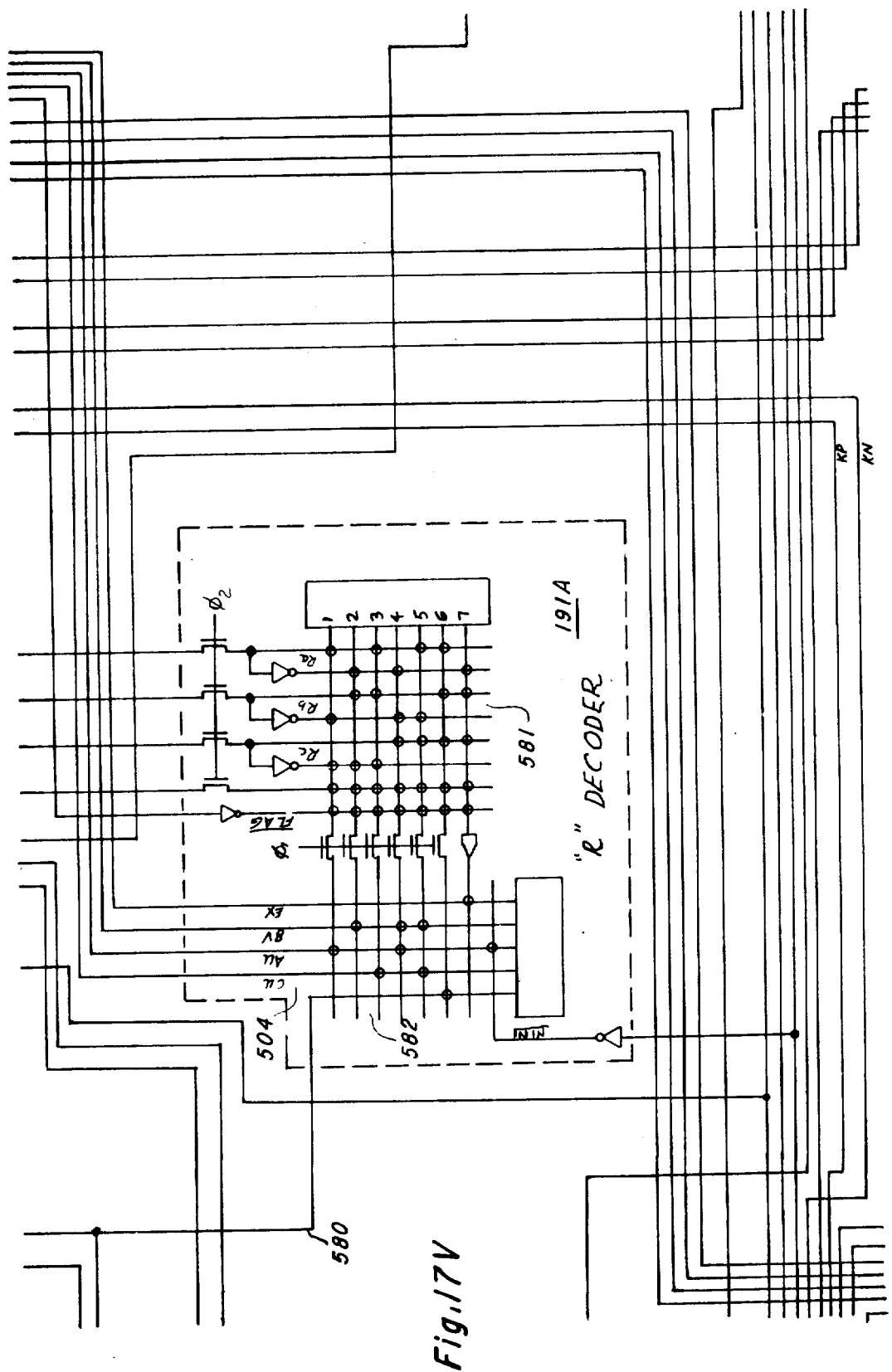

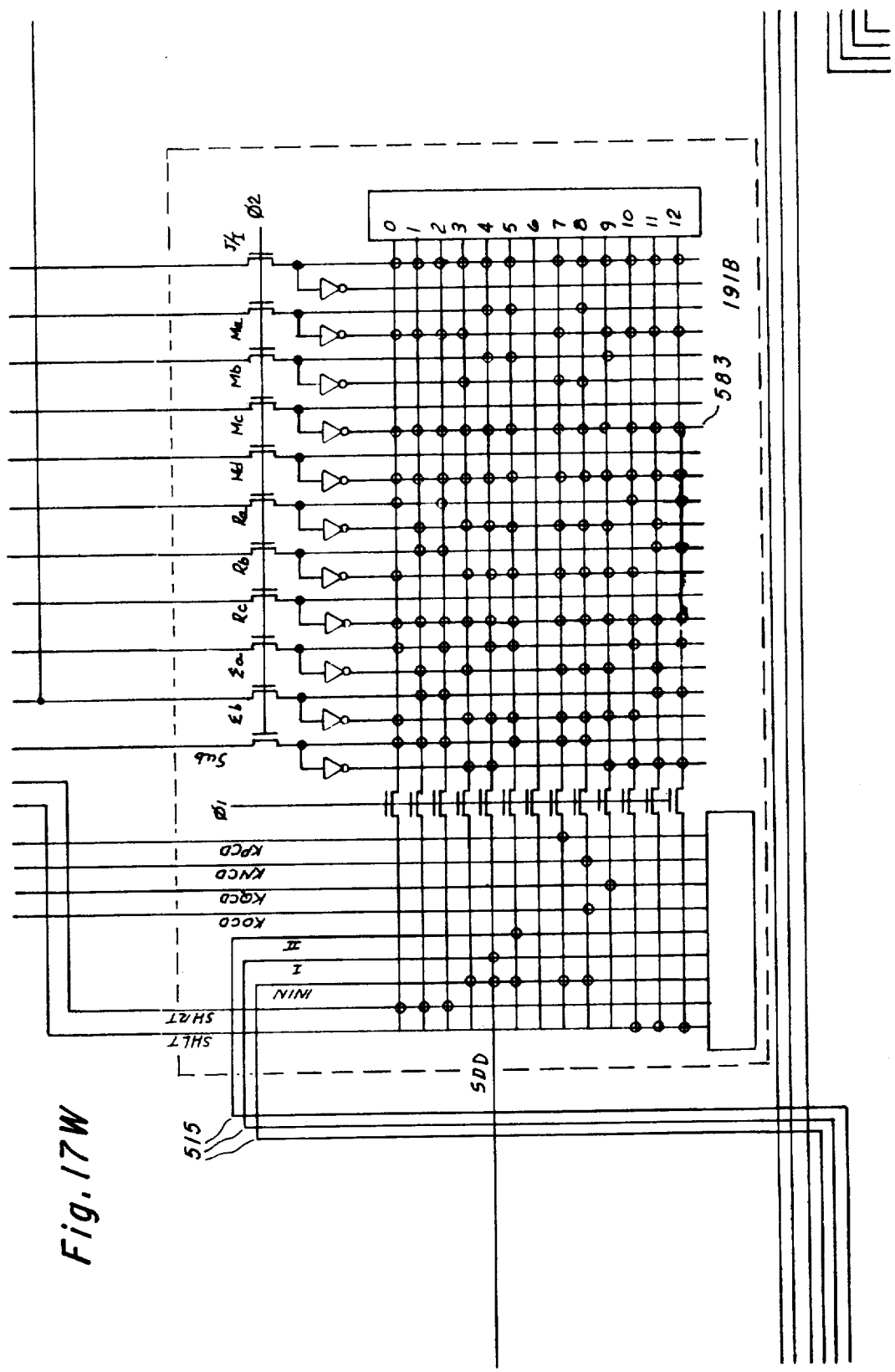

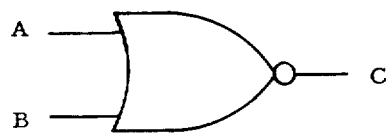 552 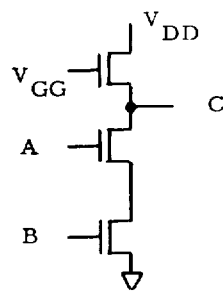
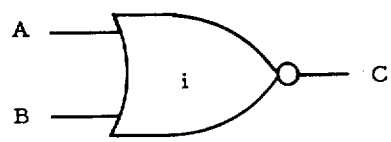 553 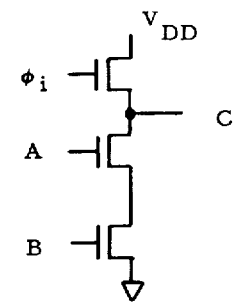
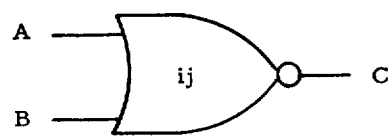 554 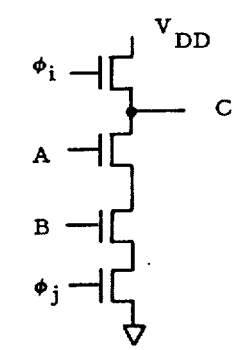
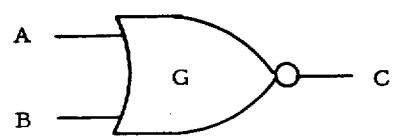 555 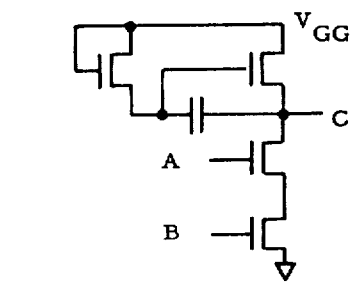
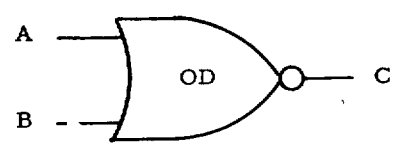 556 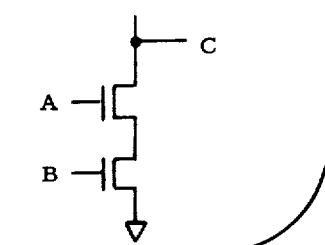
Fig. 18C Fig. 18D
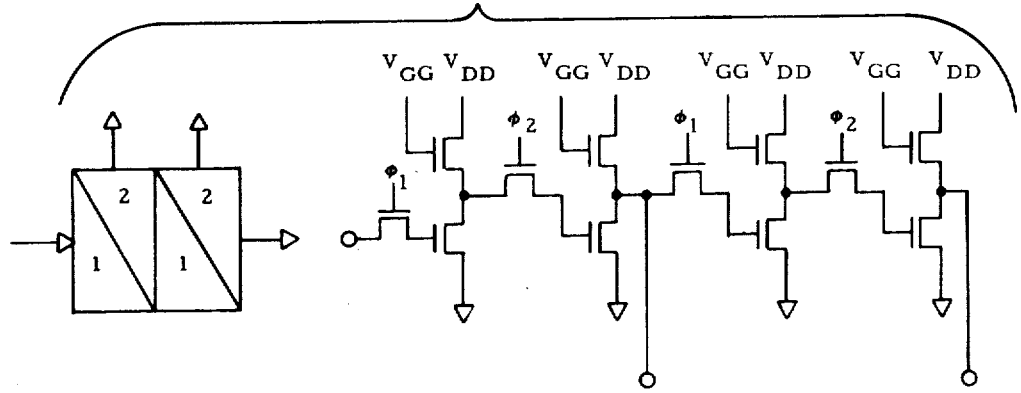
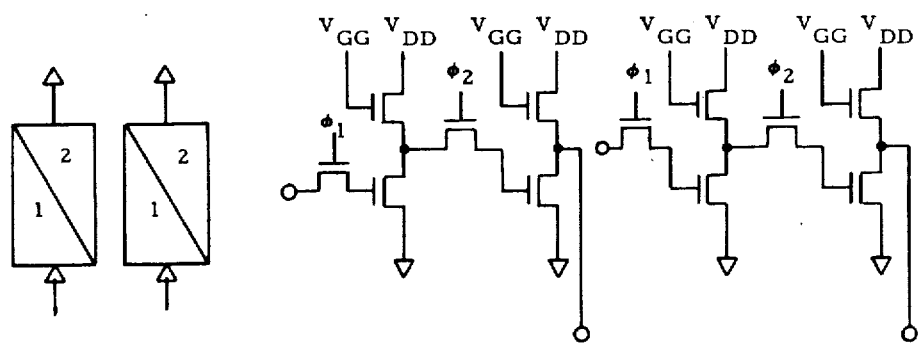
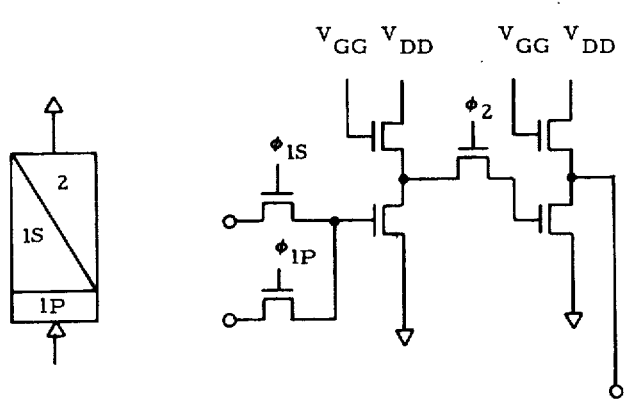

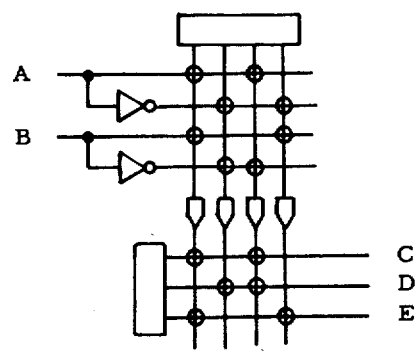
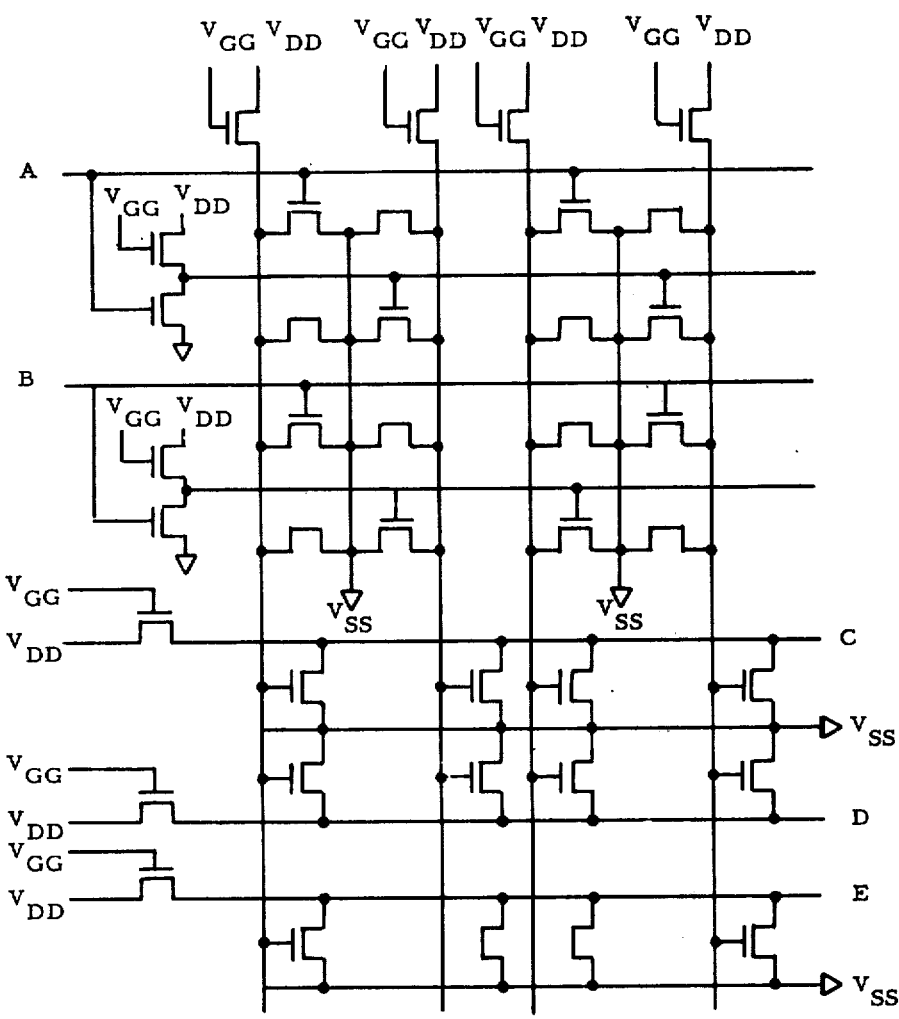
Fig. 21

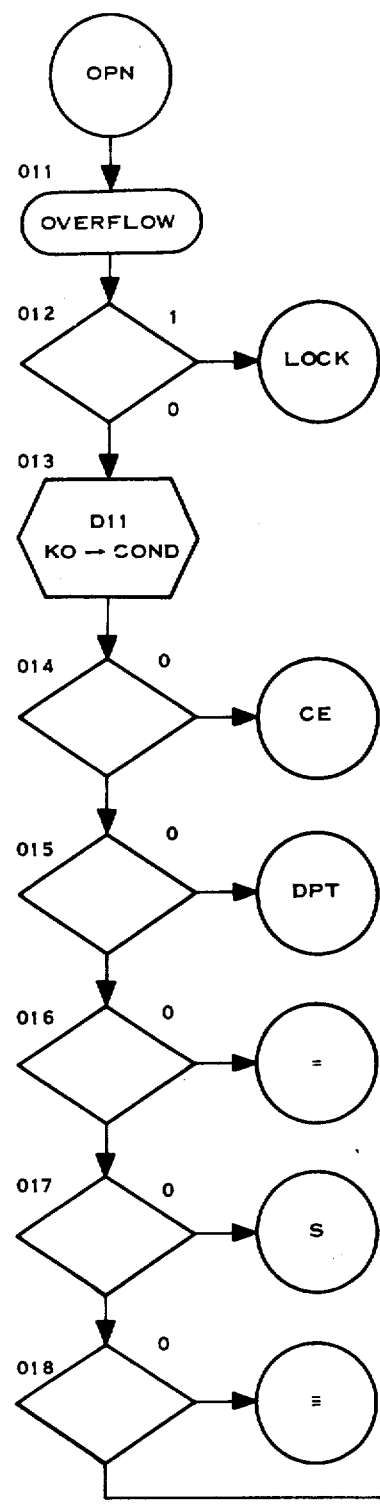
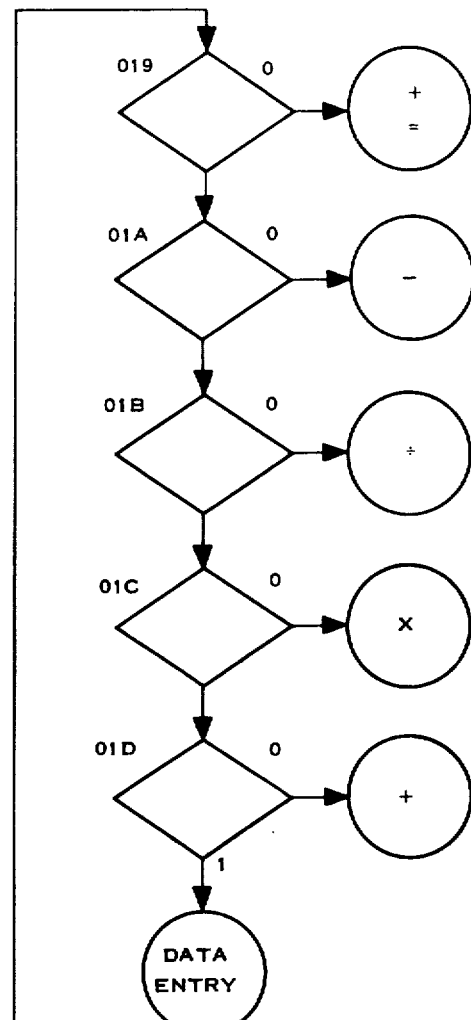
Fig. 22E

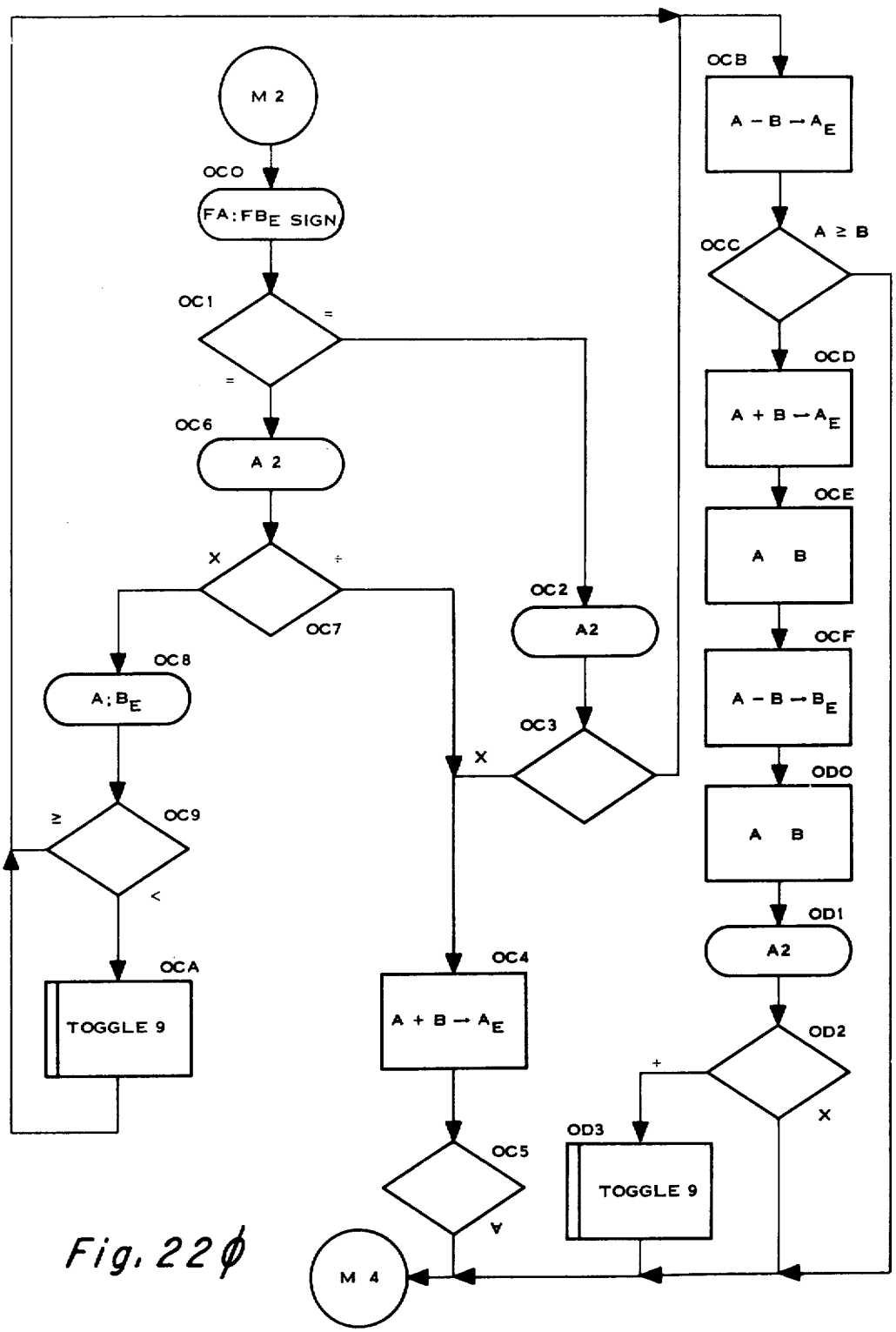
Fig. 22∅

VARIABLE FUNCTION PROGRAMMED CALCULATOR

This application is a continuation of Ser. No. 529,251, filed 12/2/74 (now abandoned) which was a division of Ser. No. 420,999, filed 12/3/73 which is a continuation of Ser. No. 163,565, filed 7/19/71 (now abandoned).

This invention relates to calculators and, more particularly, to a variable function fixed program calculator capable of being fabricated as a monolithic integrated semiconductor system utilizing contemporary semiconductor technology.

It is an object of the present invention to provide a system which functions as a basic desk top calculator. More particularly, it is an object of the invention to provide such calculator function including primitive decimal operations, such as add, subtract, multiply and divide with floating decimal point entry and either floating or fixed decimal point results on multi-digit operands. This object is accomplished in accordance with the present invention by providing, for example, a dynamic charge storage random access memory shifting array for registration of numeric and control data. The calculator includes a control memory such as a programmable logic array (PLA), a program memory such as a read only memory (ROM) and means for performing arithmetic and logic modification of registered data including binary coded decimal (BCD), bit-parallel digit-serial decimal arithmetic, and set-reset-toggle (SRT) FLAG data modification.

Another object of the invention is to provide a calculator system which is capable of being fabricated as a monolithic integrated semiconductor system. More particularly, it is an object of the invention to provide such calculator system which is capable of being fabricated as a monolithic integrated metal-insulator-semiconductor system utilizing contemporary metal-insulator-semiconductor technology. This object is accomplished in accordance with the present invention by providing a random access memory shift register system which requires approximately one-third the area of conventional shift register systems, providing internal generation of multiphase clocks from a single phase input clock which is included in the calculator but which is external to the monolithic structure and by providing a common programmed scanning system in the monolithic structure to provide both keyboard encoding and display decoding with minimum external connections between the monolithic system and the keyboard and display. The total number of connections from the monolithic structure to other calculator subsystems such as the keyboard, display and power supply are therefore minimized so that the monolithic structure is capable of being packaged in a conventional twenty-eight or forty pin package.

It is a further object of the present invention to provide a versatile calculator system in which the calculator function and input and output interfaces can be varied without changing the basic calculator structure, and particularly without changing the basic calculator structure as an integrated semiconductor system. This object is accomplished with the present invention by providing a programmable read only memory which provides a fixed program for the calculator system in accordance with the desired function of the calculator system and by providing programmable logic arrays for decoding and encoding the input, output and operating data by masking such data to any desired format. The programmable read only memory and the programmable logic arrays are easily modified by changing only the gate-insulator mask for the metal-insulator-semiconductor integrated system embodiment during the fabrication process.

Yet another object of the invention is to provide a calculator with improved means for encoding keyboard commands and status information and which also functions as a direct interface means between a display decoder and a display for segmented and/or individual-decimal-numerical displays. This object is accomplished in accordance with the invention by providing a programmed scanning system to service both the keyboard input and display output, thereby minimizing hardware requirements for the key input system. Four keyboard input pins combine with eleven scanner output pins to allow a total of forty-four distinct keys and/or switches. The programmed routine residing in the read-only memory encodes the input from the keyboard array under program control. The scanning system operates at a slow enough rate to eliminate the need for any external keyboard drive circuitry and allows direct drive of large capacitance loads with response consistent to the scan rate. The scan program includes an encoding routine to effectively defeat transient noise and key bounce types of interference from the keyboard. An additional advantage of the keyboard scanning system then is that it requires few diodes, no amplifiers and simple switches which need not be low resistance or low bounce time switches. The display output includes internal segment or digit decoding, digit-blanking and zero suppression logic and utilizes the same scanning system as the keyboard. The display itself may be comprised of light-emitting diodes, liquid crystal, cold cathode gas discharge display elements, fluorescent display elements, multi-digit single-envelope cold-cathode gas-discharge tubes, incandescent display elements, etc. The multiple display capability is provided by the generally defined digit scanning and segment or numeral decoding system and by providing for an inter-digit blanking signal which is variable in terms of leading and trailing edge blanking intervals and in terms of its application to either the segment drivers or the digit drivers or both. The output decoder is comprised of a programmable logic array segment decoder circuit which can be programmed to accommodate any seven, eight, nine, ten segment or ten digit numerical display font plus a right or left decimal point. In this manner the calculator system of the present invention is essentially insensitive to the selection of a display which is utilized in conjunction with it.

It is still a further object of the invention to provide internal means for suppression of insignificant leading zeros in the calculator display. This object is accomplished by the programmed scanning system which provides scanning of the most significant output digits first and minimizes hardware means for detecting and suppressing leading zeros.

Another object of the invention is to allow both constant-operand and chained-intermediate-result type of calculations in a fully algebraic manner. This object is accomplished by providing an operator selectable control or mode switch to distinguish the constant-operand mode from the chained-intermediate-result mode of operation and by providing a fixed program decision routine in the read only memory array to detect the desired mode and effect it.

It is yet a further object of the invention to provide a calculator system which includes means for providing an automatic round-off solution for high accuracy in calculation. This object is accomplished in accordance with the present invention by utilizing a fixed program routine stored in the read only memory which adds the numeral five to the least significant digit which is to be lost. In this manner, a one is added to the second least significant digit which is to be kept when the least significant digit which is to be lost is greater than or equal to five.

Another object of the invention is to provide a calculator system with minimum power dissipation in order to provide a uniquely portable desk top calculator with good battery life. This object is accomplished in accordance with the present invention by provision of special control circuits to turn off dissipating functional elements except when such functional elements are actually being used and by provision of special pre-charge ratioless circuits within an metal-insulator-semiconductor embodiment of the read only memory, programmable logic array and arithmetic logic unit functional subsystems. For example, the instruction output from the read only memory need be detected only once per instruction cycle; a power control is applied to the read only memory decoder effecting a duty cycle of 2/13ths of the nominal static power dissipation to eliminate DC currents so that only transient $CV^2f$ power is disipated.

Still further objects and advantages of the invention will be apparent from the following detailed description and claims and from the accompanying drawings illustrative of the invention wherein:

FIG. 3 is a block diagram functionally describing data block 204 of one embodiment of the calculator system of the invention;

FIG. 4 is a block diagram of the FLAG registers illustrating the operation thereof;

FIG. 5 is a symbolic representation of the basic command word format and instruction map utilized in an embodiment of the calculator system;

Figure 20:
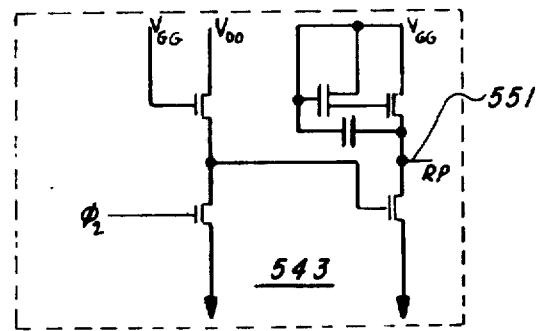
Figure 19:
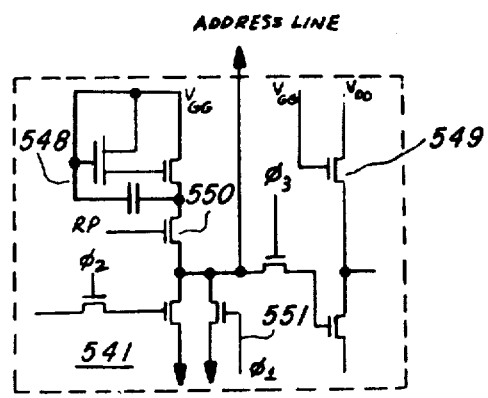
Figure 22A:
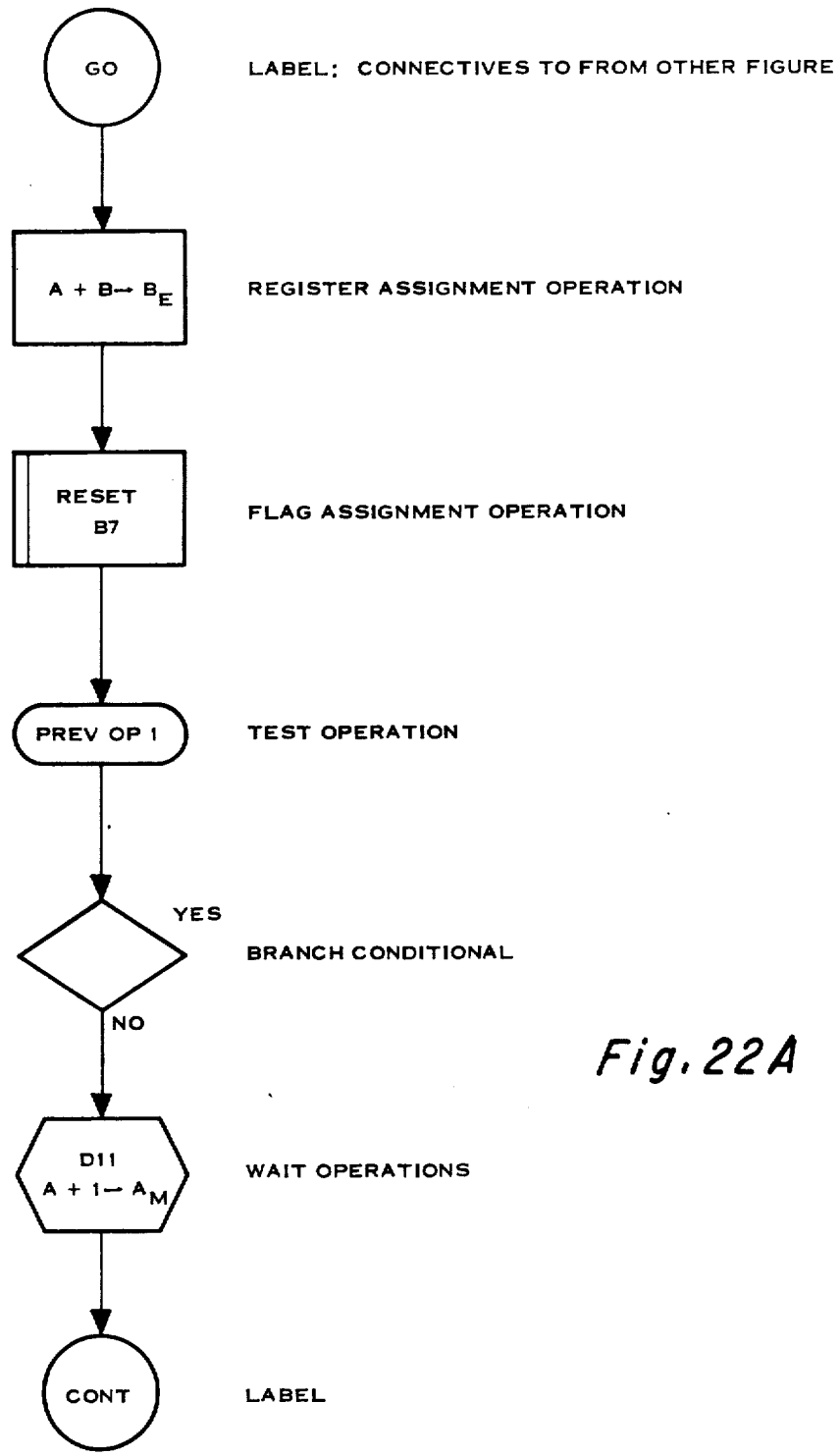
Figure 22B:
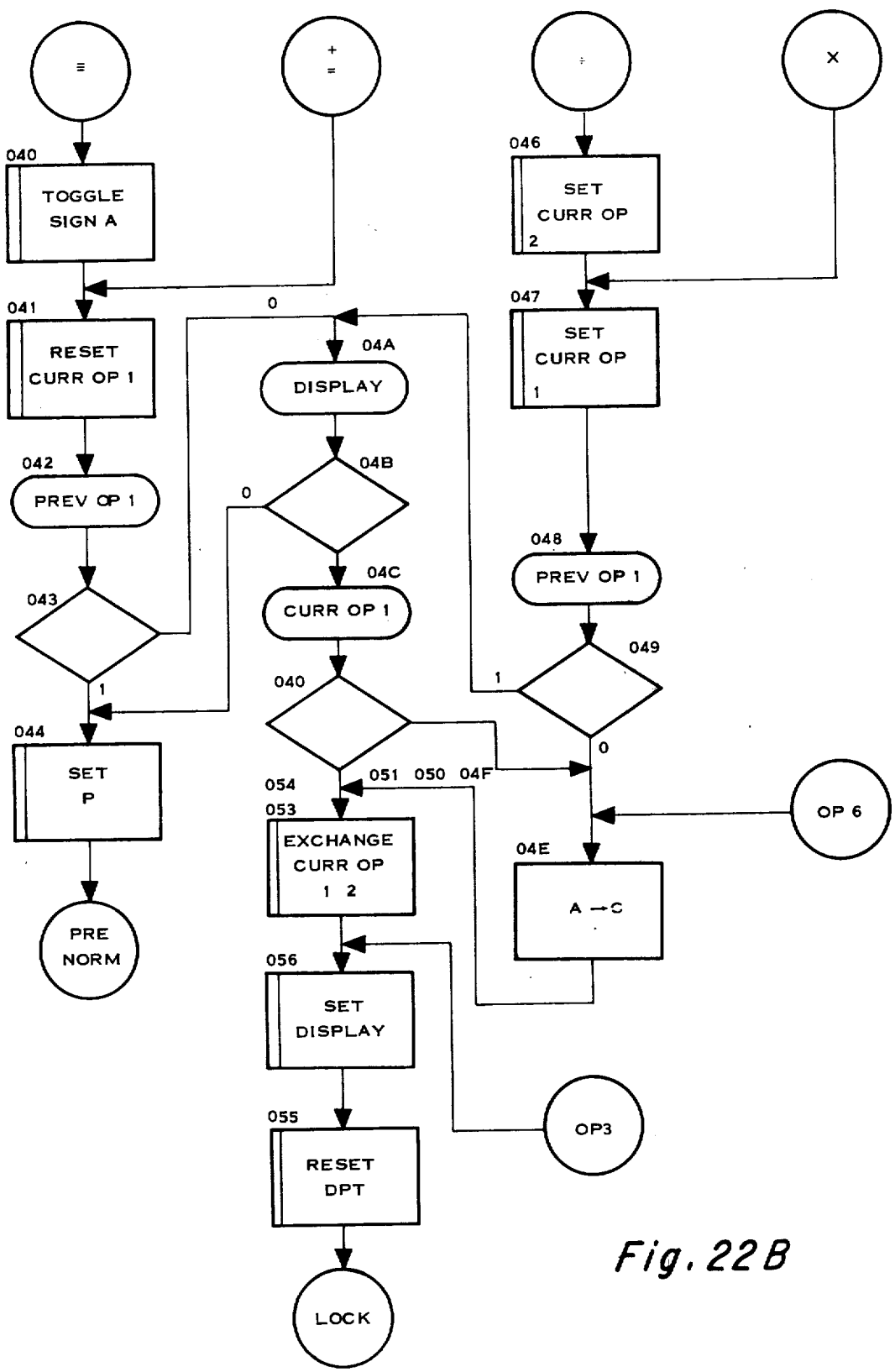
Figure 22C:
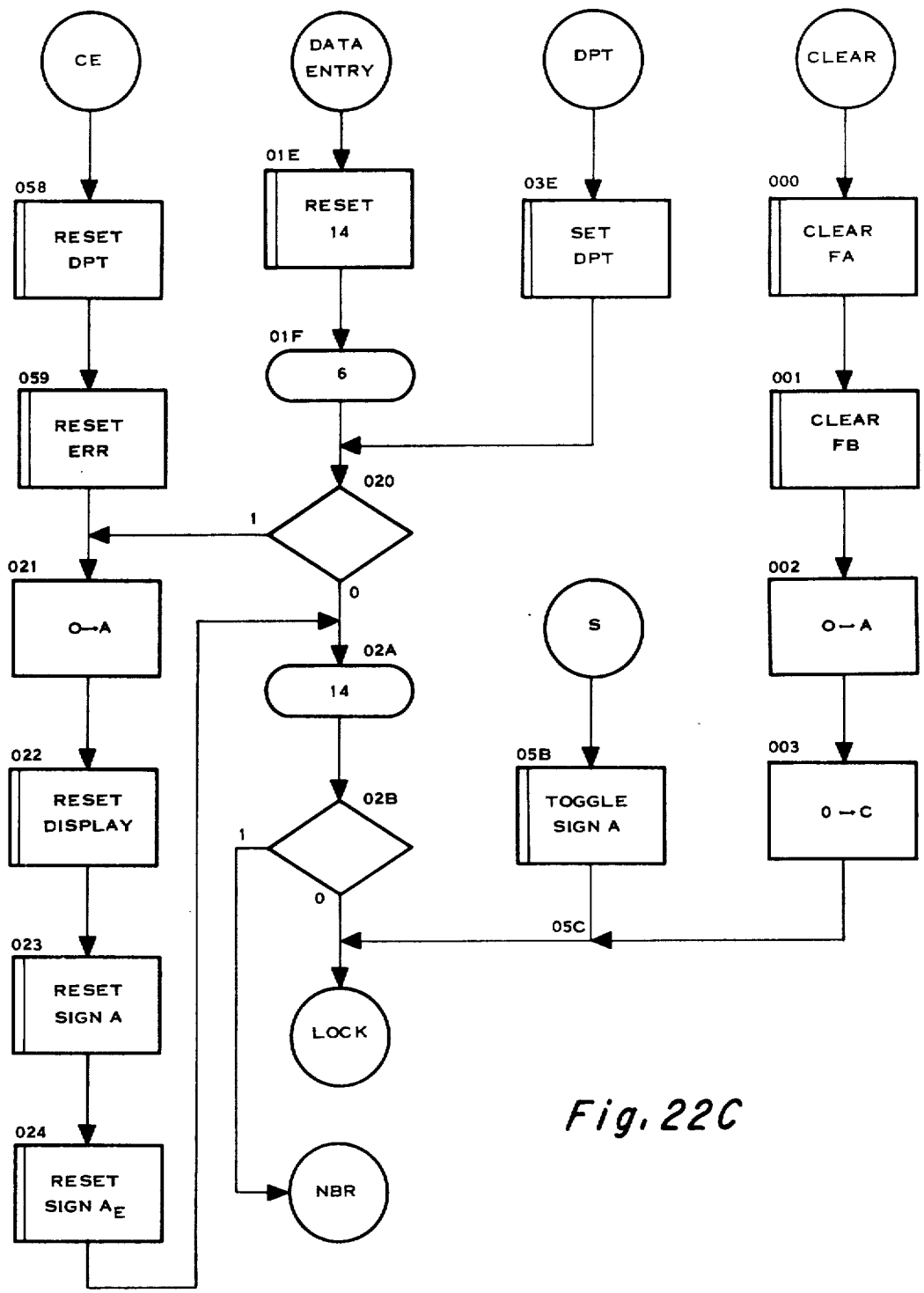
Figure 22D:
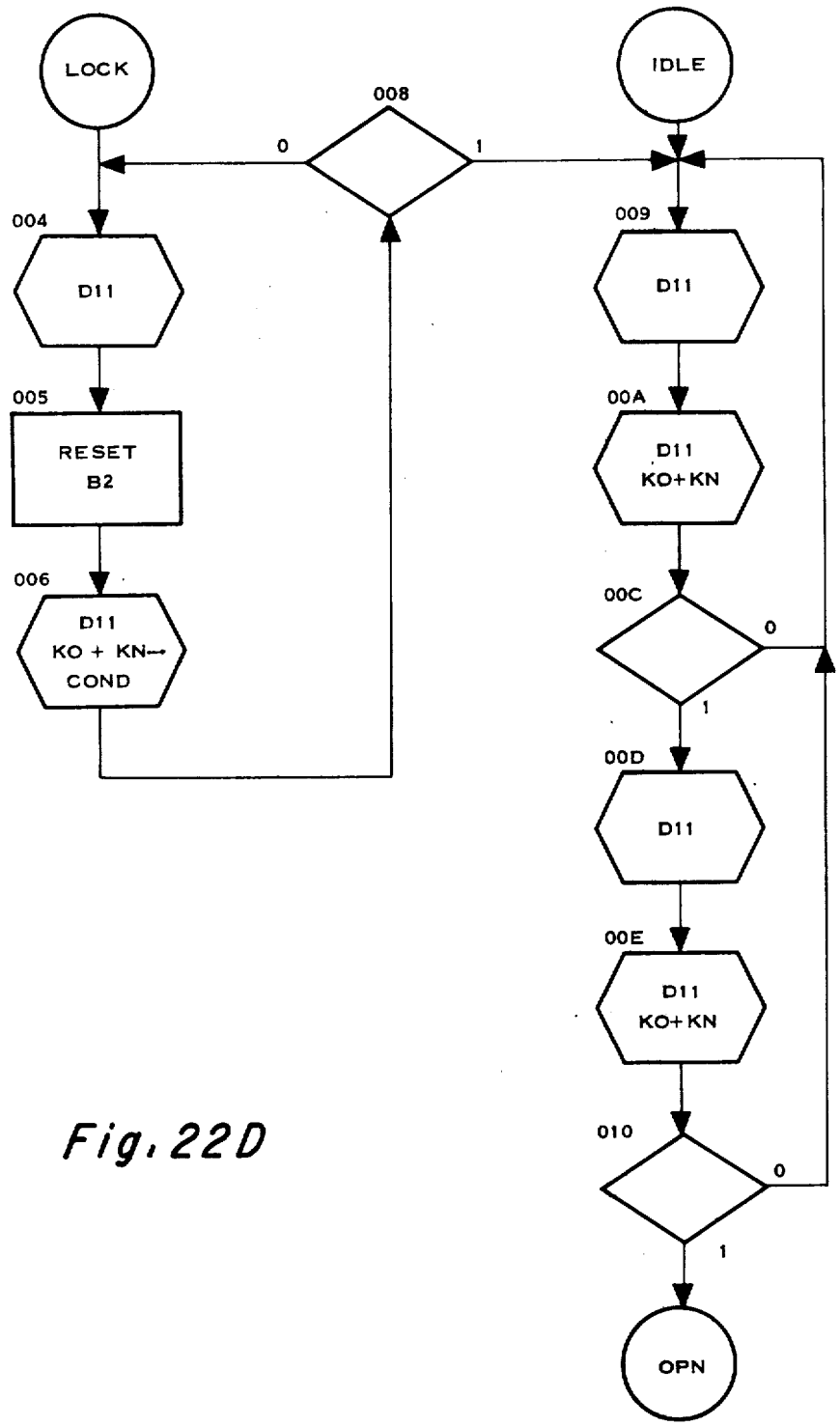
Figure 22F:
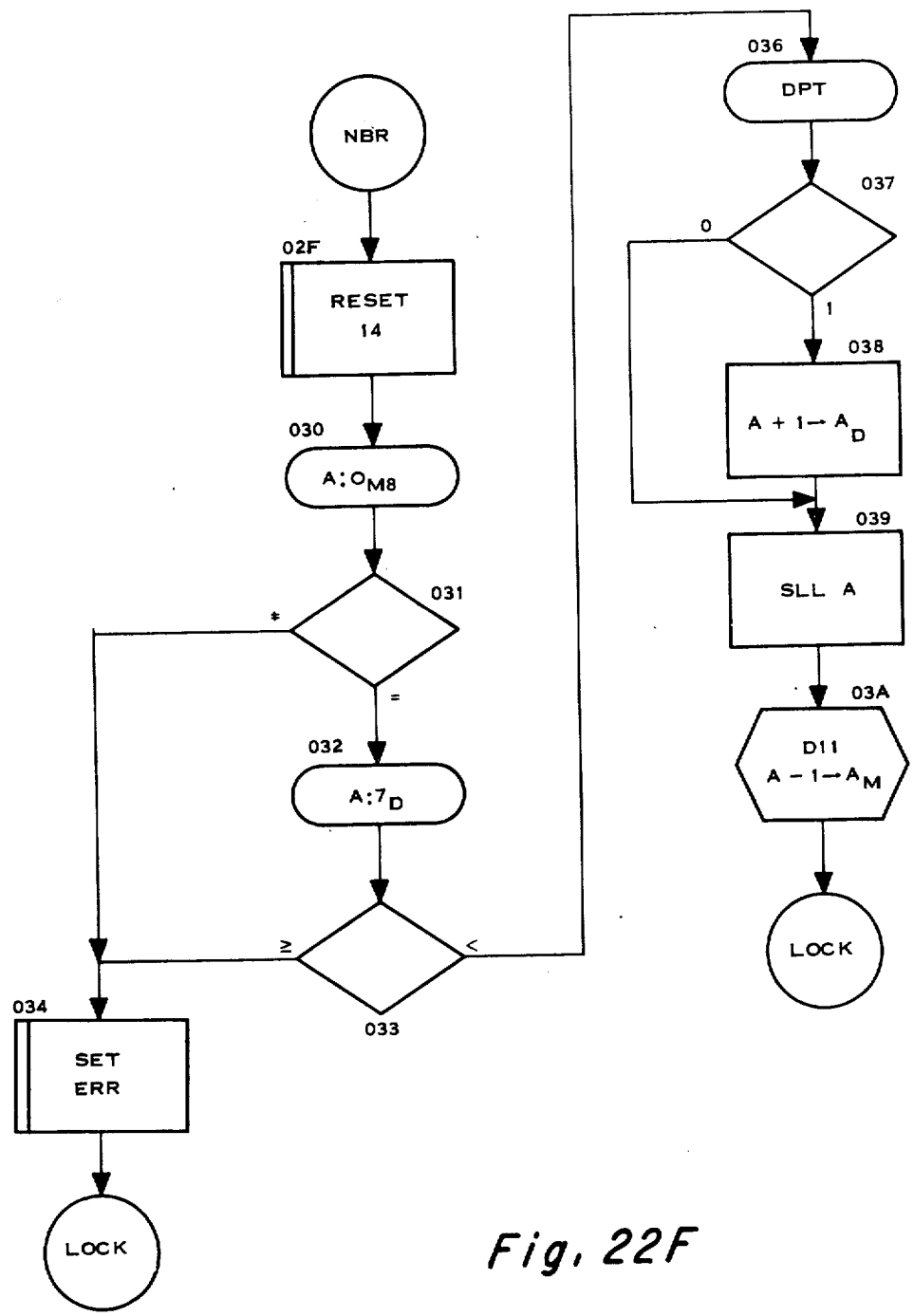
Figure 22G:
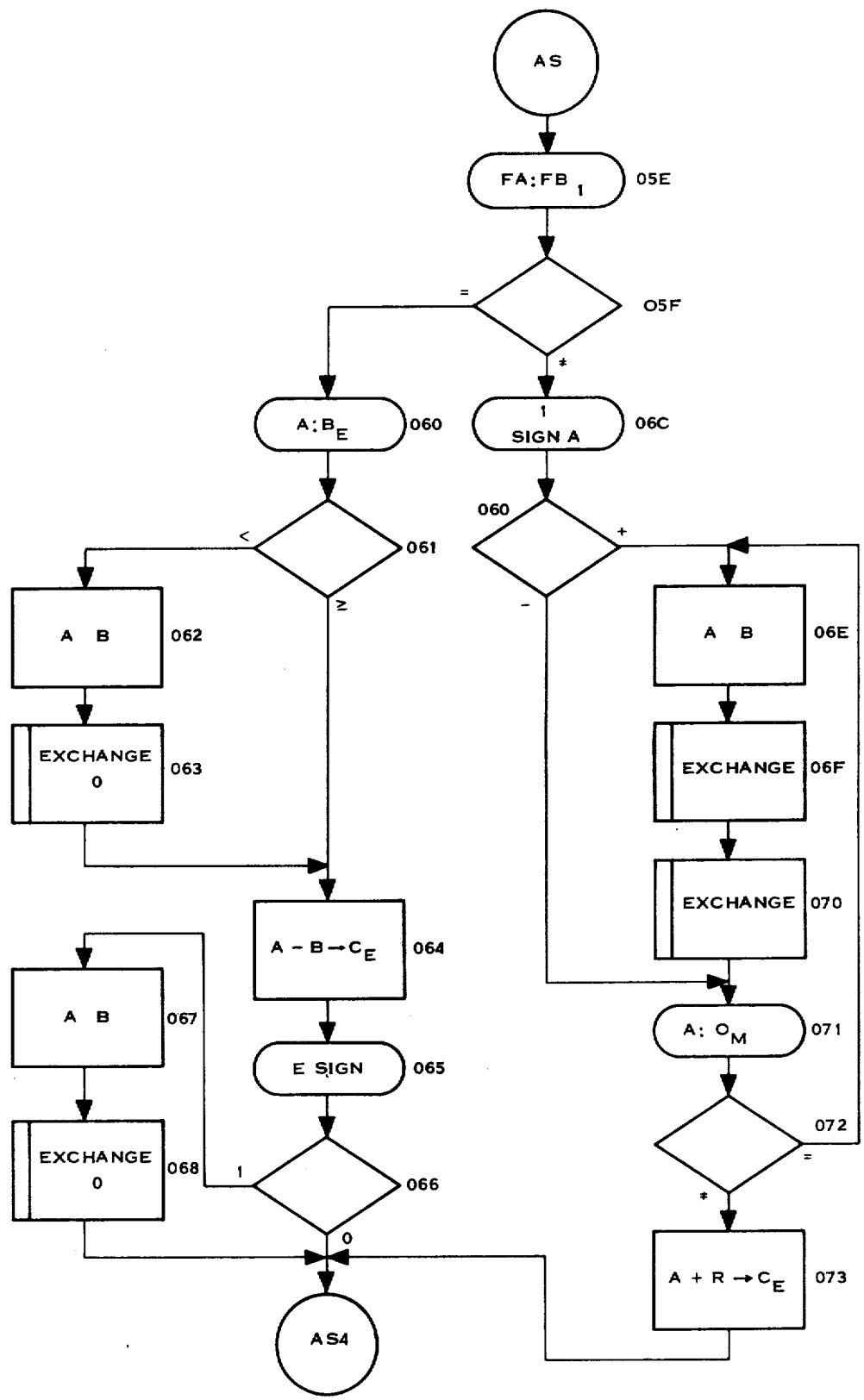
Figure 22H:
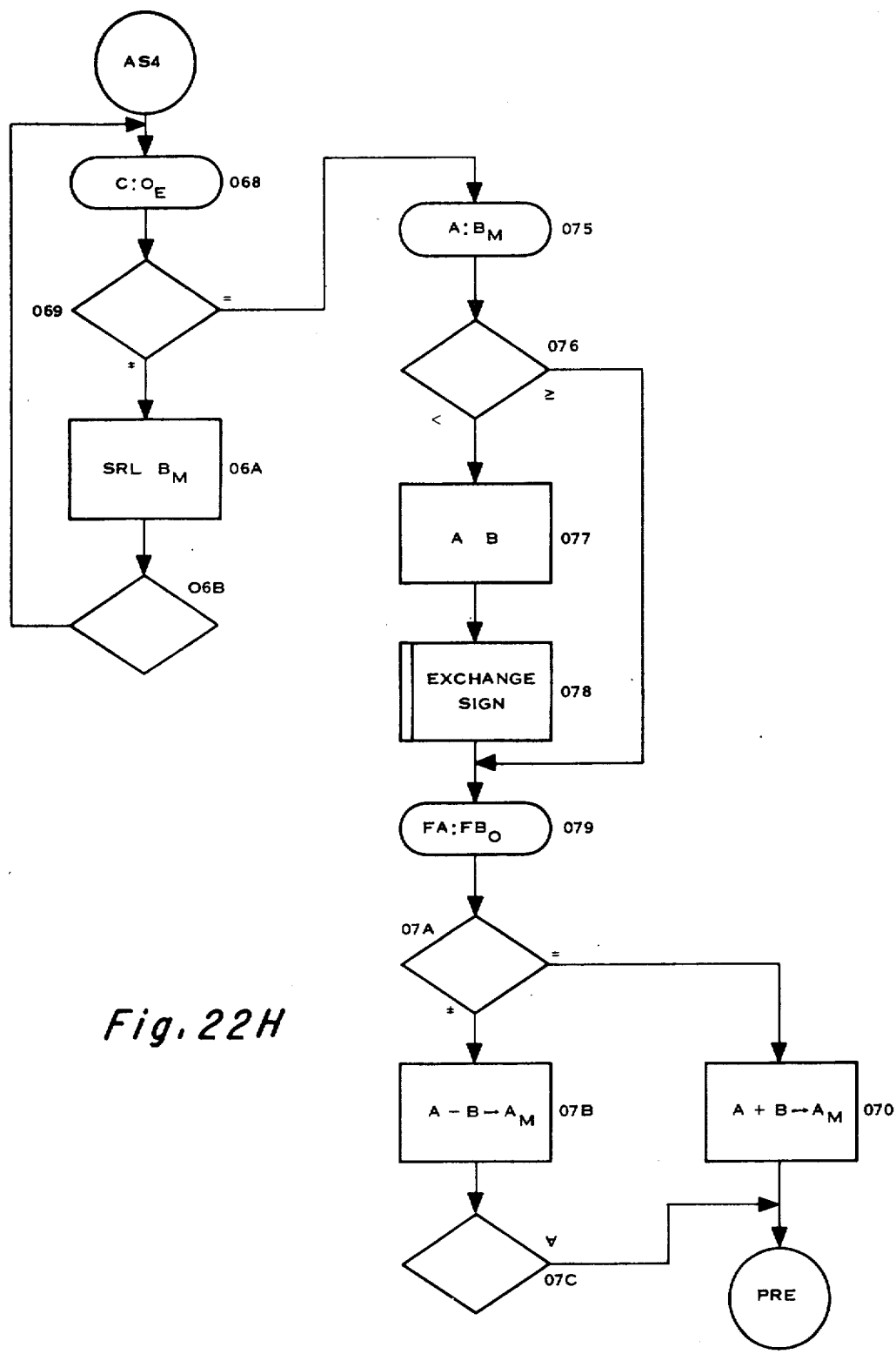
Figure 22I:
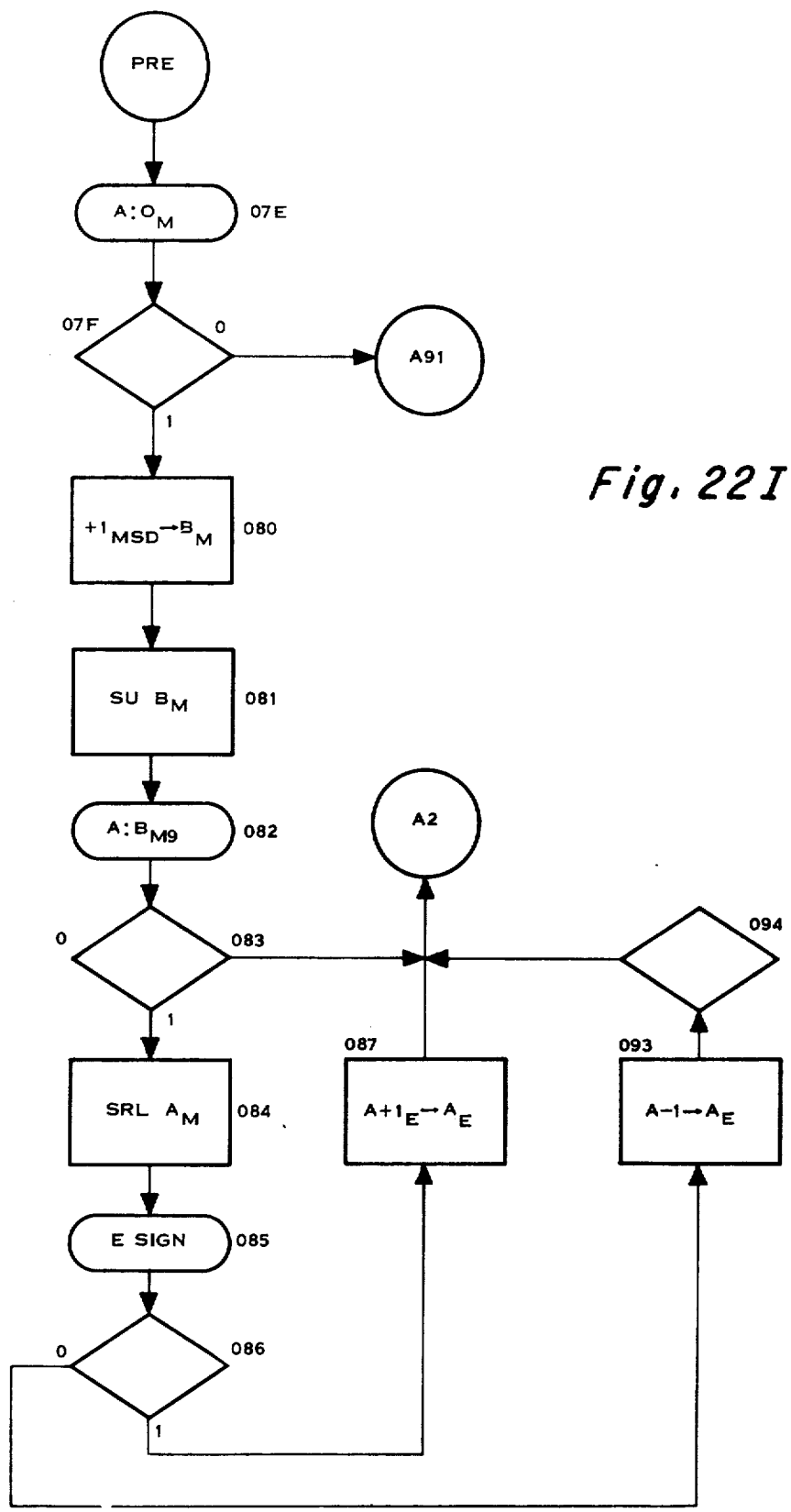
Figure 22J:
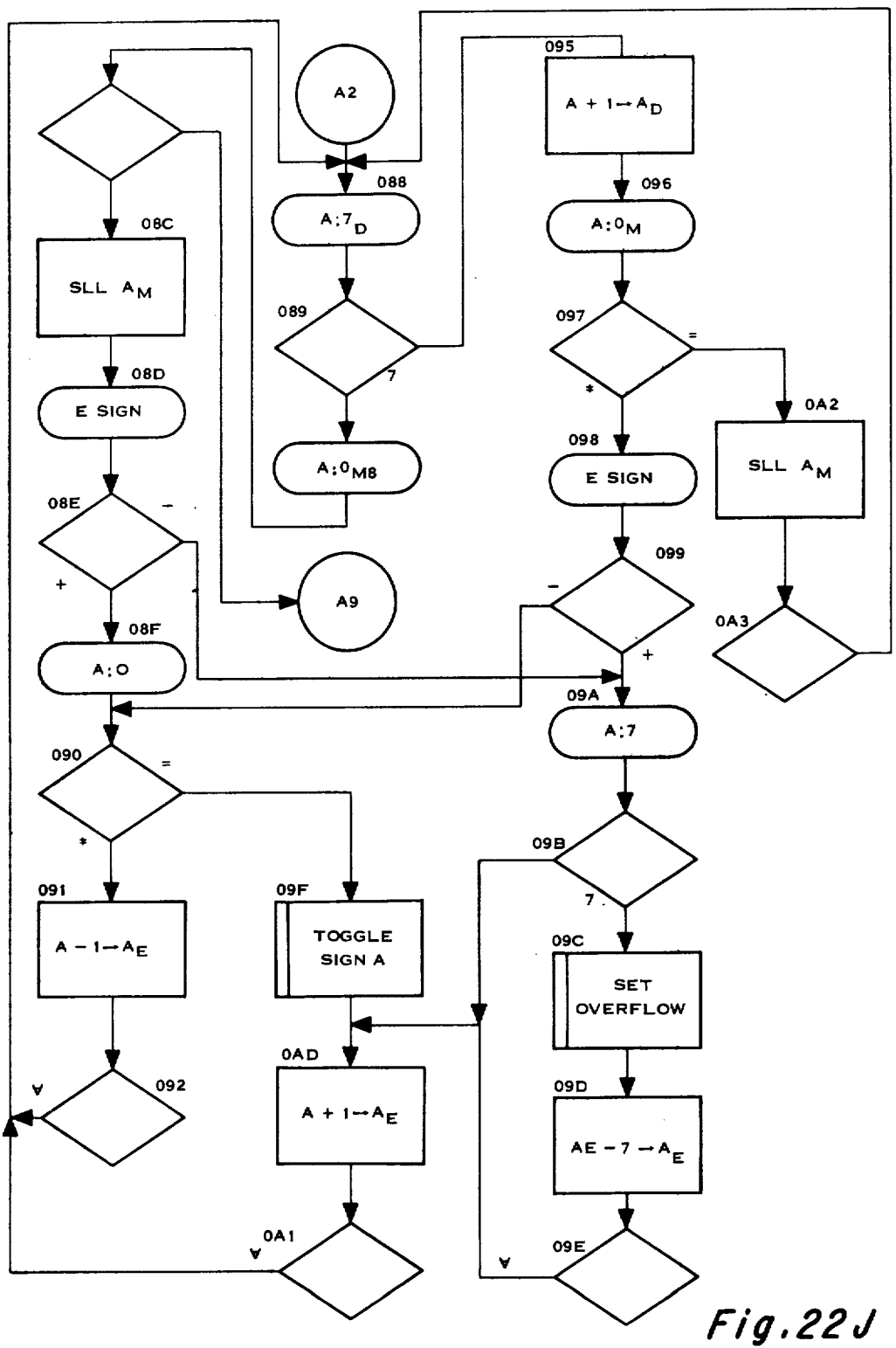
Figure 22K:
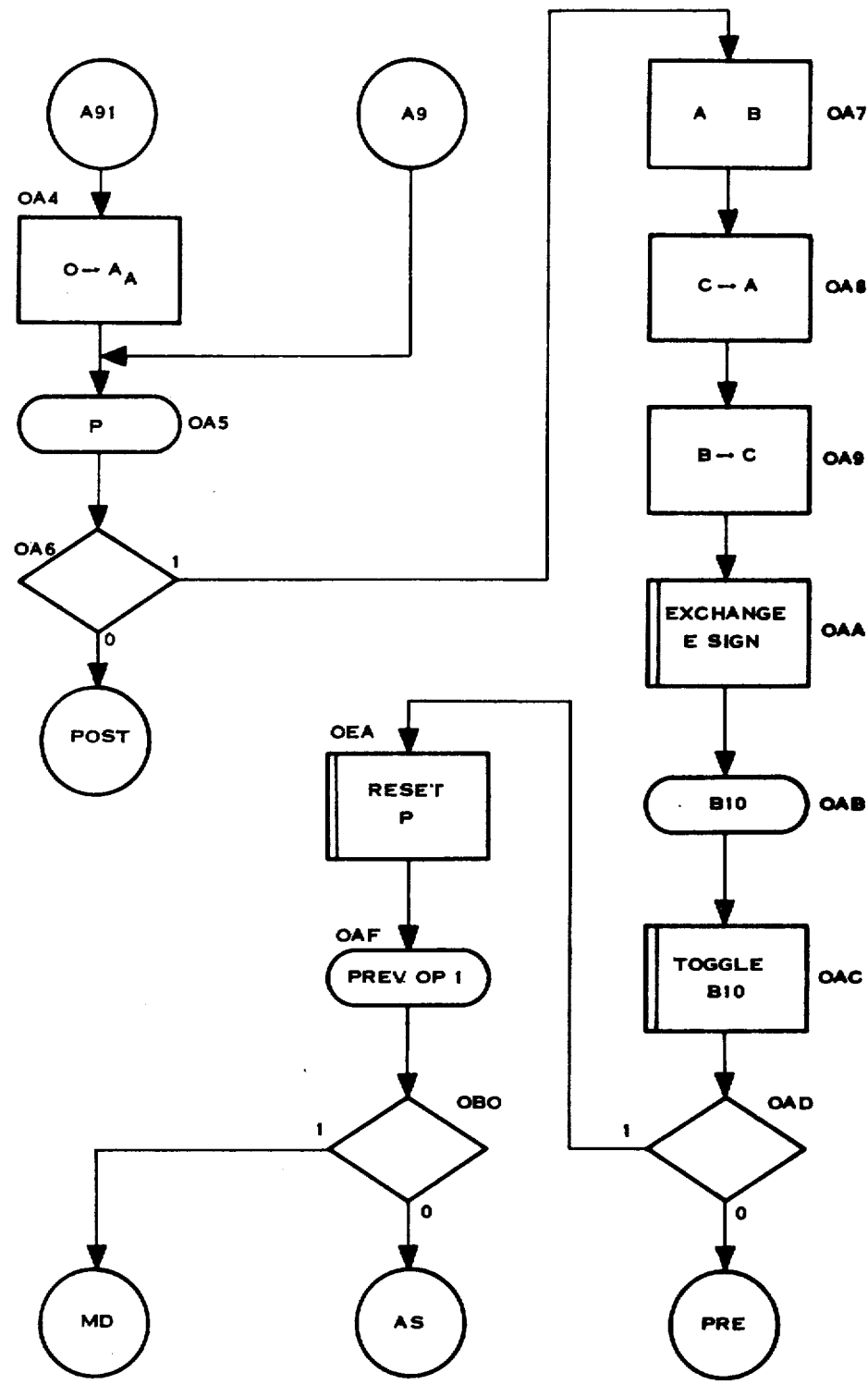
Figure 22L:
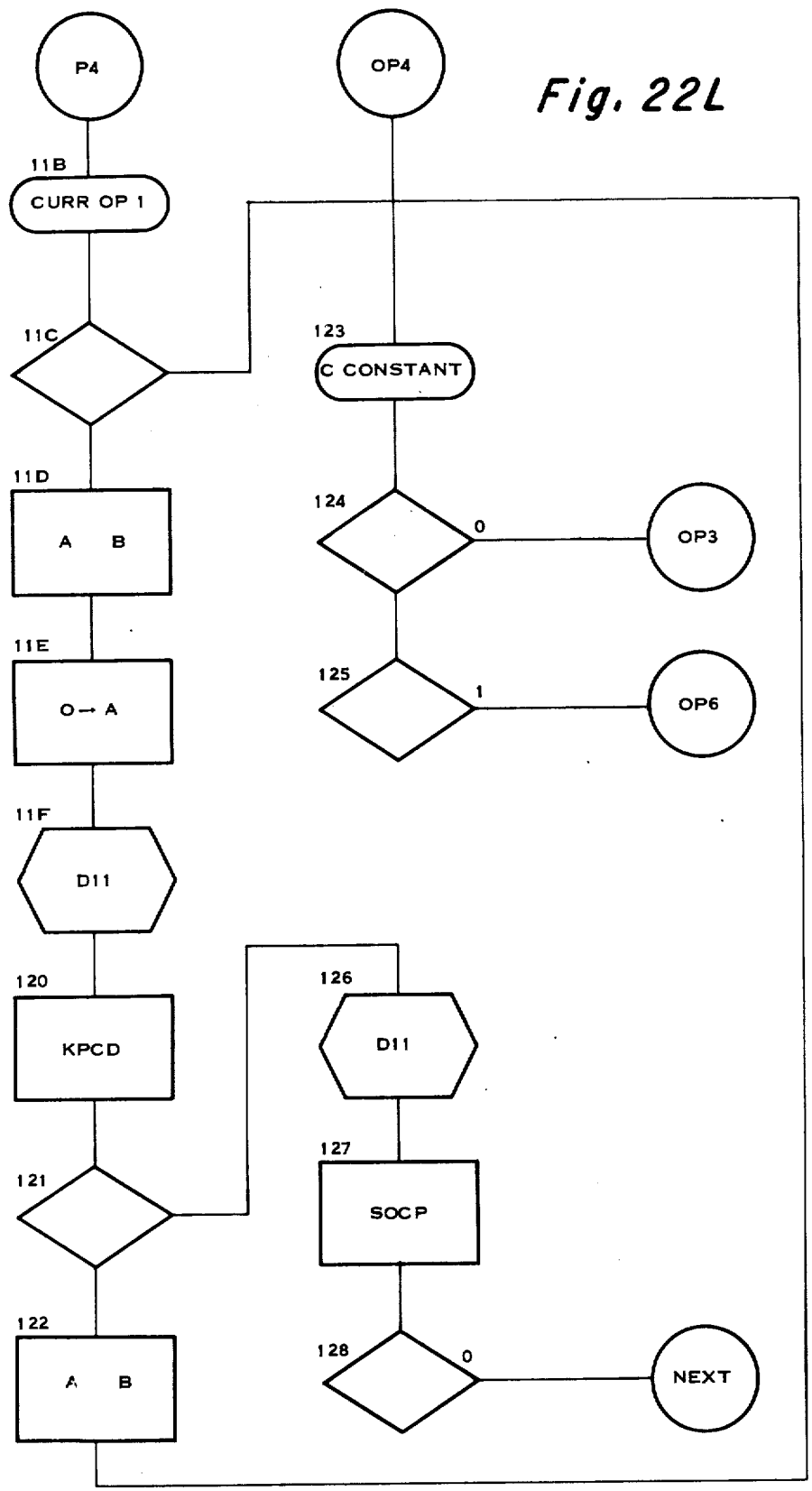
Figure 22M:
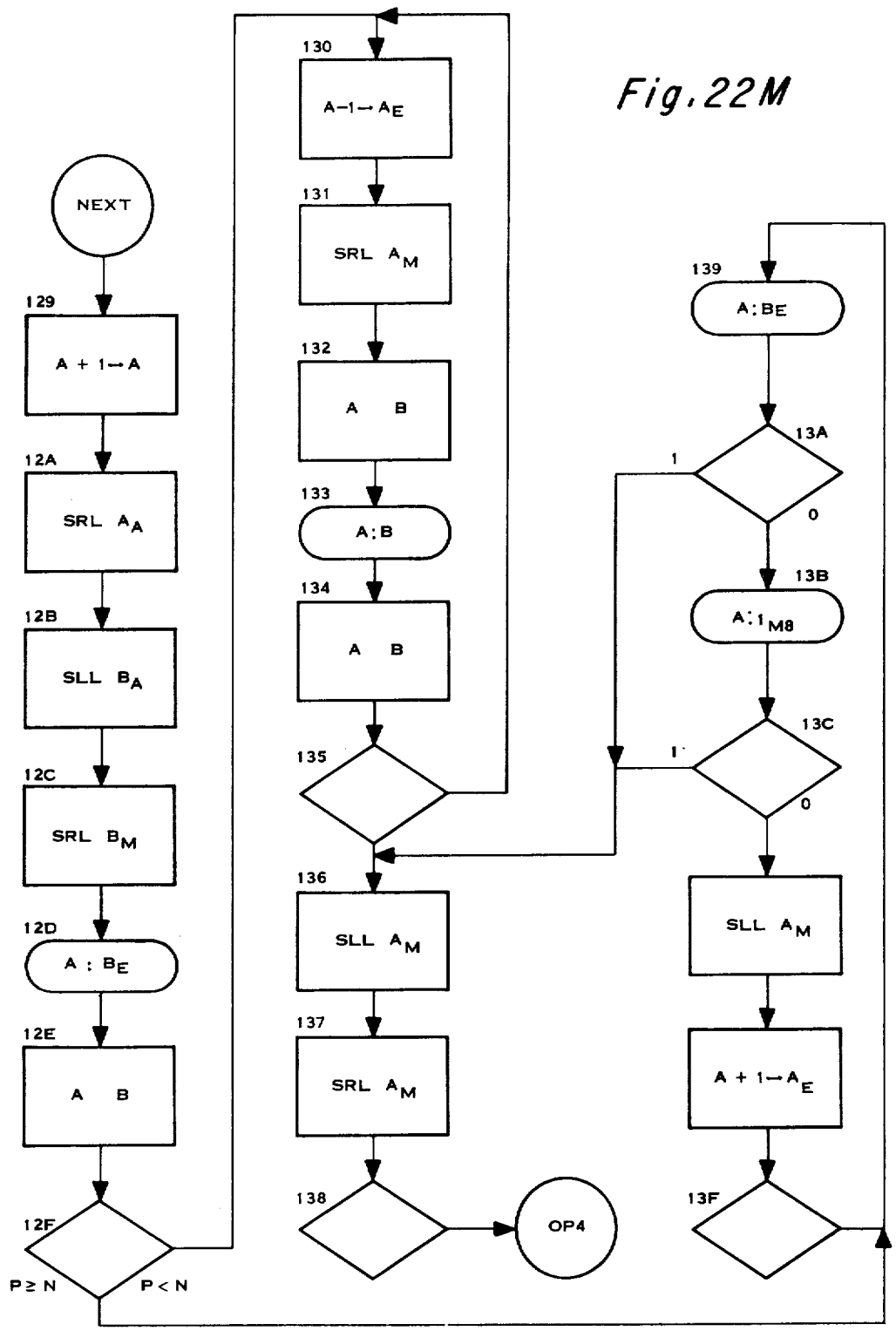
Figure 22N:
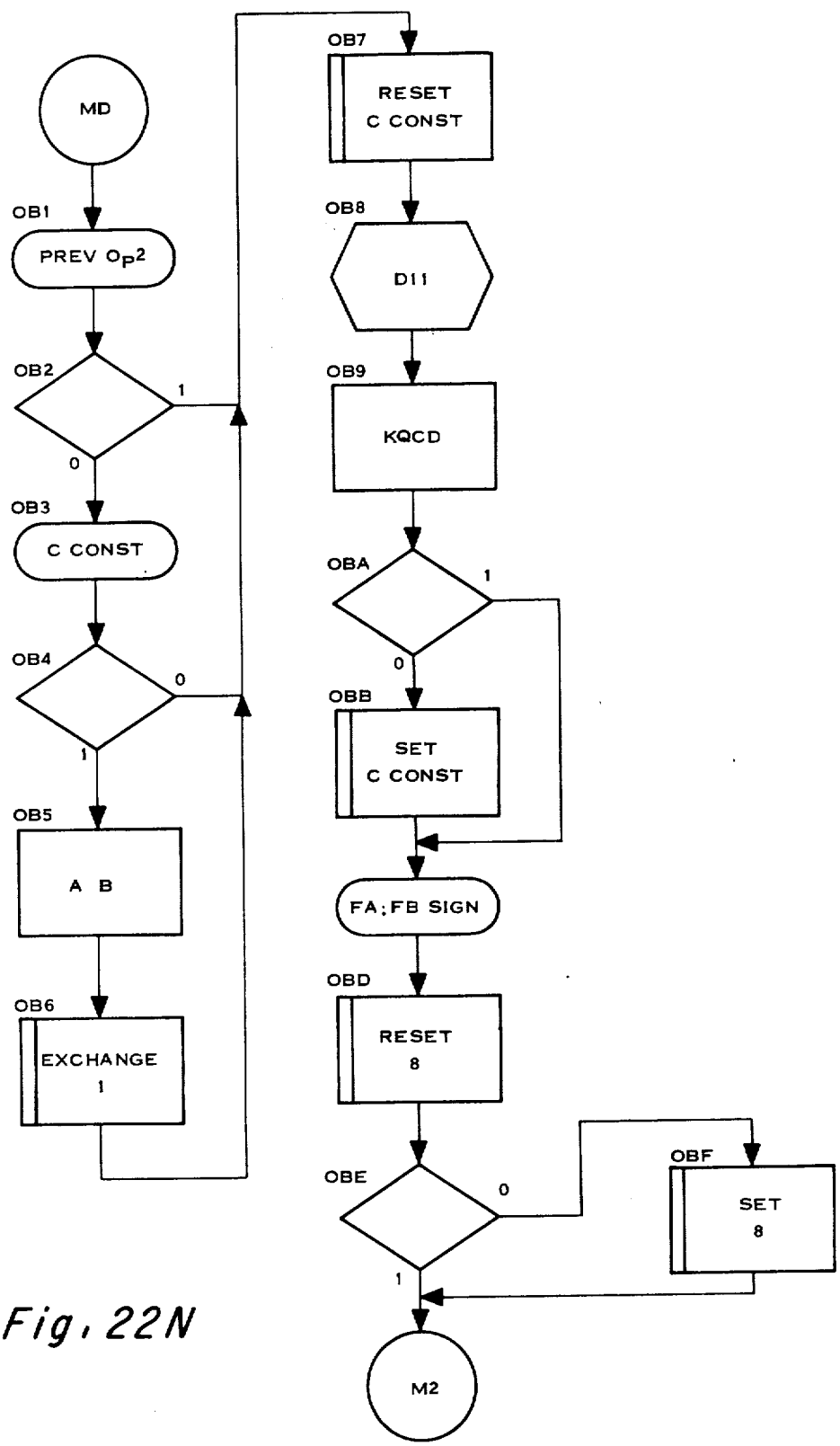
Figure 22P:
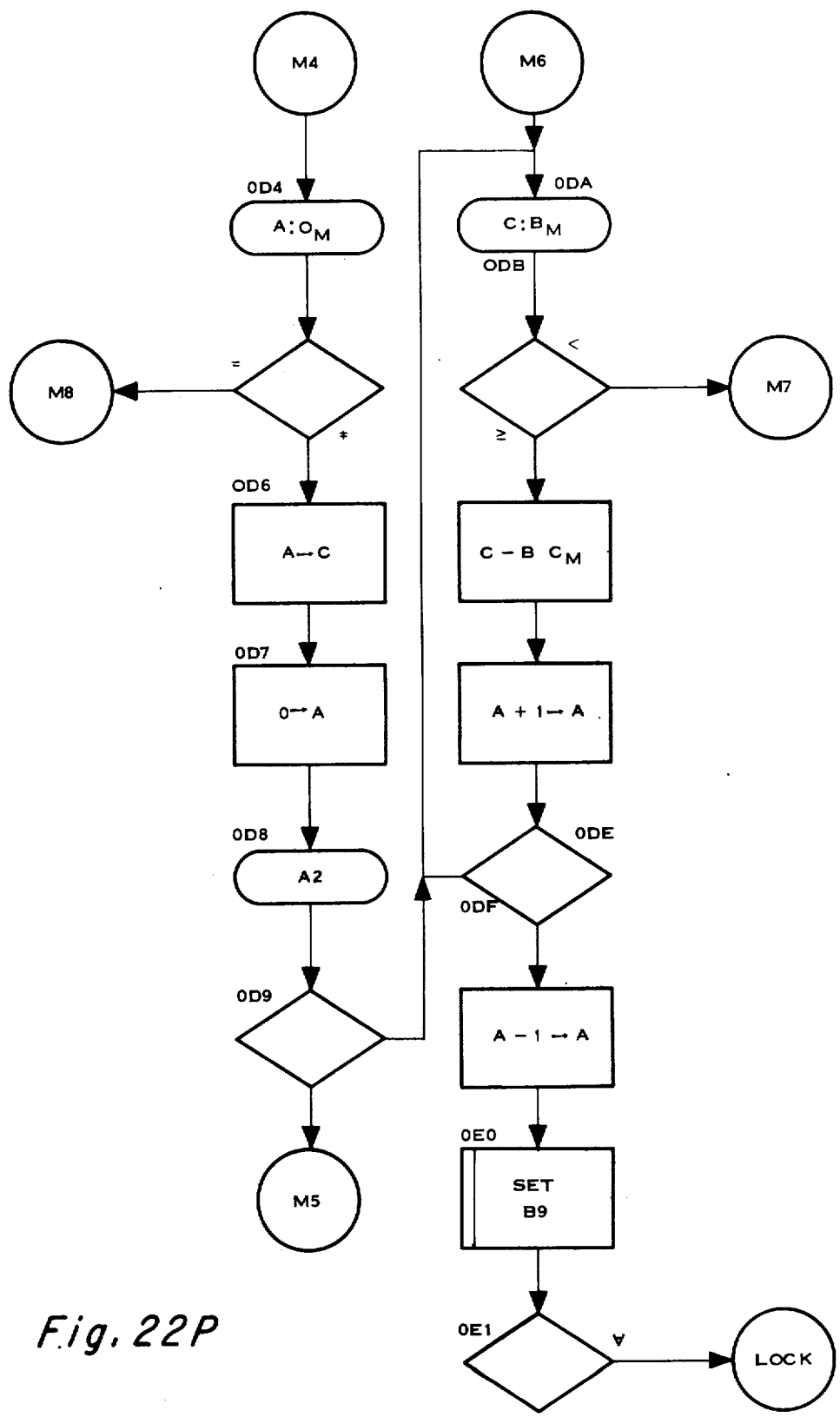
Figure 22:
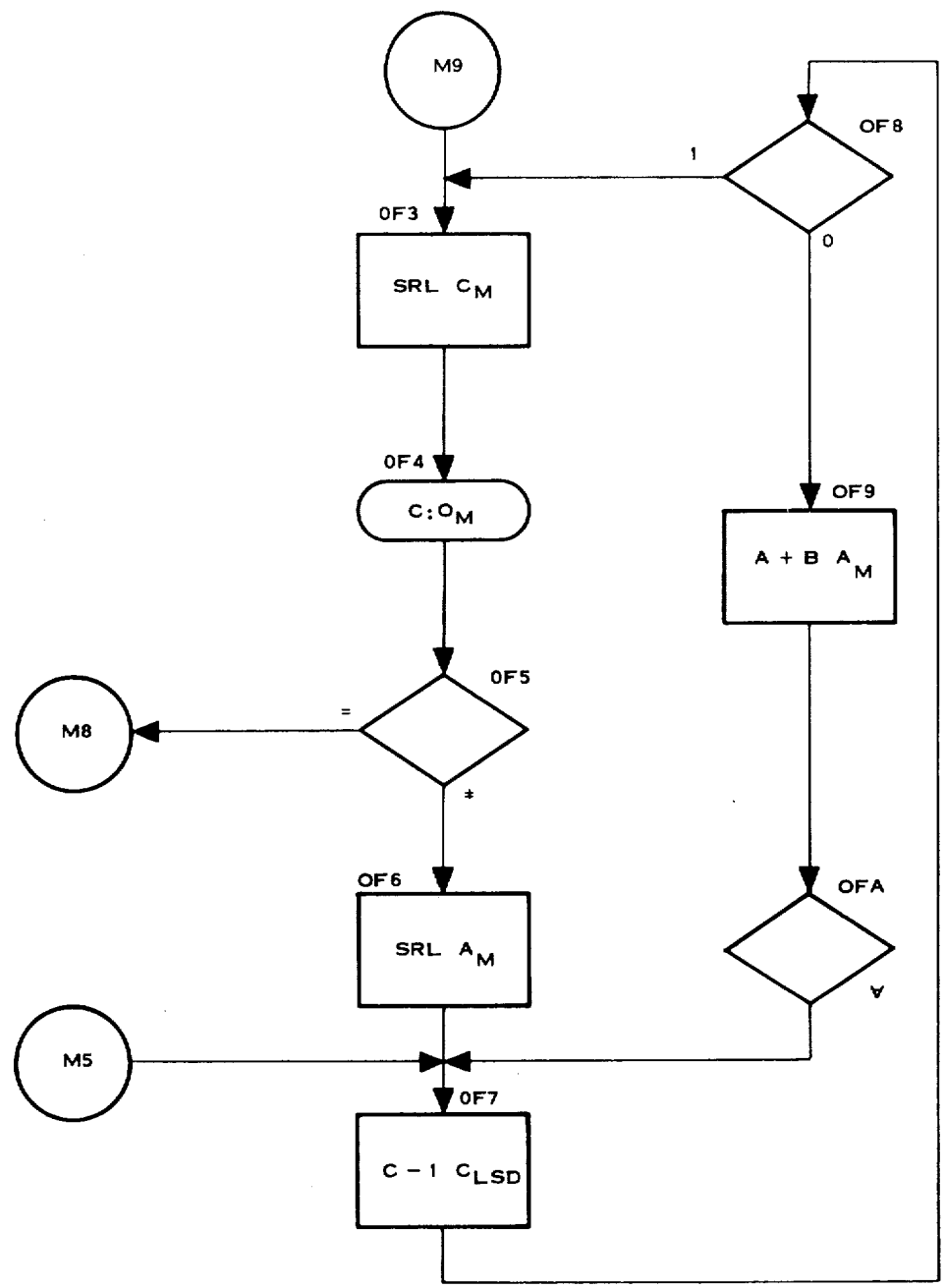
Figure 22R:
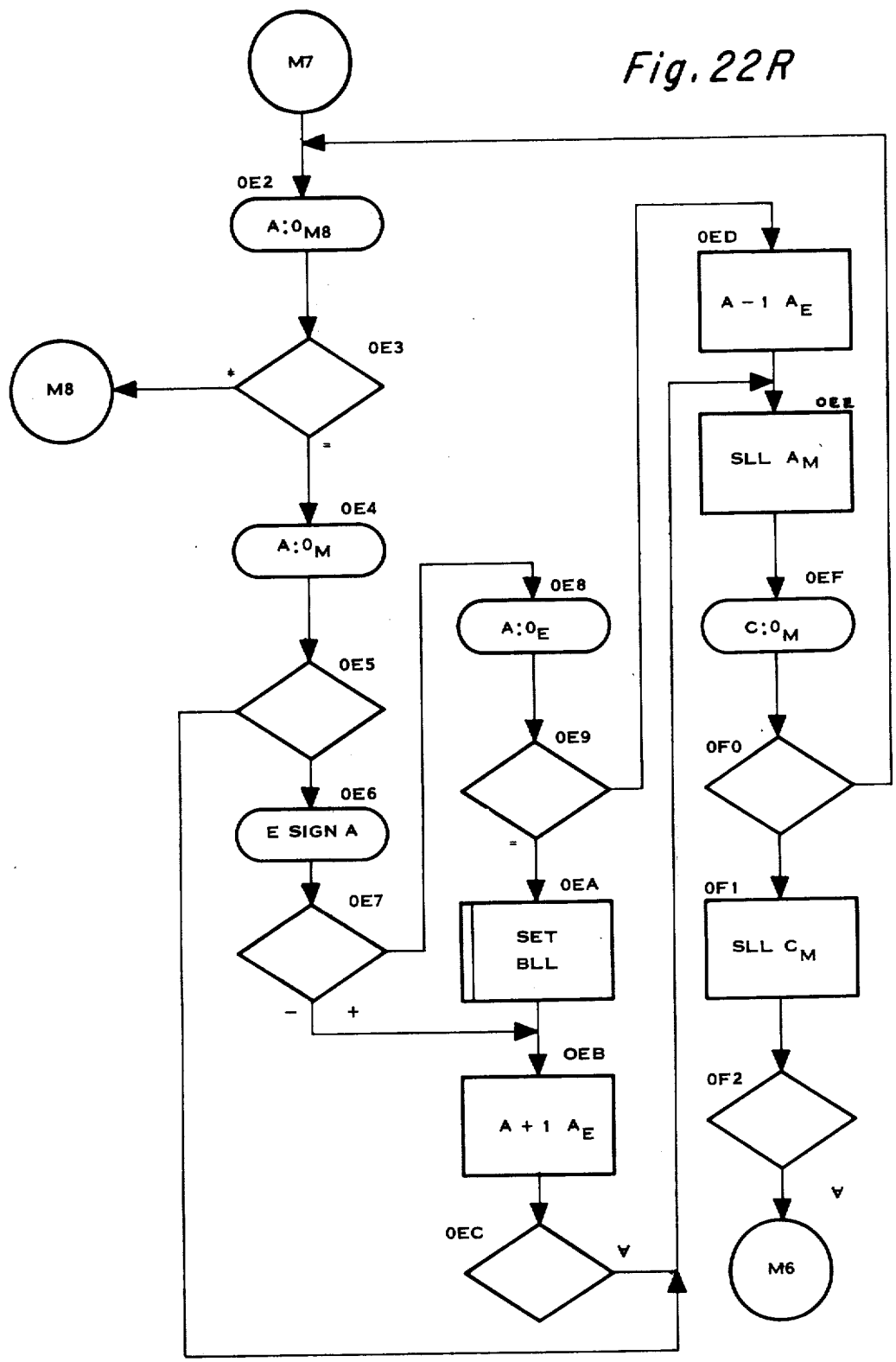
Figure 22S:
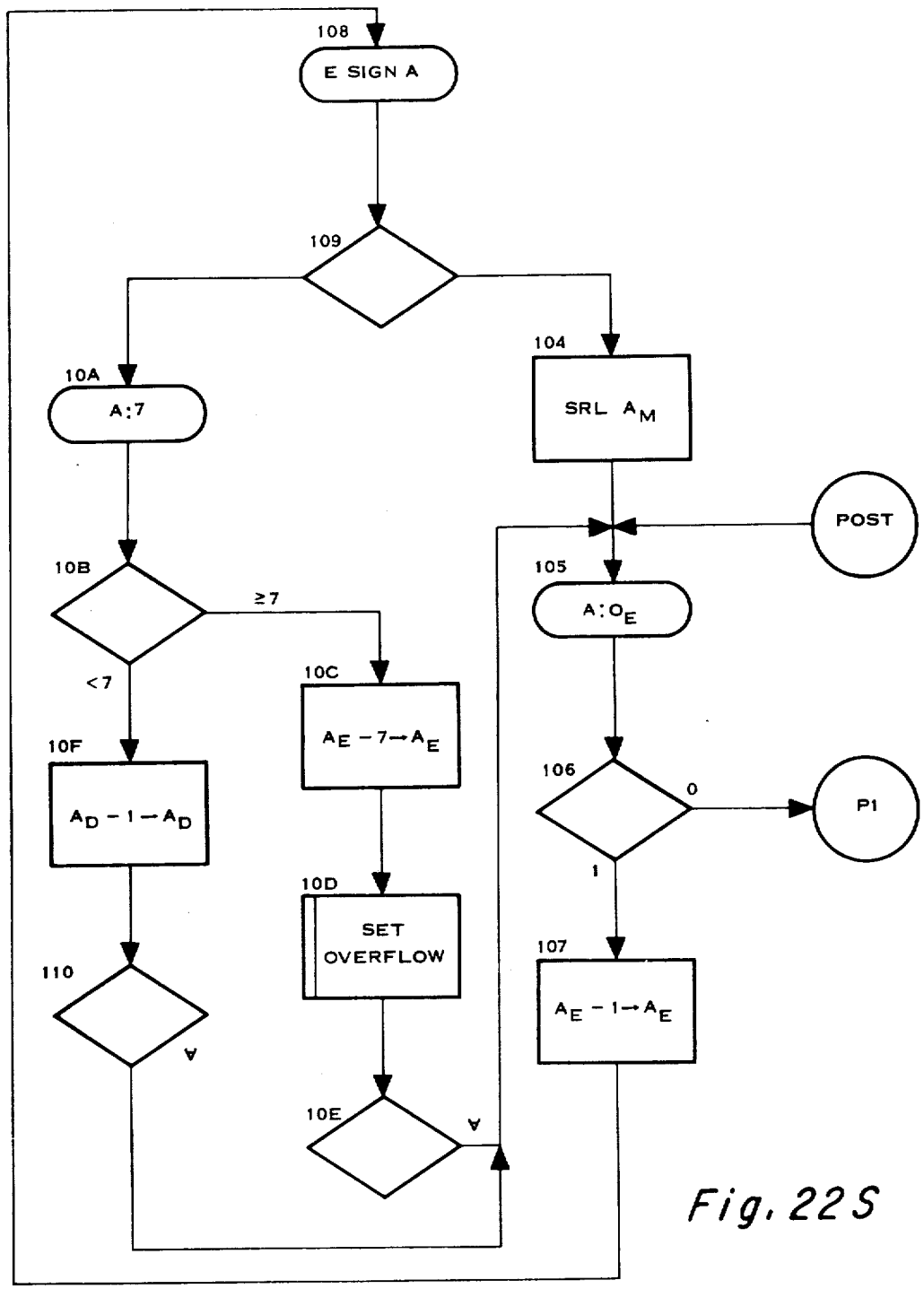
Figure 22T:
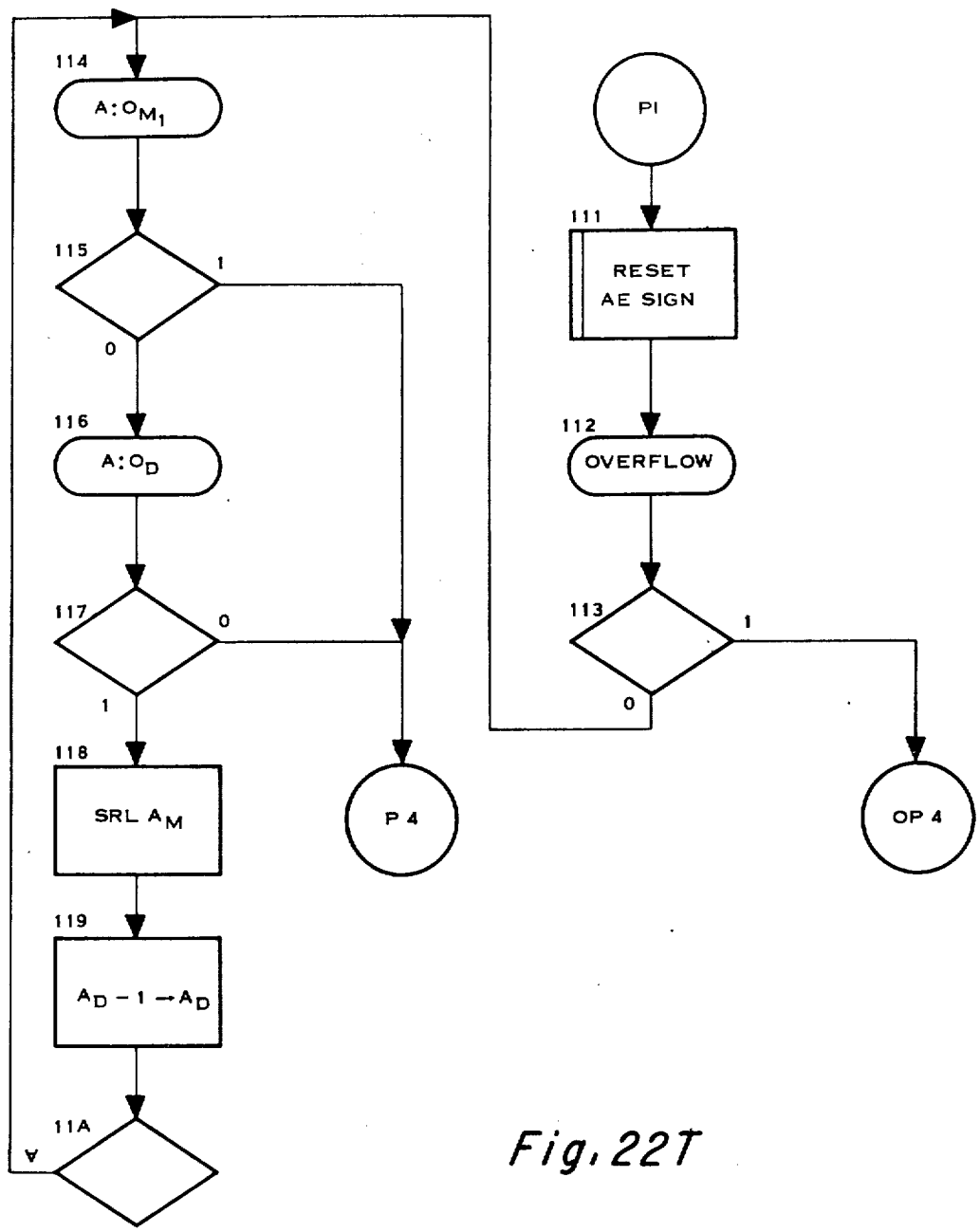
Figure 23:
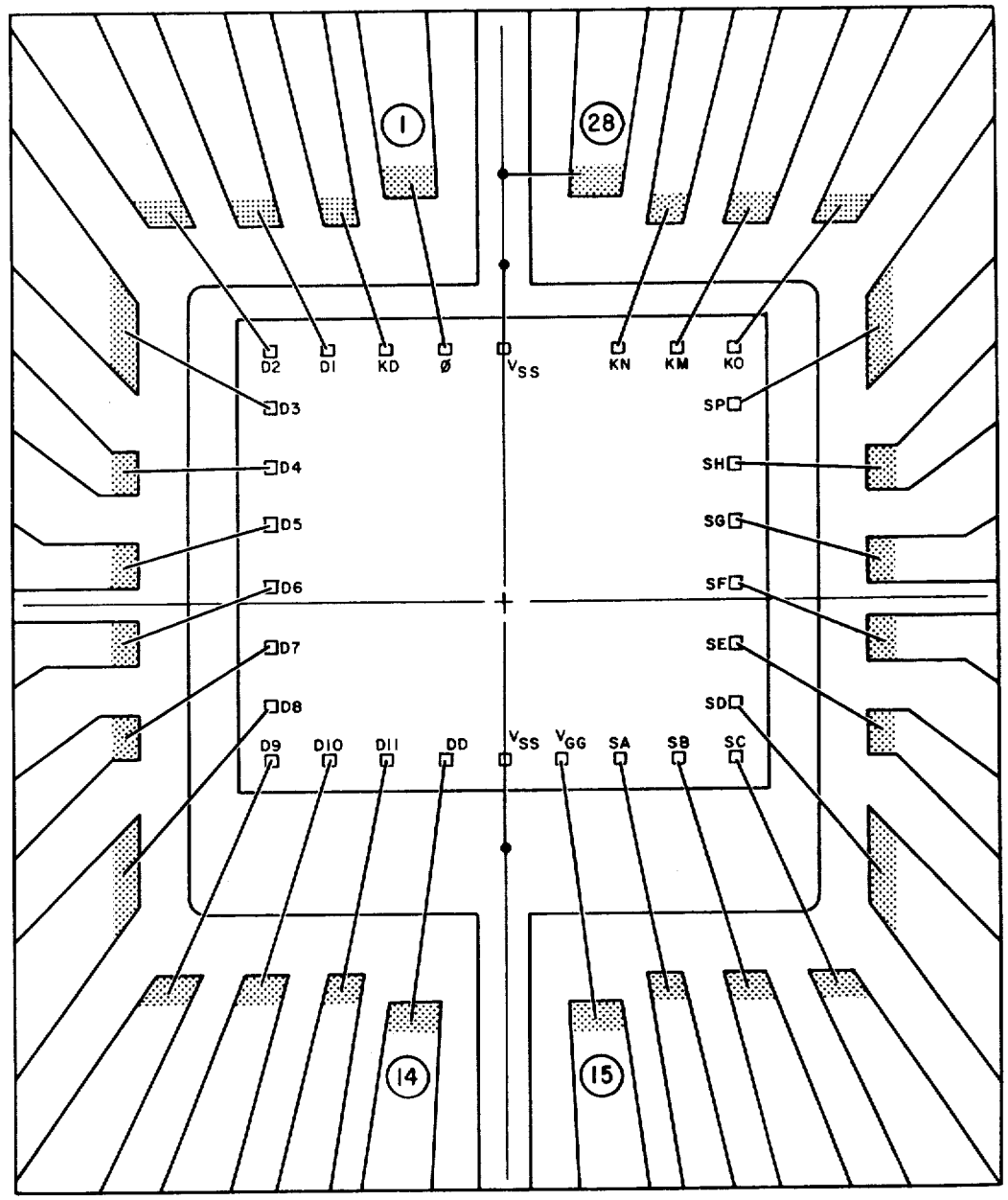

FIGS. 18A–D are diagrams showing the metal-insulator-semiconductor circuit equivalents of various logic gates shown in FIG. 17;

FIG. 19 is a circuit diagram illustrating the metal-insulator-semiconductor equivalent circuits of shift register cells 541 utilized in the commutator of the random access memory array shift register system utilized in the embodiment of FIG. 17;

FIG. 20 is a circuit diagram illustrating the metal-insulator-semiconductor driver circuit for the shift register cells of FIG. 19;

FIG. 21 is a diagram illustrating the circuit equivalents of the programmable logic arrays (PLA) utilized in the embodiment of FIG. 17;

FIGS. 22A–T are flow charts showing the programs stored in the programmable read only memory of an embodiment of the calculator system to provide desk top calculator functions including floating decimal point operation, input routines and output routines; and FIG. 23 is a planar view of the packaged monolithic structure showing terminal interconnects to the keyboard, display drivers and power supply.

According to the present invention a variable function programmed calculator which includes a fixed program stored in a read only memory is capable of being fabricated as a monolithic integrated semiconductor system. In particular, the described embodiment is capable of being fabricated as a monolithic integrated metal-insulator-semiconductor system utilizing contemporary metal-insulator-semiconductor technology. The calculator system may be programmed to perform desk top calculator functions including floating decimal point operation or may be programmed to perform other useful operations. A monolithic structure of the calculator system includes a fixed program which is programmed in the programmable read only memory by modifying one of five or seven masks (the gate-insulator mask) during the fabrication process. In addition, the input, output and operating format of data within the calculator system is programmable in programmable logic arrays by altering the same masks. In the following sections the calculator system is first described in terms of the functional relationship between its various subsystems, then in terms of specific circuits and finally in terms of the fixed programs stored in the read only memory.

FUNCTIONAL DESCRIPTION OF THE CALCULATOR SYSTEM

Figure 1:
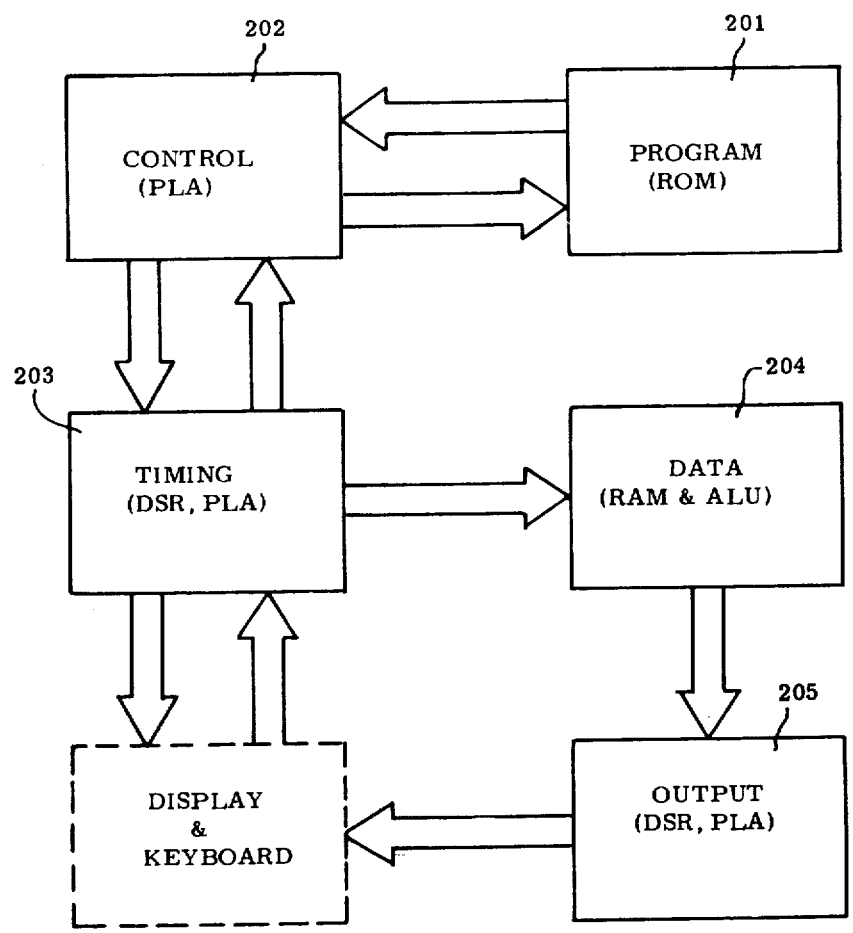
FIGS. 1 and 2 are block diagrams illustrating the calculator system of the present invention.
Figure 2:
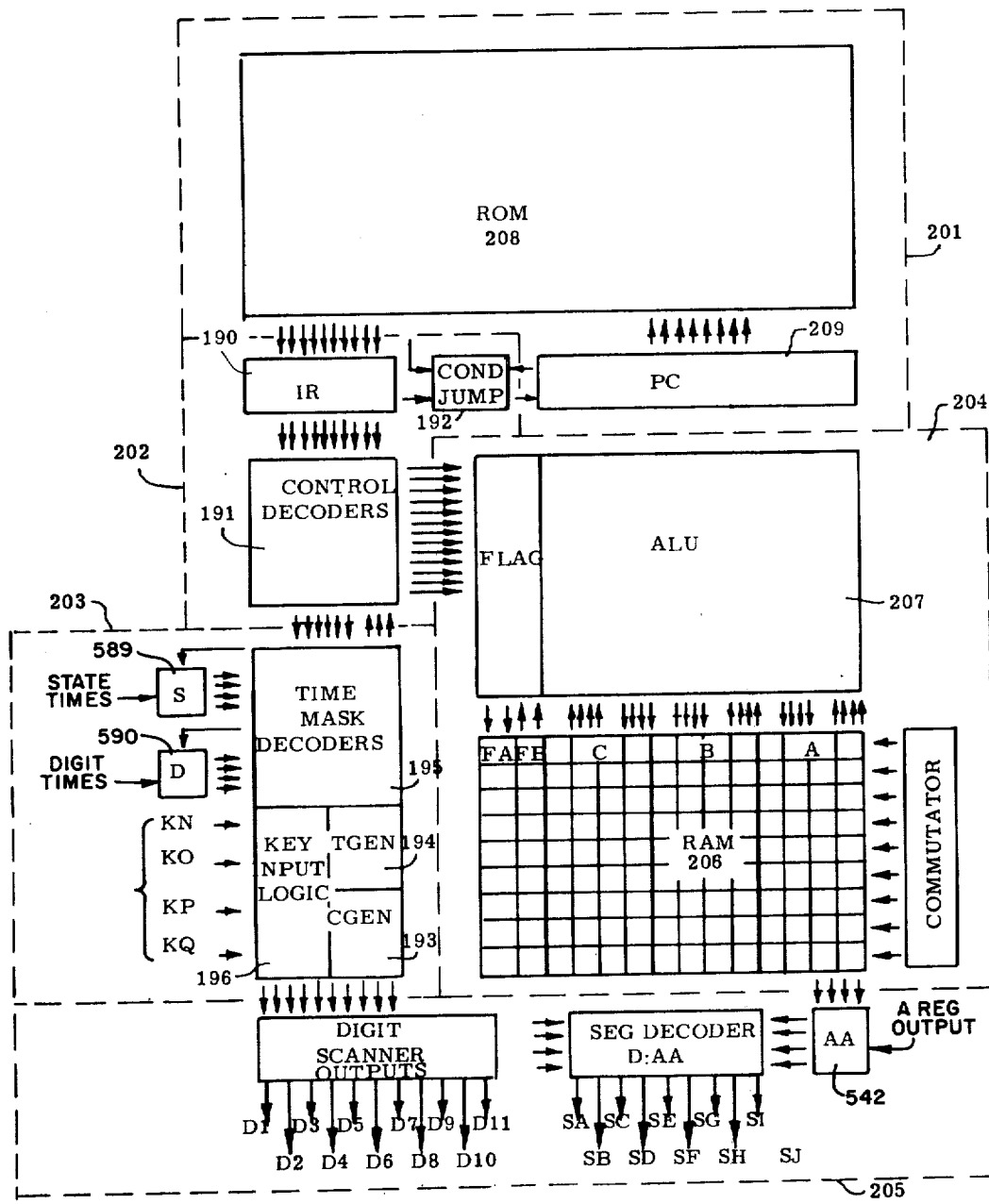

Referring to FIGS. 1 and 2, the calculator system of the present invention is illustrated in terms of the functional dependence among five internal functional subsystems of the calculator system and the relation between the internal functional subsystems and external functional elements. Program block 201 comprises a read only memory (ROM) 208 for storing fixed programs to operate the calculator in a desired manner and program counter (PC) 209. Control block 202 comprises instruction register (IR) 190 for storing a control instruction, control decoders 191 for decoding control instructions and jump condition circuit 192. Timing block 203 comprises a clock generator 143, a timing generator 194, digit and FLAG mask decoders 195, and key input logic 196. Data block 204 comprises random access memory shift register system and FLAG data storage array 206, decimal arithmetic unit 207 and FLAG logic unit 229 (see FIG. 17N). Output block 205 comprises segment output decoder 198 and digit scanner outputs 197.

DATA BLOCK 204

Referring to FIG. 3, a functional description of data block 204 is described in detail. Data block 204 includes means for providing decimal or hexadecimal data storage and means for providing basic operations. The storage structure of the present embodiment is parallel for decimal or hexadecimal digits; therefore, each interconnect 210 coupling the various functional elements symbolize four physical interconnections. A register 211, B register 212 and C register 213 of memory array shift register system 206 comprise the primary decimal or hexadecimal storage means for the calculator logic unit. 1-bit dynamic shift register delay circuits 214 are utilized to provide recirculating refresh of primary registers 211, 212 and 213. The outputs of A register 211 and C register 213 are input to the U selector 215. The output of B register 212 and a constant N provided by means 223 are input to V selector 216. A binary or binary coded decimal (BCD) adder 217 calculates the sum or difference between U and V, i.e., U + V or U − V. U is the plus side of the adder; V is the minus side of the adder. A Σ data selector 218 provides means for short and long path shifting operations. An output from adder 217 to an input of Σ data selector 218 corresponds to the normal path in which no shift is provided. The delayed adder input 225 to Σ data selector 218 corresponds to the long path in which a left shift is provided. The UV logical OR-gate 224 input to Σ data selector 218 corresponds to a short path which provides for a right shift. Data selector 219 selects the input to A register 211 as either the Σ output of Σ data selector 218 or the delayed B register 212 output or the delayed A register output. Data selector 220 selects the input to the B register as either the Σ output of Σ data selector 218 or the delayed A register 211 output or the delayed B register 212 output. Data selector 221 selects the input to the C register as either the Σ output of Σ data selector 218 or the delayed C register 213 output. Jump condition latch circuit 192 is loaded with the carry-borrow output of adder 217.

A register 211, B register 212 and C register 213 each provide dynamic recirculating storage for thirteen decimal or hexadecimal digits in the present embodiment. Adder 217, U data selector 215, V data selector 216, Σ data selector 218, A data selector 219, B data selector 220 and C data selector 221 provide means for arithmetic and logical modification of the contents of registers 211, 212 and 213 by synchronous operation of selector and adder controls which is henceforth described in detail in the section describing control block 202.

Referring to FIG. 4, the contents of data block 204 is illustrated with respect to 1-bit status or FLAG element storage and operation. The coupling of the functional elements is indicated by interconnects 230. Two 12-bit registers FA register 226 and FB register 227 provide means for storage of status or FLAG information. The outputs of FA register 226 and FB register 227 are delayed by 1-bit by means of dynamic shift register elements 228 before being input to FLAG operation logic unit 229. The A and B outputs of FLAG operation logic unit 229 are coupled to FLAG registers 226 and 227. Operations of FLAG operation logic unit 229 include recirculation, set, reset and toggle of individually addressed FLAGs; and, exchange and compare of FA and FB pairs of FLAGs. Controls SUB, FFLG, RFLG, SFLG, SLAG, and XFLAG are generated to perform the desired operation on a particular addressed FLAG or pair of FLAGs. The operation compare FLAG and the operation test FLAG result in an output from FLAG operation unit 229 to condition circuit 192. The control mechanism for these FLAG operations are henceforth described in detail in the section describing control block 202 below.

CONTROL BLOCK 202

The functions of control block 202 are to accept instruction words from program control block 201, interpret the instruction word and a condition flip-flop as a command word for a subsequent instruction cycle and decode certain controls which operate data selectors and logic units in data block 204, program block 201 and output block 205.

The basic command word format and instruction map are illustrated in FIG. 5. Referring to FIG. 5, I-bit 230 distinguishes jump from non-jump instructions. When I-bit 230 is a logical 0, then the instruction is a jump instruction and M-bit 231 distinguishes between true and false conditional jumps while the remaining bits of M field 232, S field 233, R field 234 and Σ field 235 contain the absolute address associated with the jump. When the instruction is a jump instruction (as indicated by a logical 0 being in the I-bit), but the jump condition is not satisfied, then ordinary incrementation of the program counter is effected. When the I-bit is a logical 1, then either a register or a FLAG operation is decoded; the entire M field 232 is used to distinguish register from FLAG operations as detailed in TABLE I below. When the binary code contained in M field 232 is between 0 and 9, a register operation is decoded; when the binary code contained in M field 232 is between 10 and 15, a FLAG operation is decoded.

In the case of register operations, the 10 codes M = 0 through M = 9 are used to select one of 6 digit masks in combination with one of 3 constant values (N). The assignment of the 6 masks and 3 constants depends upon the desired data word format. The selections shown in TABLE I are utilized in the programming of a floating point decimal calculator function in accordance with the present invention.

In the case of the FLAG operation, the 6 codes M = 10 through M = 15 are used to distinguish 6 FLAG codes, that is, compare, exchange, set, reset, toggle and test.

S-bit 233 of the command word controls three functional elements in data block 204. S-bit 233 distinguishes add from subtract in binary or BCD adder 217, distinguishes left shift from right shift in the Σ shift logic and distinguishes A from B in the FLAG operation logic. Add, shift and FLAG operations are exclusive operations and therefore require no further decoding. R field 234 distinguishes among arithmetic, exchange and keyboard input instructions as described in conjunction with TABLE II below. When the binary value contained in R field 234 is between 1 and 5, an arithmetic operation is indicated and U data selector gate 215 and V data selector gate 216 are controlled to enable the variables indicated in TABLE II as inputs to adder 217. When the binary value contained in R field 234 is equal to 6, an exchange of A and B, without digit masking is enabled, bypassing adder 217 and the Σ gate 218. When the binary value contained in R

TABLE I

| M | MASK (REGISTER) | N (REGISTER) | FLAG OPERATION |
|---|---|---|---|
| 0 | ALL | | |
| 1 | EXPONENT | | |
| 2 | MANTISSA | | |
| 3 | LSD | 1-LSD | |
| 4 | MANTISSA | 1-LSD | |
| 5 | MANTISSA | 1-MSD | |
| 6 | EXPONENT | 1-EXPONENT | |
| 7 | DPT | 1-DPT | |
| 8 | DPT | 8-DPT | |
| 9 | EXPONENT | 8-EXPONENT | |
| A | | | COMPARE |
| B | | | EXCHANGE |
| C | | | SET |
| D | | | RESET |
| E | | | TOGGLE |
| F | | | TEST |

TABLE II

| R | ARITHMETIC U | ARITHMETIC V | EXCHANGE A,B |
|---|---|---|---|
| 0 | | | |
| 1 | A | N | |
| 2 | 0 | B | |
| 3 | C | N | |
| 4 | A | B | |
| 5 | C | B | |
| 6 | | | A—B |
| 7 | | | |

TABLE III

| Σ | DATA SELECTORS A | B | C |
|---|---|---|---|
| 0 | A | B | C |
| 1 | Σ | B | C |
| 2 | A | Σ | C |
| 3 | A | B | Σ | field 234 is 0 or 7, then an arithmetic no-op (no operation) is indicated, providing means for implementation of a special class of instructions for keyboard synchronization and encoding.

Σ field 235 determines the selection of the output from Σ data selector 218 to A register 211, B register 212, C register 213 or none of these Σ data selector outputs. As shown in TABLE III, three codes are decoded to enable the output of Σ data selector 218 to be input to A register 211, B register 212 and C resister 213; and the fourth code provides means for a no-op code to enable a class of keyboard synchronization and encoding instructions.

Condition circuit 192 reflects the status of the calculator at any given point in the execution of its fixed program. It is combined with the contents of Ma-bit 231 to determine if a jump instruction is to be executed or skipped. Condition circuit 192 is loaded with a carry-borrow (C/B) result of an arithmetic operation, the contents of any FLAG test or comparison (FA:FB) of any pair of FLAGs with a common (FMSK) address, the scanned conductance (closed equals 1) of key matrix cross-points of the keyboard switches in normal scanning sequence, or the value of a particular digit scanner state, for example, D11.

The carry-borrow and FLAG inputs to the condition circuit provide means for convenient branch operations whereby the sequential program execution can be made dependent on results of data, on arithmetic register operations, and on the current status of the calculator system as indicated by any of a plurality of status memories (FLAGs) as for example in the illustrated embodiment in which 26 FLAGs are available.

The key matrix and digit scanner inputs to the condition circuit provide means for convenient and efficient synchronization and encoding under program control of a plurality of keyboard inputs, as for example in the present illustrated embodiment, 44 inputs are available. TABLE IV shows the coding and operation of these instructions. The WAIT operations provide control means to recirculate program counter (PC) 209 at its current value (not incremented) until the WAIT condition (D11, KN, or KP) is satisfied. In addition, a register operation which subtracts the numeral 1 from the mantissa of A register 211 can be associated with the D11 WAIT condition and is associated with the KN and KP WAIT condition instructions. The logical shift and FLAG initialization instructions are also shown in TABLE IV.

TIMING BLOCK 203

Figure 6:
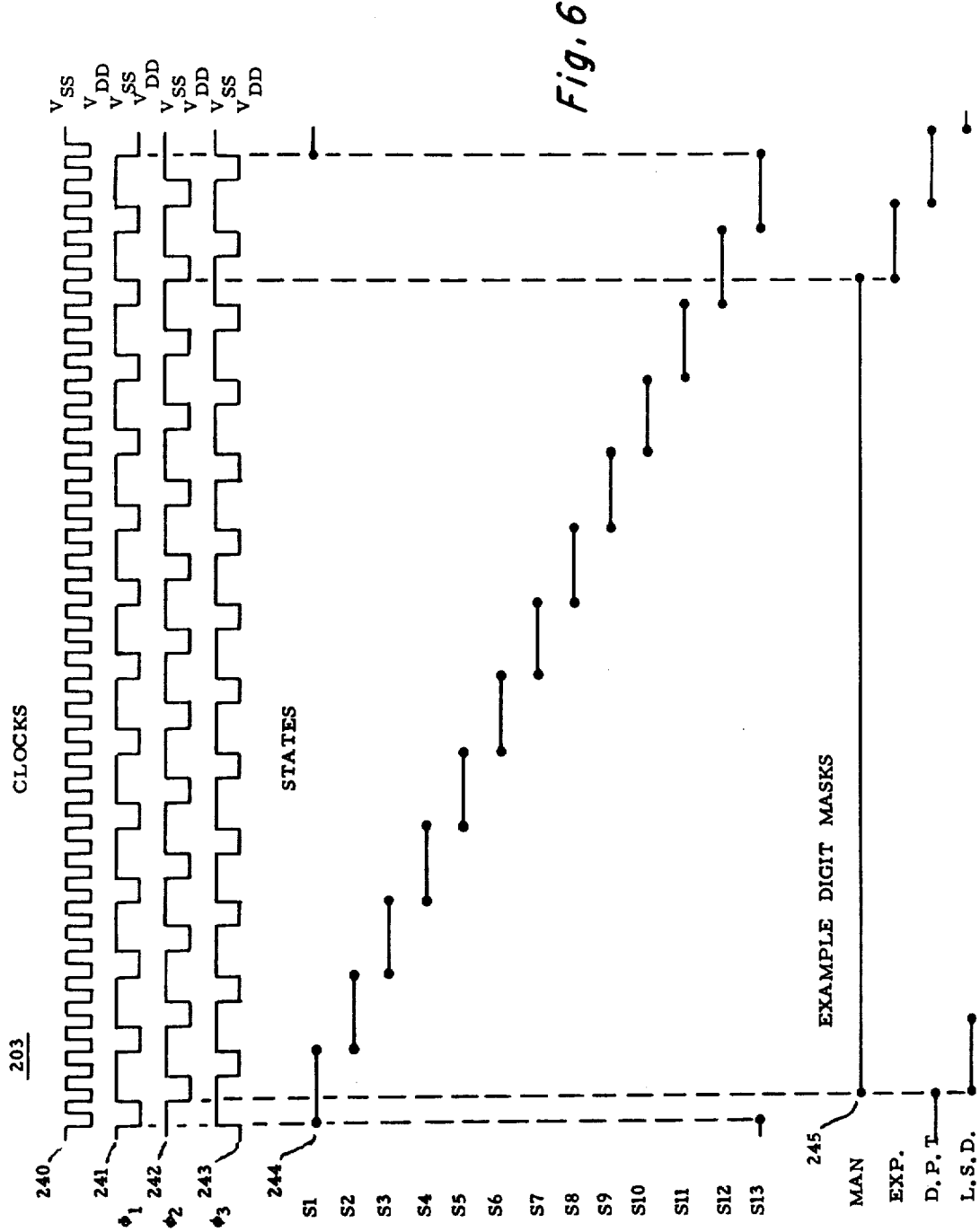
FIG. 6 is a graph illustrating the basic instruction cycle timing for the calculator system.

The function of the subsystem within timing block 203 is to generate three phase internal clocking (internal being within the monolithic structure of the preferred MOS embodiment) from an external single phase oscillator voltage, generate internal state and digital timing based upon the clocking inputs and provide digit and FLAG masking decoders. The basic instruction cycle timing for the calculator is illustrated in FIG. 6. The $\phi$ system timing input 240 is a square wave provided by an oscillator with approximately 50% duty cycle. The 3 internal clocks $\phi_1$, $\phi_2$ and $\phi_3$ provide signals 241, 242 and 243, respectively, which are derived from the $\phi$ system clock by means of a recirculating ring counter. With binary coded decimal parallel arithmetic utilized in accordance with the present invention, each digit of add or subtract calculation utilizes one full set of clock pulses $\phi_1$, $\phi_2$, and $\phi_3$. The full set of clock pulses is considered a state; consider for example the first state S1 with a corresponding signal 244. There are 13 such states S1–S13 corresponding to the 13 digit circulation of registers 211–213 in data block 204. The 13 states are generated by means of a feedback shift counter. Although the 13 states and 13 digit registers will allow storage of 13-digit numbers, a generalized floating point notation which is more convenient from the standpoint of program storage and manipulation of data is utilized in accordance with the present invention. This is accomplished by the masking or sub-addressing of registers 211–213 to mask or isolate 6 particular fields as follows: Mantissa field 245 which has N digits, the first of which is the least significant digit (LSD), the last of which is the overflow digit (OVF) and the (N-1)th digit of which is the most significant digit (MSD); masks are thus provided for the mantissa, the LSD, the MSD and the OVF. There is also provision for an exponent (EXP) mask and a display (DPT) mask. These 6 masks are generated in the digit mask decoder as commanded by the M mask field 232 of the instruction word. In accordance with the present invention, the masks are

TABLE IV

| I | M | S | R | Σ | WAIT COND. | REGISTER ARITHMETIC | JUMP COND. | CLEAR FLAGS |
|---|---|---|---|---|---|---|---|---|
| 1 | 0 | 0 | 7 | 0 | D-11 | | | |
| 1 | 0 | 0 | 0 | 0 | D-11 | $A-1 \rightarrow A_M$ | | |
| 1 | 0 | 1 | 0 | 0 | KP | $A-1 \rightarrow A_M$ | | |
| 1 | 1 | 0 | 0 | 0 | KN | $A-1 \rightarrow A_M$ | | |
| 1 | 1 | 1 | 0 | 0 | | | KOvKN | |
| 1 | 1 | 0 | 0 | 0 | | | KQ | |
| 1 | 0 | 0 | 1 | 1 | | SLL(A) | | |
| 1 | 1 | 0 | 2 | 2 | | SLL(B) | | |
| 1 | 2 | 0 | 3 | 3 | | SLL(C) | | |
| 1 | 0 | 1 | 1 | 1 | | SRL(A) | | |
| 1 | 1 | 1 | 2 | 2 | | SRL(B) | | |
| 1 | 2 | 1 | 3 | 3 | | SRL(C) | | |
| 1 | 13 | 0 | 3 | 1 | | | | FA |
| 1 | 13 | 1 | 3 | 1 | | | | FB | individually adjustable so that variable functioning systems can be accommodated within the calculator system. In the MOS embodiment, variations of the masks are effected by varying the gate oxide mask during the fabrication process to change the calculator operation. One variation for example, would be to set up one or more of the 6 masks to cover two digits and controlling the adder circuit in the data block to operate in hexadecimal as opposed to binary coded decimal thereby allowing for the processing of 8-bit binary characters by the calculator system.

In addition to the digit mask provisions, a subsystem of timing block 203 controls the addressing of FLAGS. The addressing of FLAGs is essentially a one out of thirteen selection and is accomplished by the FLAG mask decoder.

Figure 7:
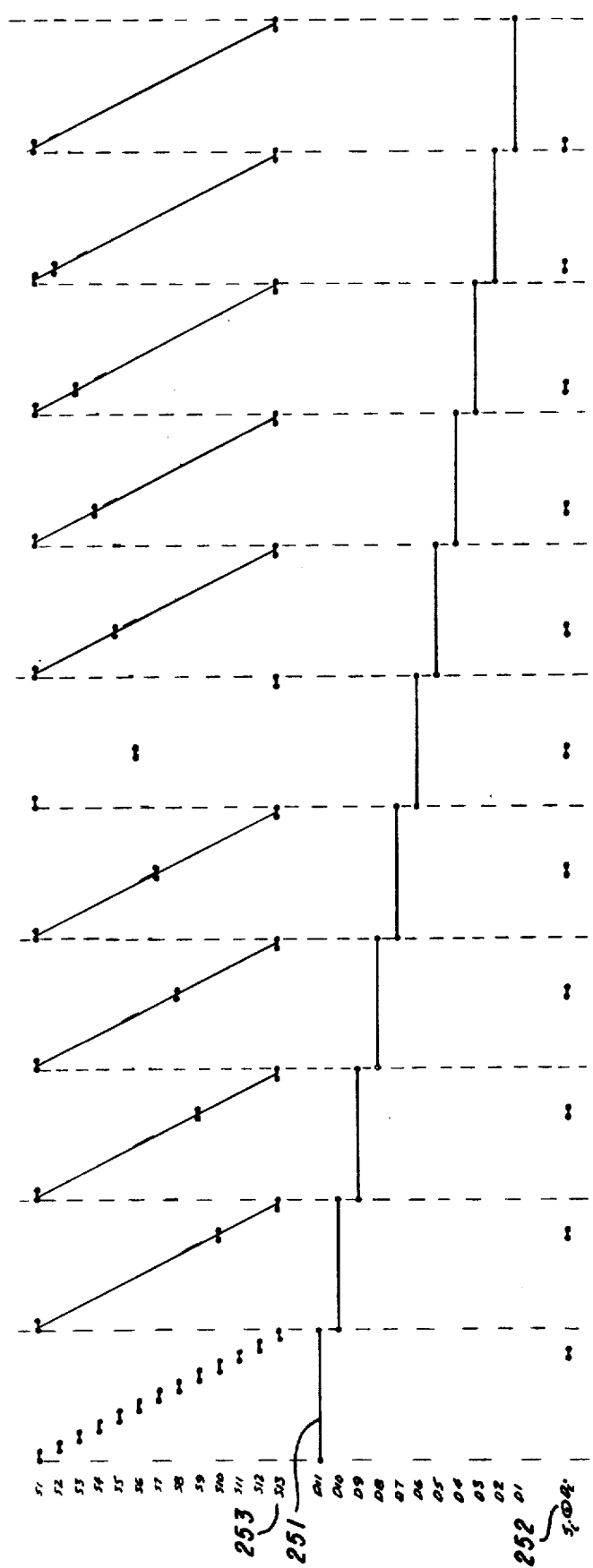
FIG. 7 is a graph representing the scan cycle timing for the keyboard and display scan and relates the scan cycle to the instruction cycle timing period.

FIG. 7 illustrates the scan cycle timing for the keyboard and display scan and relates the scan cycle to the instruction cycle timing period. In accordance with the present embodiment of the invention both the keyboard inputs and display outputs are scanned with the same scan signals. In this manner, the number of pins required to package the system as a monolithic integrated semiconductor structure are reduced to a minimum and the internal system logic is simplified. It is desirable to scan at a rate which is slow enough to be consistent with conventional displays such as a neon tube display in addition to, for example, a liquid crystal display and simultaneously to calculate at a very high rate. Hence, the scanner of the present invention operates by nesting multiple instruction cycles within a scan cycle. In the illustrated embodiment there are 11 scan signals which are sufficient for a 10 digit numeric display plus a 1 digit control display such as an error (E) signal or minus (−) sign. This also allows very efficient coding of the keyboard entry routine. During each digit time, for example, D11 with logic 1 signal 251, 1 digit of a particular register is synchronously decoded. In order to retrieve the various digits of a particular register in sequence the output decoder is double buffered. The input of the buffer is clocked on the state 252 which corresponds to the (equivalence: $S_i \odot D_j$). The output is clocked on a fixed state, for example, signal 253 of state S13, synchronous with the digit scan cycle. In this manner, during a digit scan cycle, each digit from the registers is recovered in sequence and synchronously displayed. The digit counter is itself clocked by a particular state, for example, state S13 and operated by a feedback shift counter similar to the state feedback shift counter. In the present embodiment, the digit feedback shift counter counts down modulo 11 whereas the state counter counts up modulo 13. In this manner the real-time most-significant-first scan which results provides means for implementation of zero suppression logic in the display.

Figure 8:
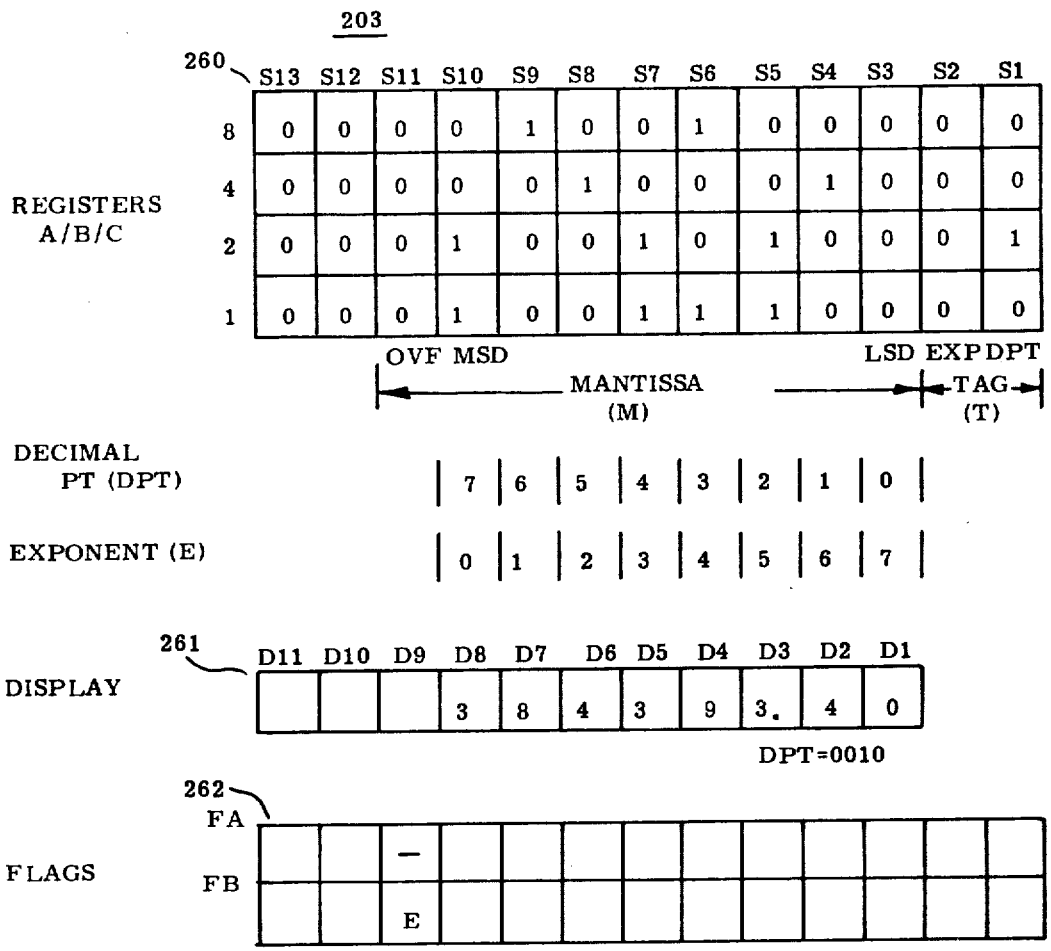
FIG. 8 is a representation of the data format for the A register, B register, C register, FA FLAG register, FB FLAG register and display.

The exemplified digit masks discussed with respect to FIG. 6 are further clarified in FIG. 8. FIG. 8 illustrates the data format for A register 211, B register 212, C register 213, FA FLAG storage element 226, FB FLAG storage element 227, and the display. A numeric example is shown in the register format 260 in order to clarify the operation of the digit masks. In the example, the decimal points (DPT) is shown equal to 2. Therefore, in display format 261, the decimal appears at the $D_3$ location. The mantissa field is shown in the example for an 8 digit calculator system to exist between S11 and S3.

Although there is no rigid requirement for the FLAG format 262, in the present embodiment it is convenient to dedicate FA FLAG storage element 226 and FB FLAG storage element at S11 mask or time-address to storage of the minus (−) and error (E) FLAGS for the display. In this manner the logic of segment decoder 198 and hence of output block 205 is greatly simplified.

Finally, the subsystem of timing block 203 includes the key input logic. The function performed by this logic is buffering and synchronization to the internal instruction cycle. In accordance with the present calculator system no provision need be made in hardware to defeat transient noise, mechanical key bounce or double key entry; each of these functions are included as fixed program routines.

PROGRAM BLOCK 201

As illustrated in FIG. 2, the subsystem of program block 201 is comprised of read only memory (ROM) 208 and program counter (PC) 209. Read only memory 208 functions as a storage means for a linear program list which in the present embodiment contains 320 11-bit instruction words to provide the fixed programs which perform the particular calculator functions. Various embodiments of the calculator system are therefore provided by providing various combinations of programs in read only memory 208. Read only memory 208 may be programmed in accordance with the techniques described in U.S. Pat. No. 3,541,343 to R. H. Crawford et al, titled Binary Decoder. The programs may include keyboard input routines, internal format routines, internal calculation routines and display format routines. Specific programs utilized in conjunction with the desk top calculator function of the calculator system of the invention and the programming of the calculator system to perform other functions are described in a later section.

Program counter 209 is, in the present embodiment, a 9-bit dynamic storage register which accepts a new input during each instruction cycle. The new input is either the program count itself, the program count incremented by 1 or 9-bits from the previous instruction word. These three inputs provided WAIT instructions, normal operating instructions, and jump instructions, respectively.

Figure 9:
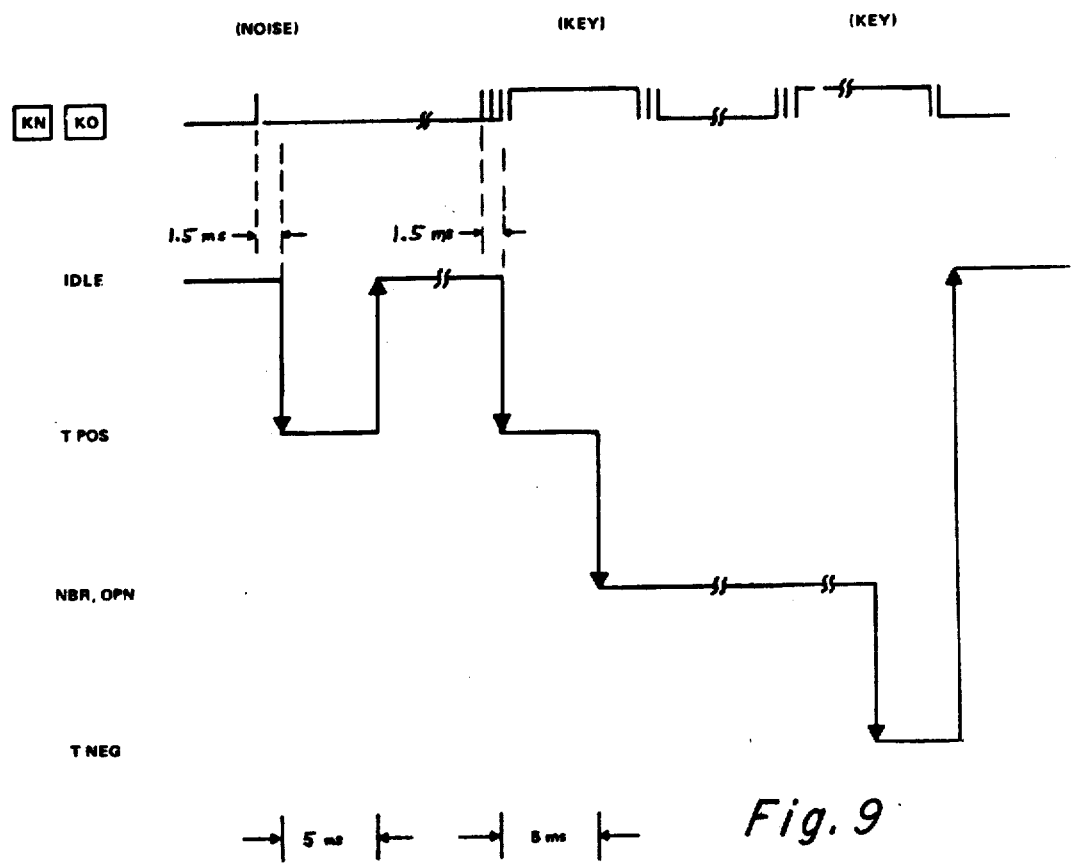
FIG. 9 is a graph representing the keyboard program timing showing that the input-sensing program provides protection against transient noise, double-entry, leading-edge bounce and trailing-edge bounce.

One function of program block 201 is to provide a defeat mechanism by which malfunction of the keyboard encoding procedure is prevented. The input-sensing program provides protection against transient noise, doubleentry, leading-edge bounce, and trailing-edge bounce, as shown in FIG. 9. An 'IDLE' routine sequentially scans the [KO], [KN] and [KQ] inputs until a non-quiescent input is detected. The input is sampled again 2.5 ms later by a "TPOS" routine to distinguish a valid key-push from the transient noise. If the test is positive, then (5 ms after the initial detection) the program jumps to a 'NBR' or 'OPN' entry routine; otherwise, it returns to the 'IDLE' routine. The 'NBR' routine enters the number which is keyed-in into the display register; 'OPN' performs the keyed-in operation. Both routines terminate in a jump to a 'TNEG' routine. 'TNEG' performs a scan of the [KN], [KO] and [KQ] inputs to determine that the entire keyboard is in its quiescent condition. After a successful (negative) test the program jumps back to the 'IDLE' routine.

Figure 10:
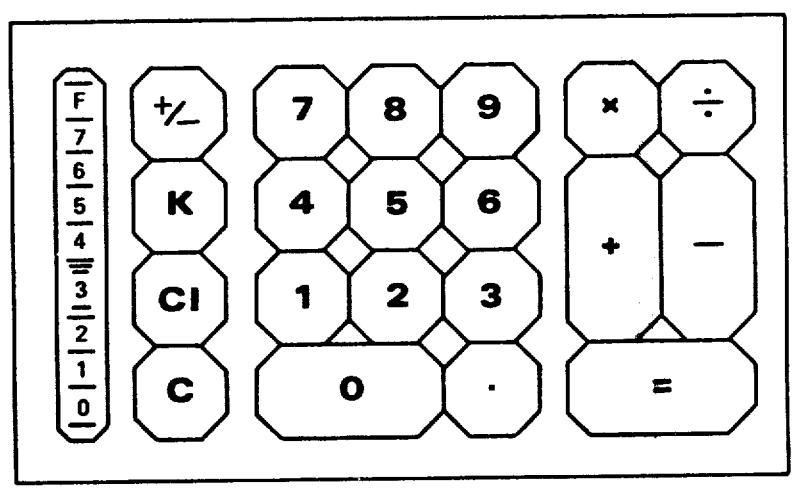
FIGS. 10 and 11 are planar diagrams showing exemplary calculator keyboards utilized in conjunction with the present calculator system.
Figure 11:
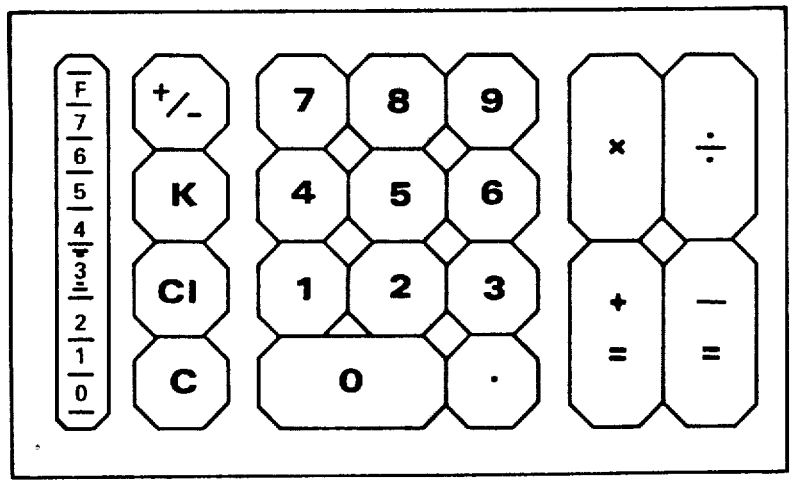

Five classes of keyboard inputs and consequent program routines are utilized in order to perform calculations and/or logic functions with the Calculator System, as follows: Number Keys, Mode Switches, A Decimal Point Switch, Operation Keys, and Interlock Keys. The distinctions between "keys" and "switches" is that keys are operated momentarily and exclusively, whereas switches are generally static and may have a normally-closed position. The program classes are explained by way of example; examplary Calculator Keyboards using these keys are shown in FIGS. 10 and 11.

Number Keys: There are ten numeric keys and a decimal point key. Operation of the [0], [1], [2], [3], [4], [5], [6], [7], [8], and [9] keys left-shifts the display register one digit and enters the corresponding number into the least-significant digit. The [.] key is operated in normal sequence of figure entry. If it is not used, the point is assumed to be after the last numeric entered. The entry mode is always floating.

Mode Switches: The constant switch [K] selects between chain operation and constant operation. Normal operation of the calculator, with the constant key [K] up (open) allows chained calculations without loss of intermediate results. Alternative operation with [K] down (closed) allows constant operand operation.

Point Switch: Floating or fixed mode of operations is selected by an 11-position switch [F]-[9]-[8]-[7]-[6]-[5]-[4]-[3]-[2]-[1]-[0]. Positions [0] through [9] are used for fixed-point calculation results; the [F] position selects full-floating operation.

Operation Keys: With 10 Number Keys, 2 Mode Switches, 11-position Point Switch, and 44 Matrix Crosspoints, there remains space for a total of 21 possible operation keys. These key locations are sufficient to include the two main keyboard configurations illustrated in FIGS. 10 and 11. [+] Stores an addition command and performs a possible preceding operation; [−] stores a subtraction command and performs a possible preceding operation; [X] stores a multiplication command and performs a possible preceding operation; [÷] stores a division command and performs a possible preceding operation; [+/−] changes the sign of the display register; [=] performs the preceding operation and stores a command to clear at the next number entered; [=] enters the last keyed-in number in the calculator and performs a possible preceding operation; [=] enters the last keyed-in number in the machine as a negative number; [C] clears all three registers and any preceding operation; [CI] clears the display register.

Interlock Key routines are functional hybrids of (momentary) operation keys and (static) mode switches. They provide a mechanism for interlocking the operation of the Calculator System to the operation of other devices. In particular, the Calculator System may be programmed for at least three additional types of applications by the operation of Interlock Key routines, as follows: the Calculator System (master) controlling of a Slave device (e.g., print mechanism or print control circuit); slave operation of the Calculator System by a Master Device (e.g., a remote controller through a real-time communication medium); and multiprocessing by a plurality of Calculator Systems of the present invention according to a preprogrammed interlock routine for determination of priority and effecting of intercommunication.

OUTPUT BLOCK 205

In the described embodiment of the Calculator System, twenty-two outputs are provided to perform display and keyboard scanning, and synchronously decode the contents of the display register.

Figure 12:
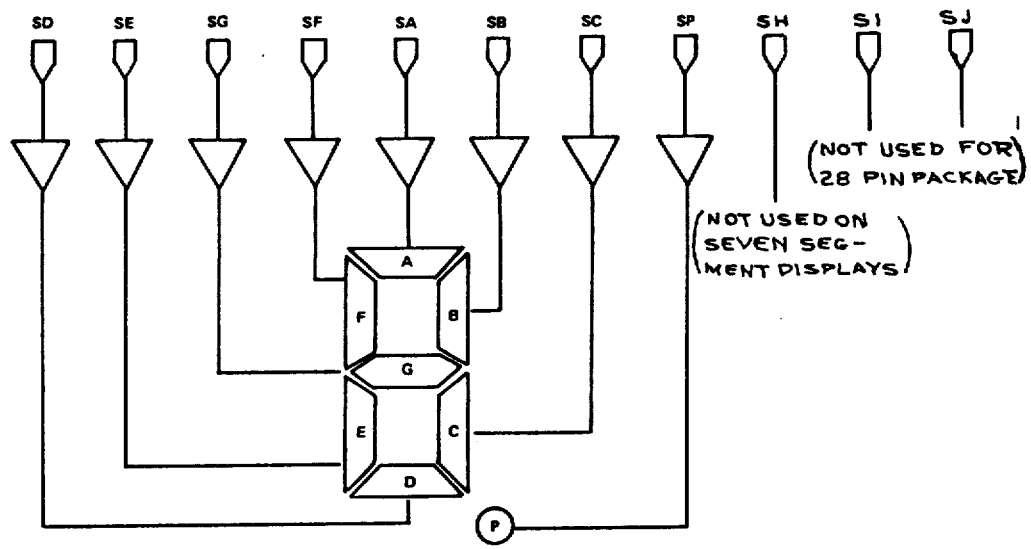
FIG. 12 is a circuit diagram of the display element showing the input and output connections to the digit scanning circuits.

Referring to FIG. 12, the Digit Driver (D1, D2, D3, D4, D5, D6, D7, D8, D9, D10, D11) outputs of digit decoder 195 are used to scanencode the keyboard and to scan the display. An inter-digit blanking signal is gate-mask programmed to disable the digit drivers for interface to particular display devices. The polarity of the digit signals is positive; that is, during Di, Di is conducting to VSS. This is provided in the described MOS calculator system embodiment in order to effectively scan the keyboard matrix.

The Segment Driver (SA, SB, SC, SD, SE, SF, SG, SH, SI, SJ, SP) outputs of the segment decoder 198 are gate-mask programmed for direct compatibility with 7- and 8-segment (plus decimal point) displays. In addition to segment code, both inter-digit blanking and segment polarity can be selected. Thus, the inter-digit blanking signal is programmable in increments of 12 microseconds (nominal); and it can be applied to either digit drivers or segment drivers, or both. The leading zeros (high-order zeros before the decimal point or a non-zero figure) are suppressed by disabling all segment drivers.

Figure 13:
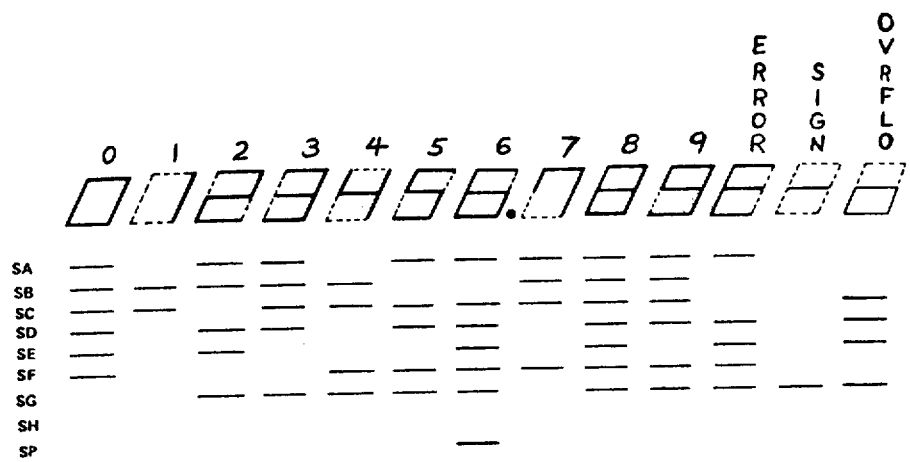
FIG. 13 is a diagram showing a representative display font of a display utilized in conjunction with an embodiment of the present invention.
Figure 14:
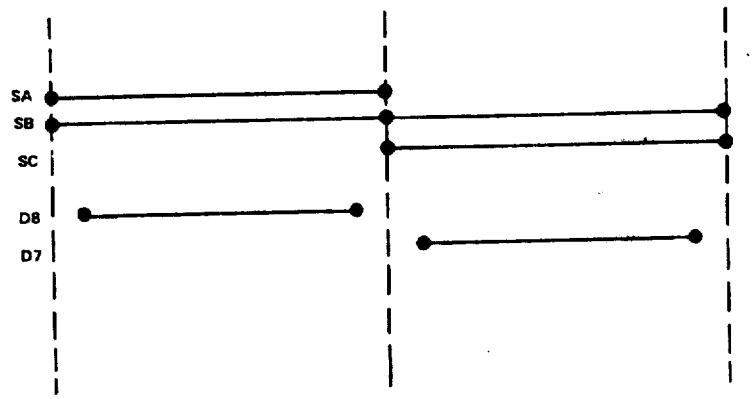
FIG. 14 is a graph showing how the segment drive includes the digit drive of an embodiment of the invention.
Figure 15:
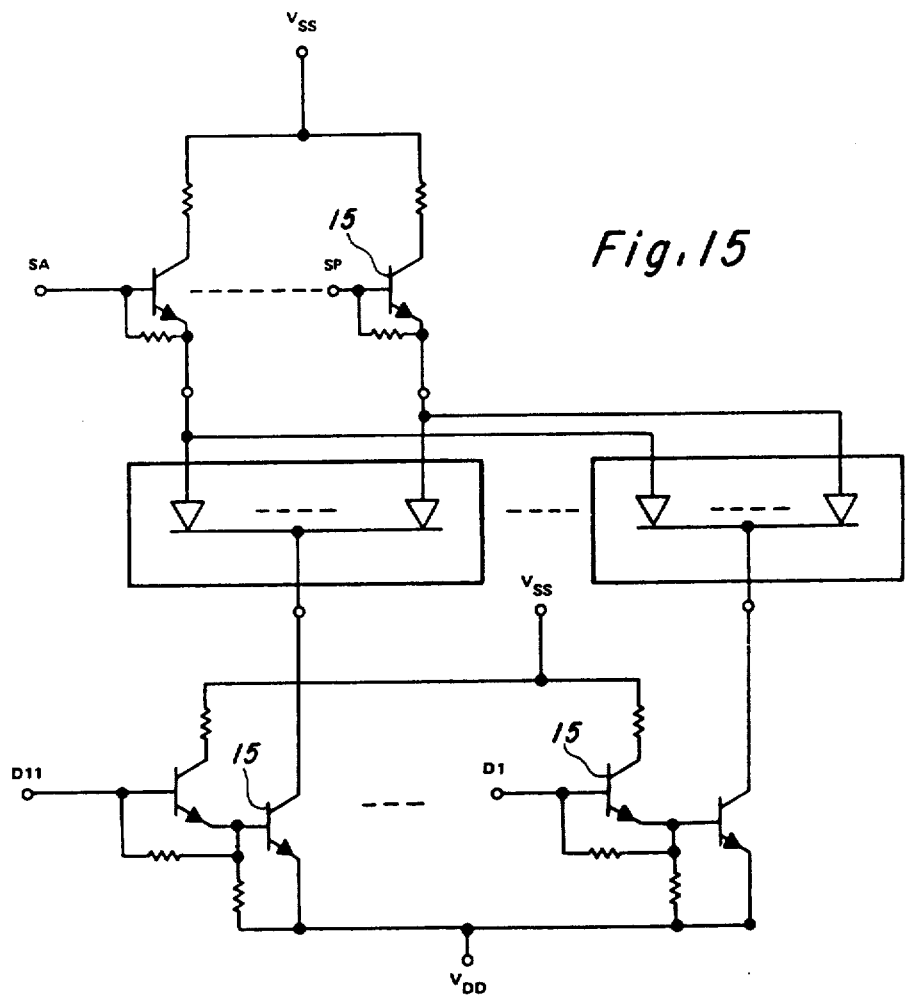
FIG. 15 is a circuit diagram of an interface circuit between the display elements and the scanning circuits in an embodiment of the present invention.

The described Calculator System embodiment digit. and segment decoders have been programmed for a 7-bar digit-blanked characteristic with positive segment decoding (segment A "on" is decoded as SA conducting to VSS). The display front is illustrated in FIG. 13. The complete coding of the numerals, error (E) and minus (−) indications are shown. SH is not used for display but outputs information useful for testing purposes. SI and SJ are available in hardware for use with numeric displays with one terminal (e.g., cathode) per numeral. However, these outputs are not used for segmented displays in order to allow the monolithic integrated semiconductor embodiment of the Calculator System to be placed in a 28-pin packaging. When a clock period is 4 microseconds, for example, the scan rate is 156 microseconds per digit. For example, the present embodiment is programmed for 12-microsecond leading-edge blanking and 12-microsecond trailing-edge blanking on the digit drivers only. Hence, the segment drive covers the digit drive, as illustrated in FIG. 14. An interface circuit which includes bi-polar transistors 15 for a common-cathode 7-bar LED display is shown in FIG. 15. The interface circuit of the present embodiment is fabricated on a separate semiconductor substrate.

Figure 16:
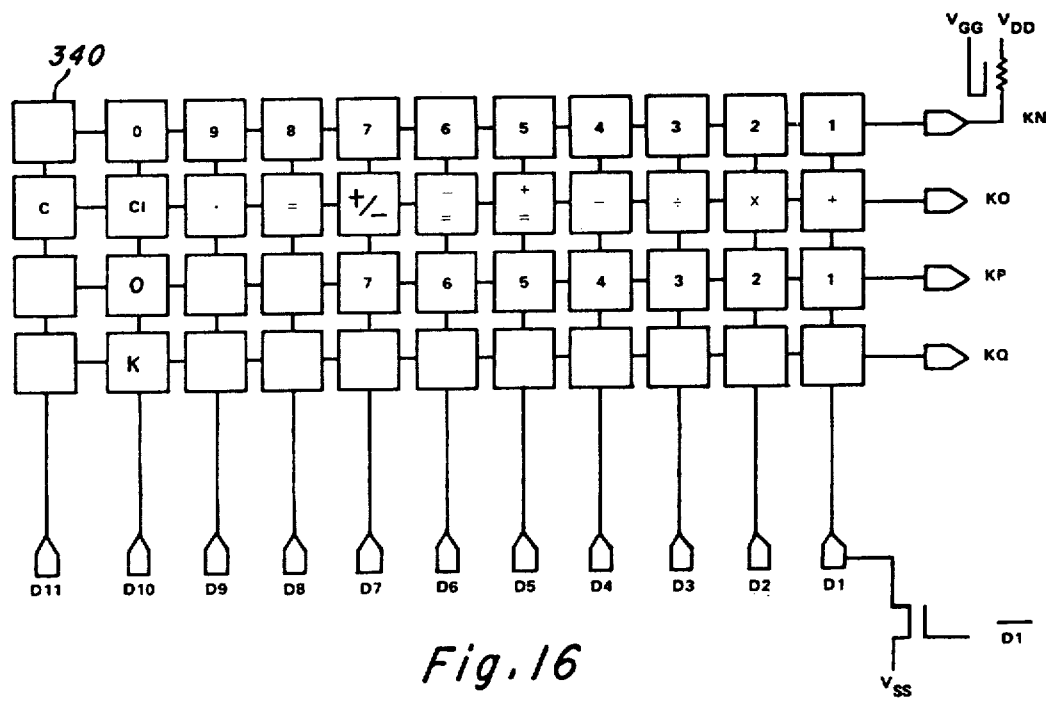
FIG. 16 is a circuit representation of a keyboard utilized in conjunction with the described calculator embodiment including the interconnections to the scanning circuits.
Figure 17A:
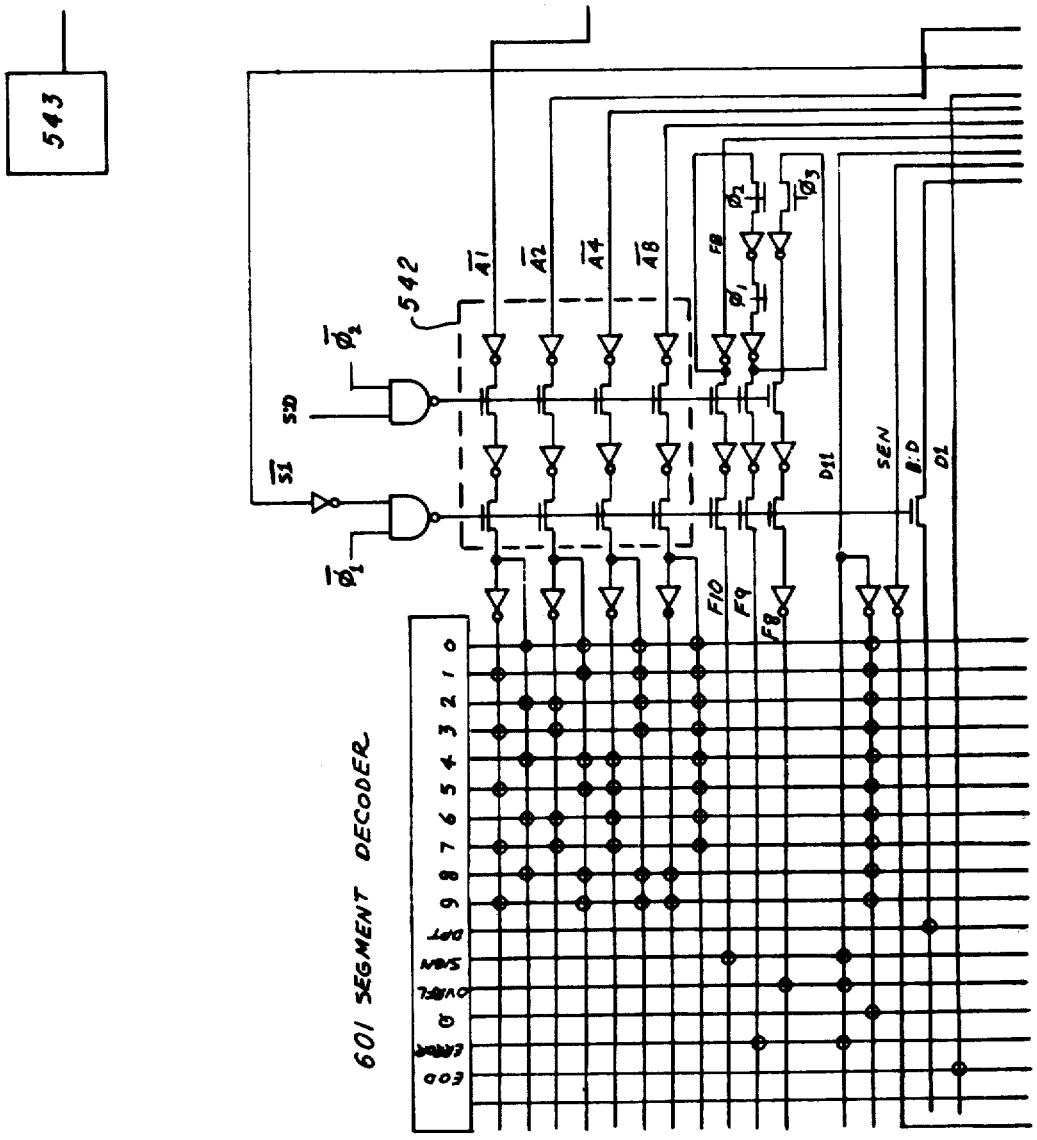
FIG. 17 is a logic and circuit diagram of a metal-insulator-semiconductor embodiment of the calculator system of the invention which is further comprised of FIGS. 17A–Z.
Figure 17B:
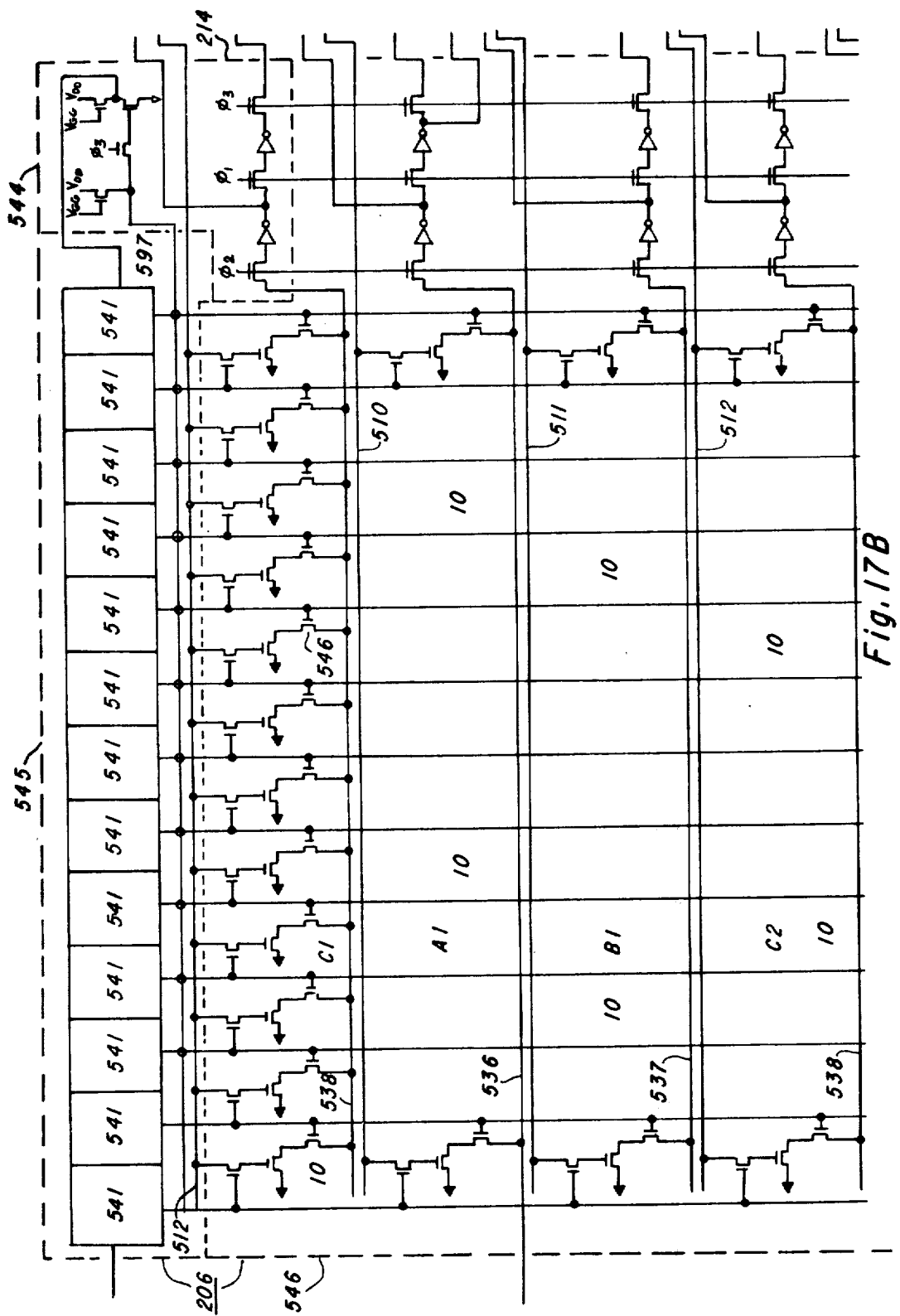
Figure 17C:
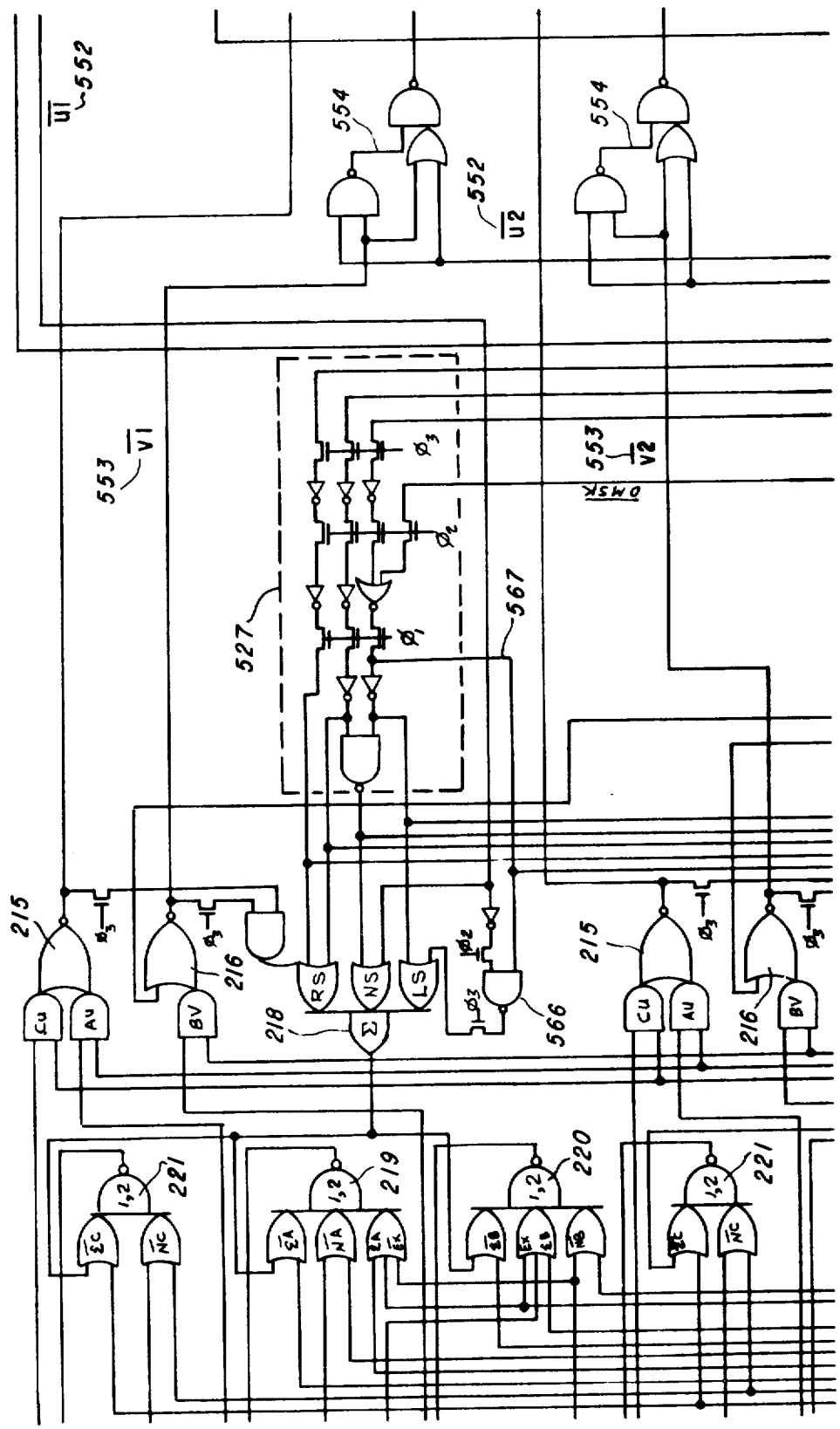
Figure 17D:
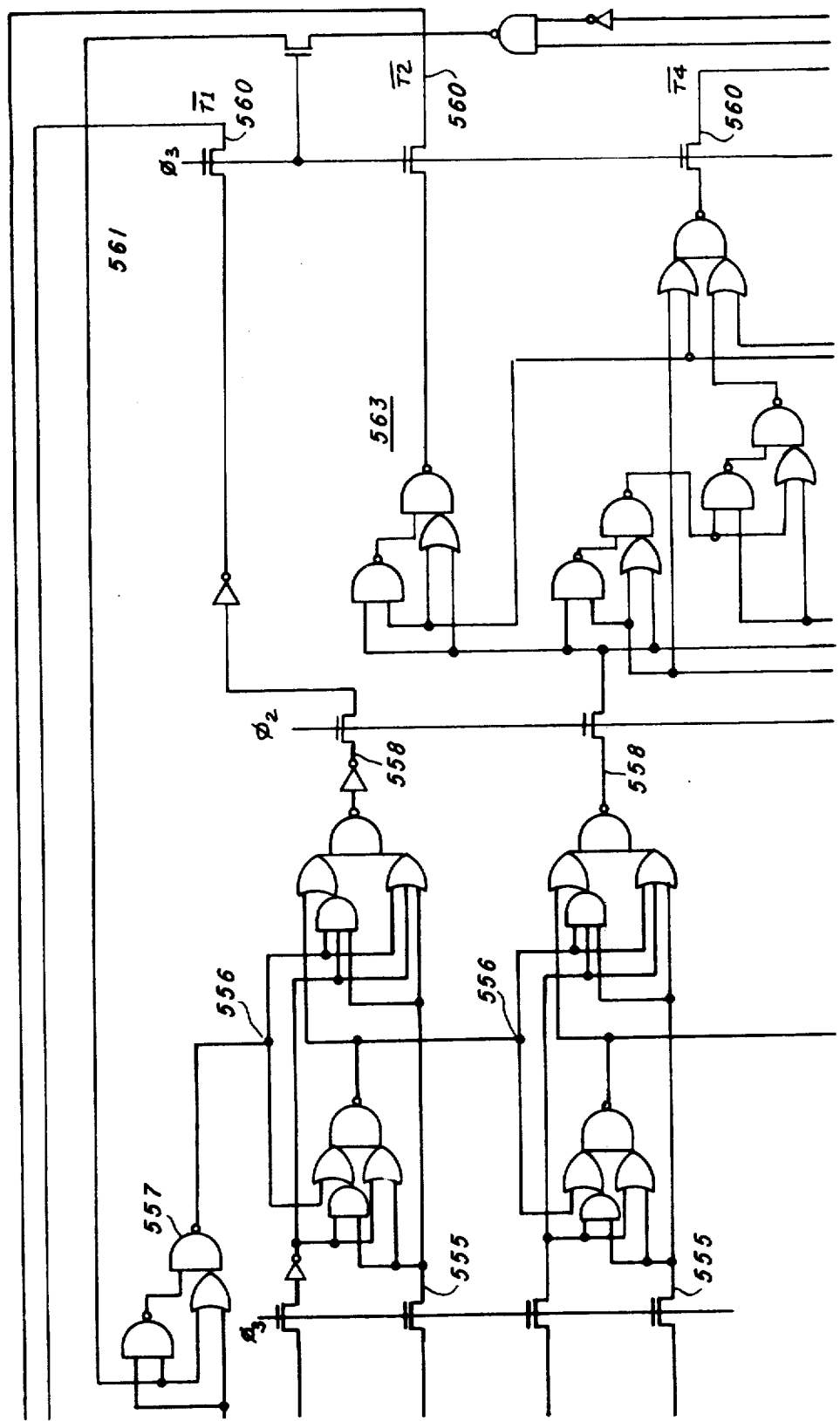
Figure 17E:
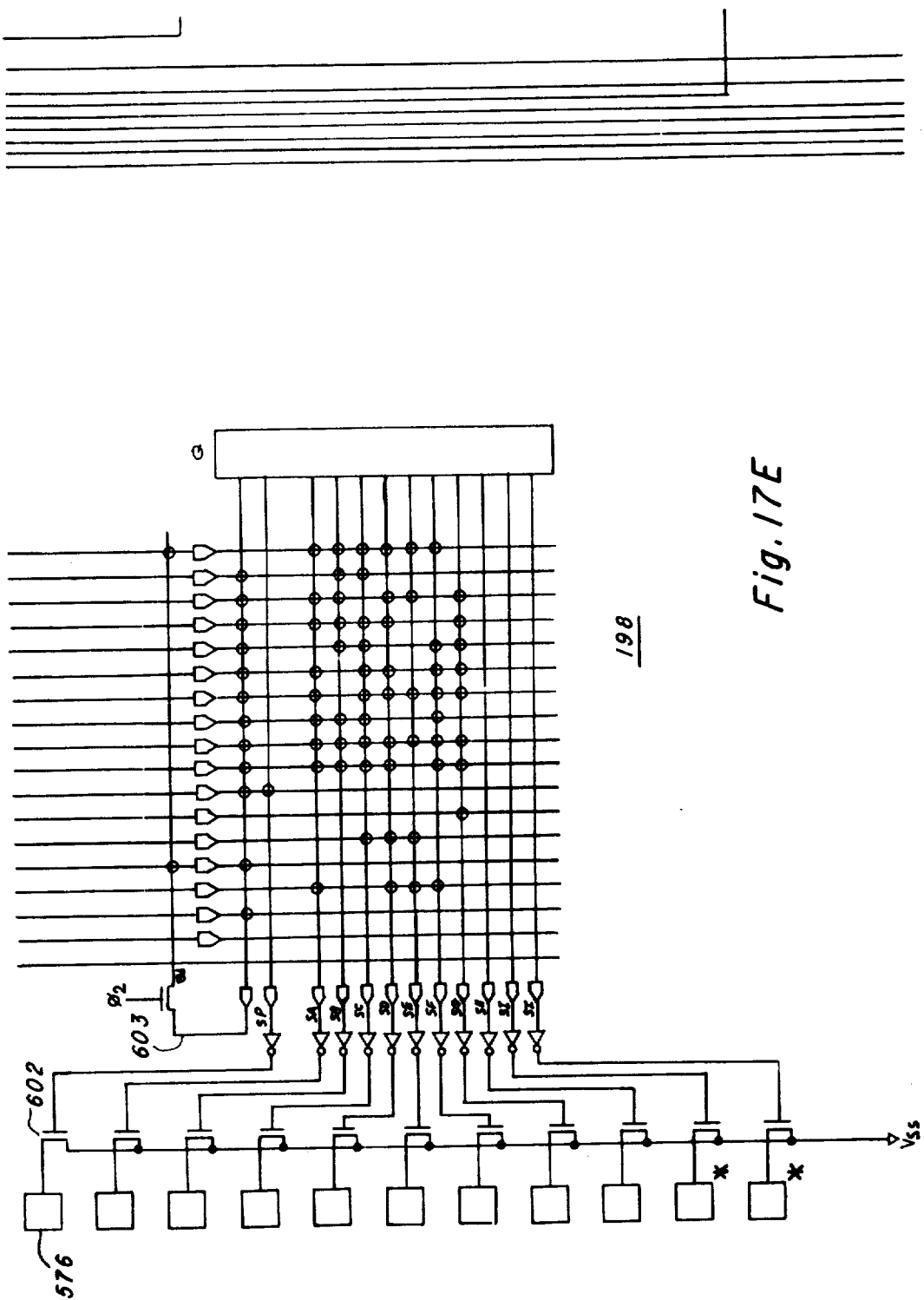
Figure 17F:
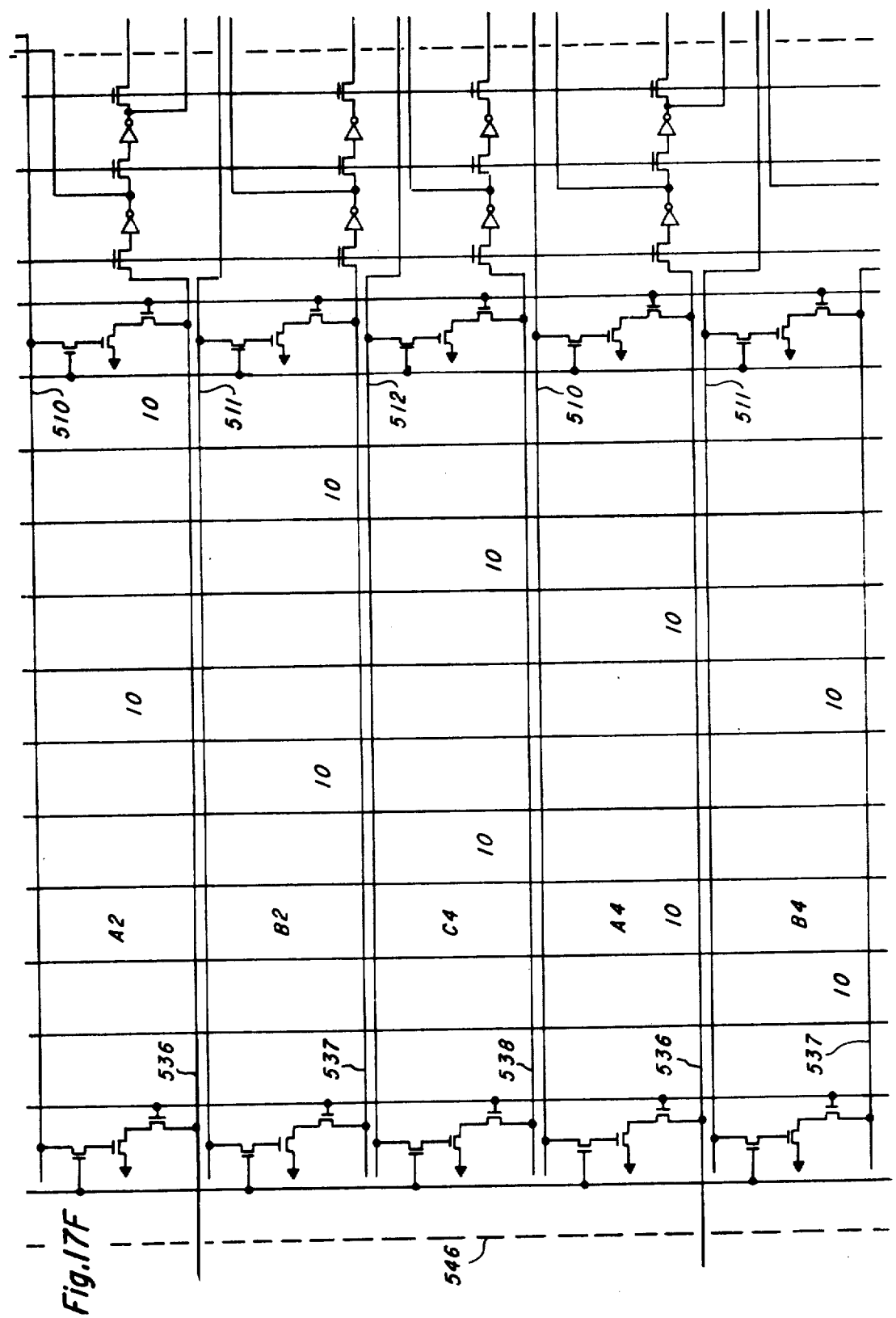
Figure 17H:
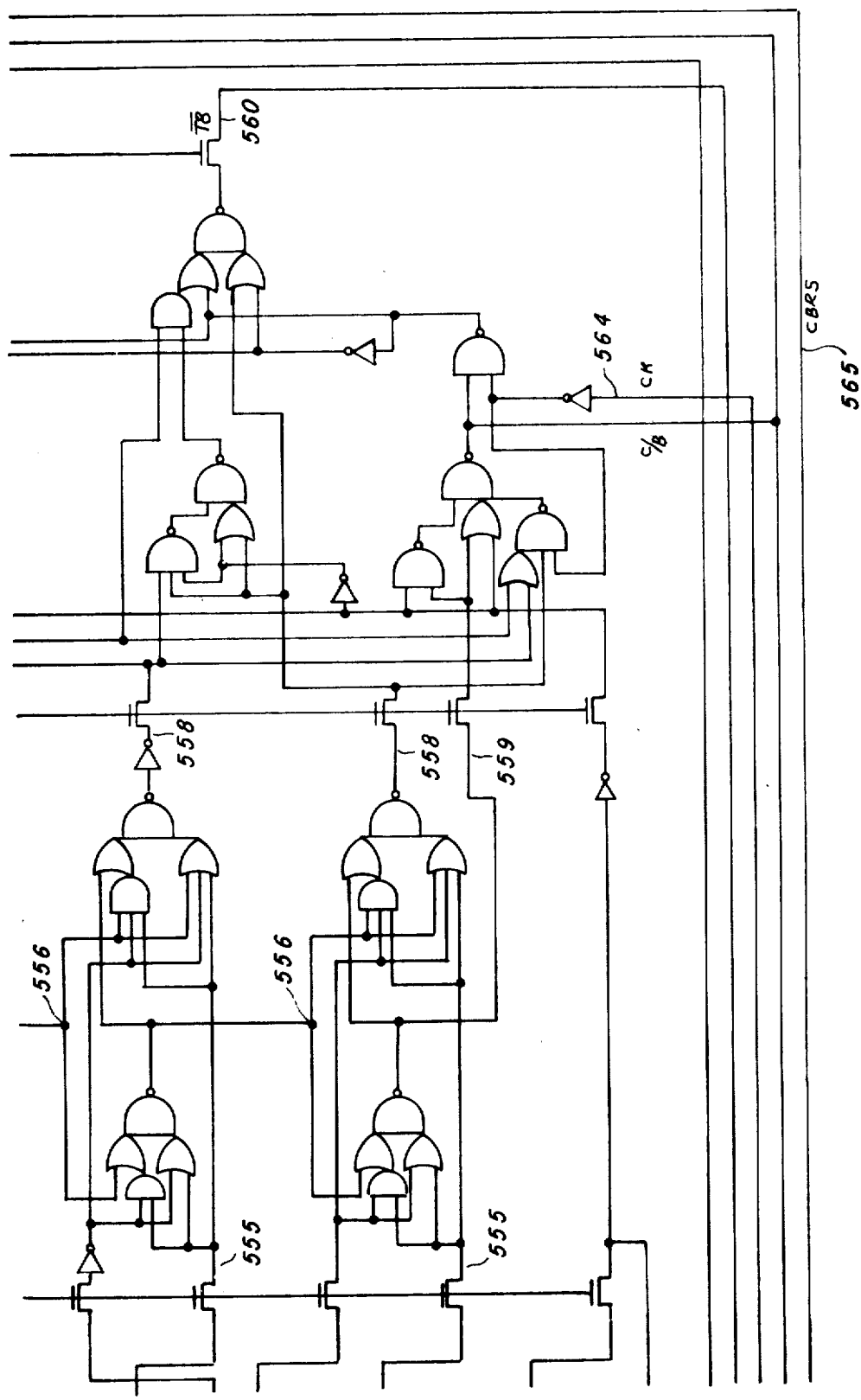
Figure 17I:
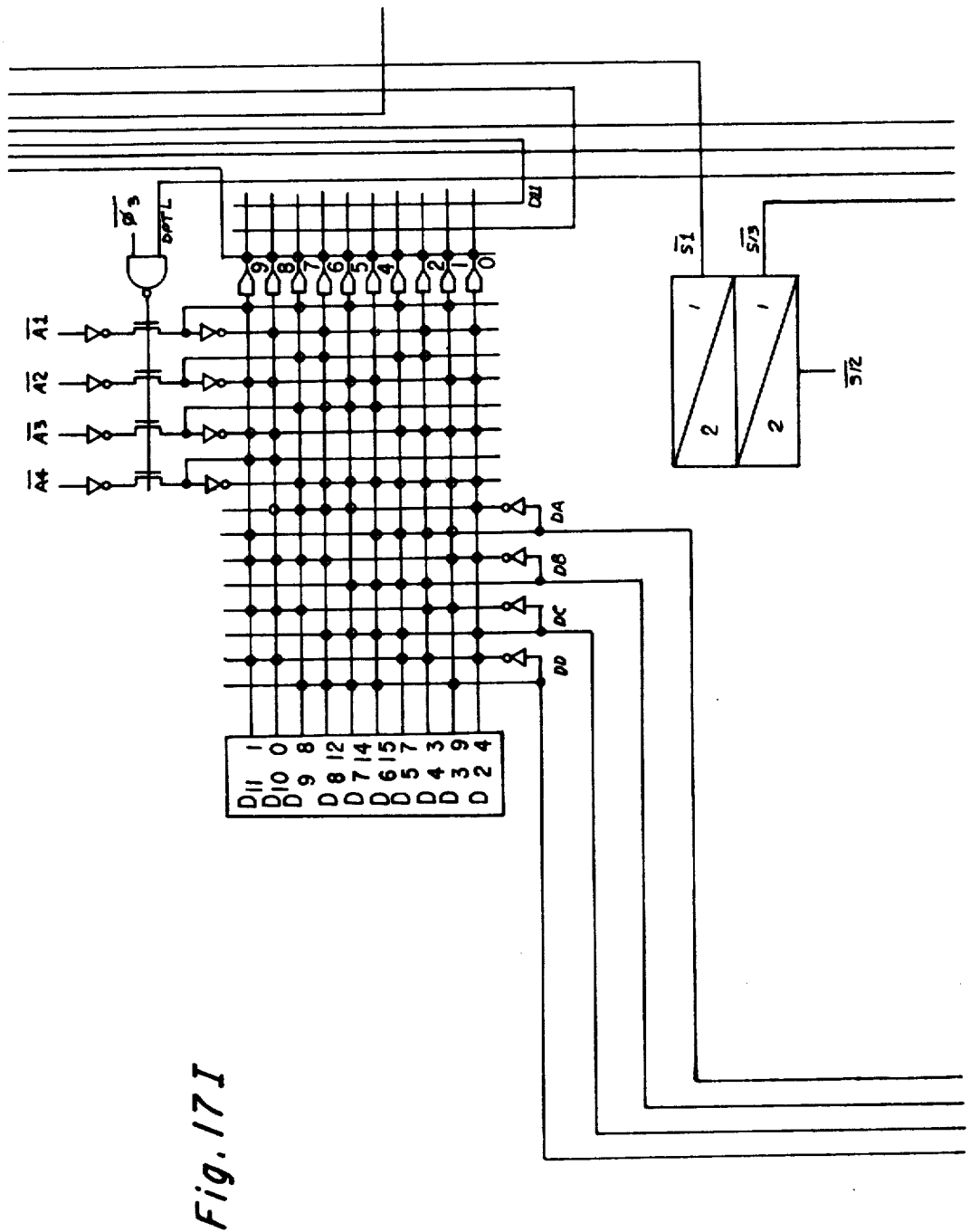
Figure 17L:
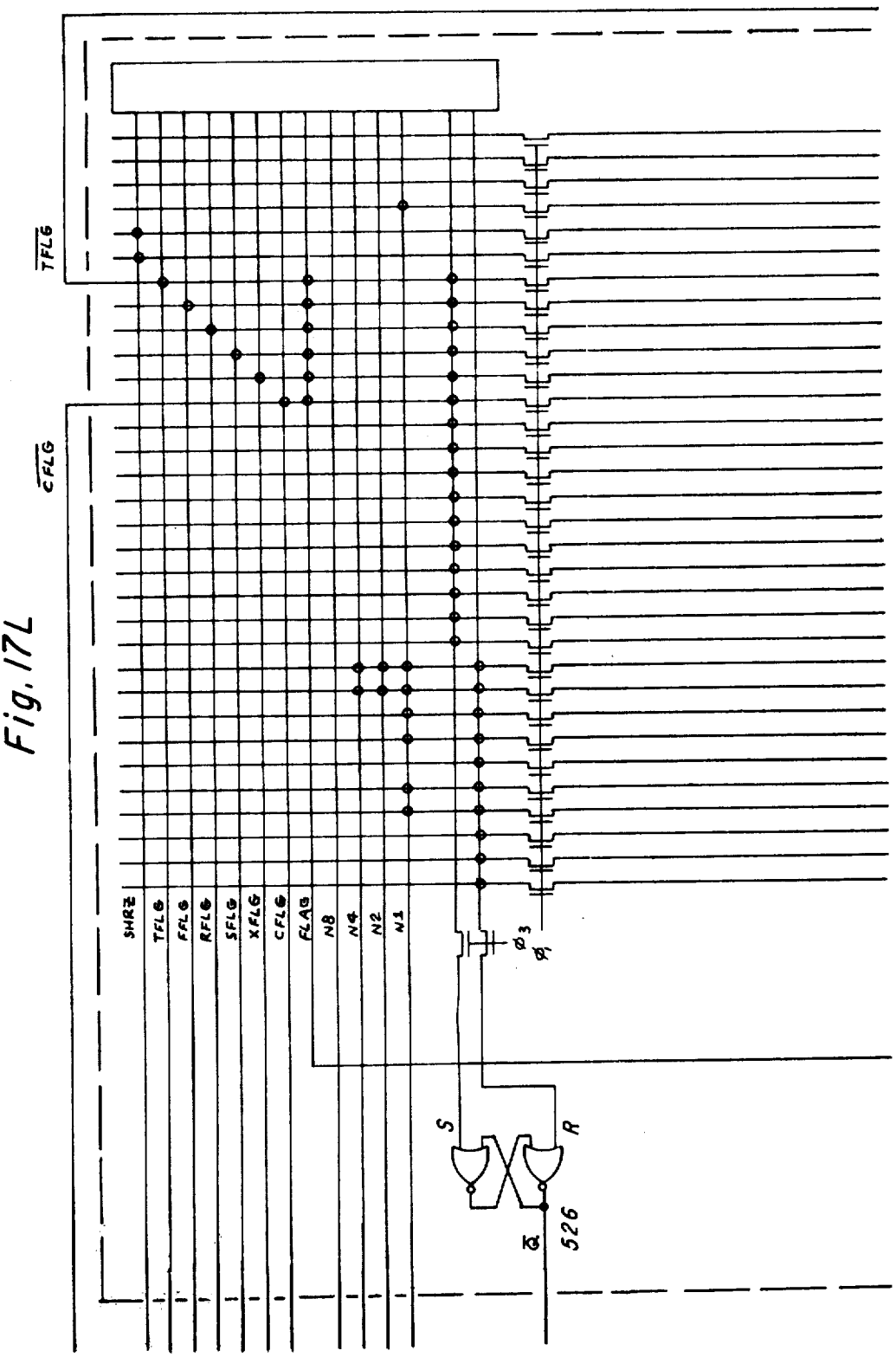
Figure 17M:
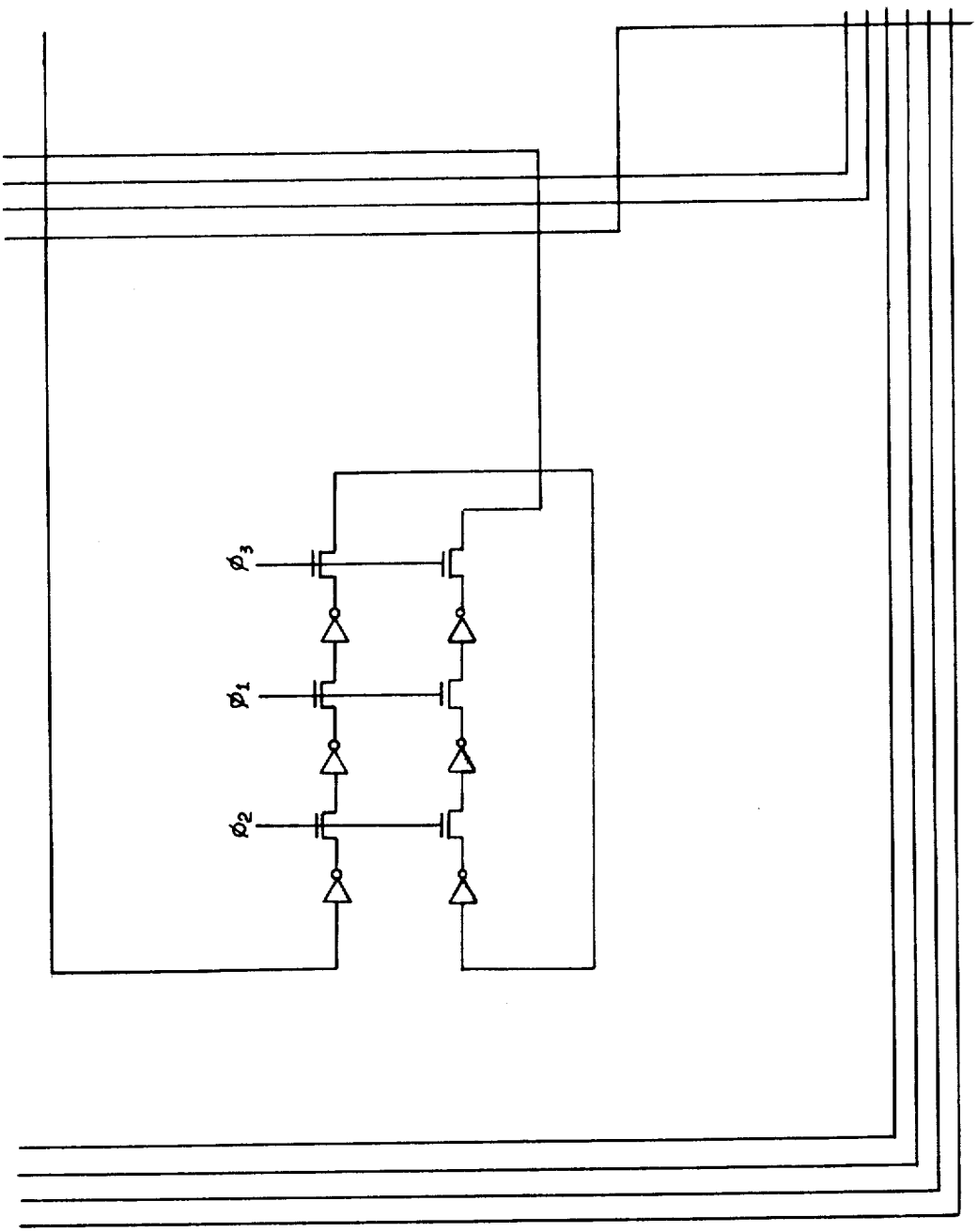
Figure 17N:
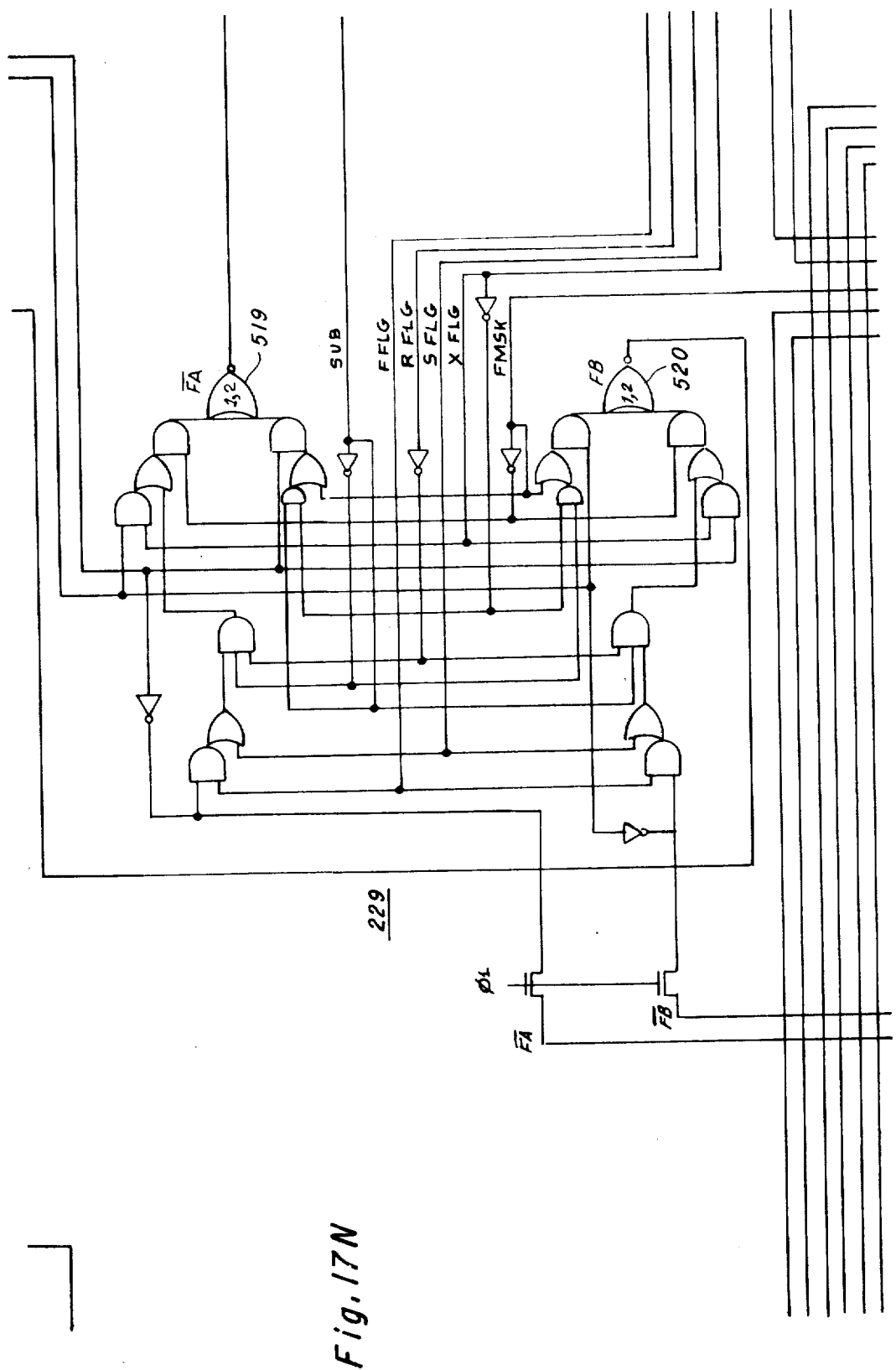
Figure 170:
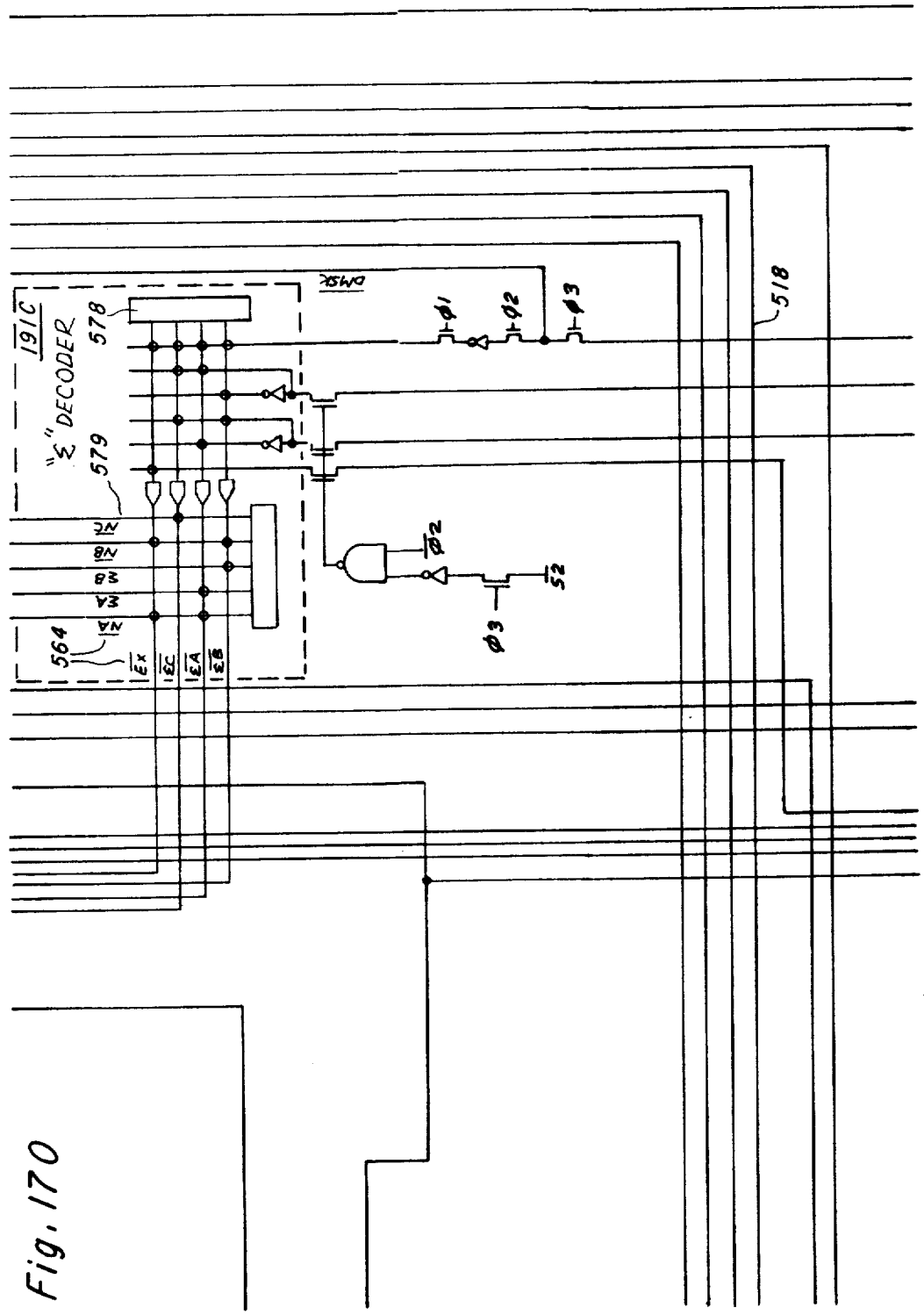
Figure 17P:
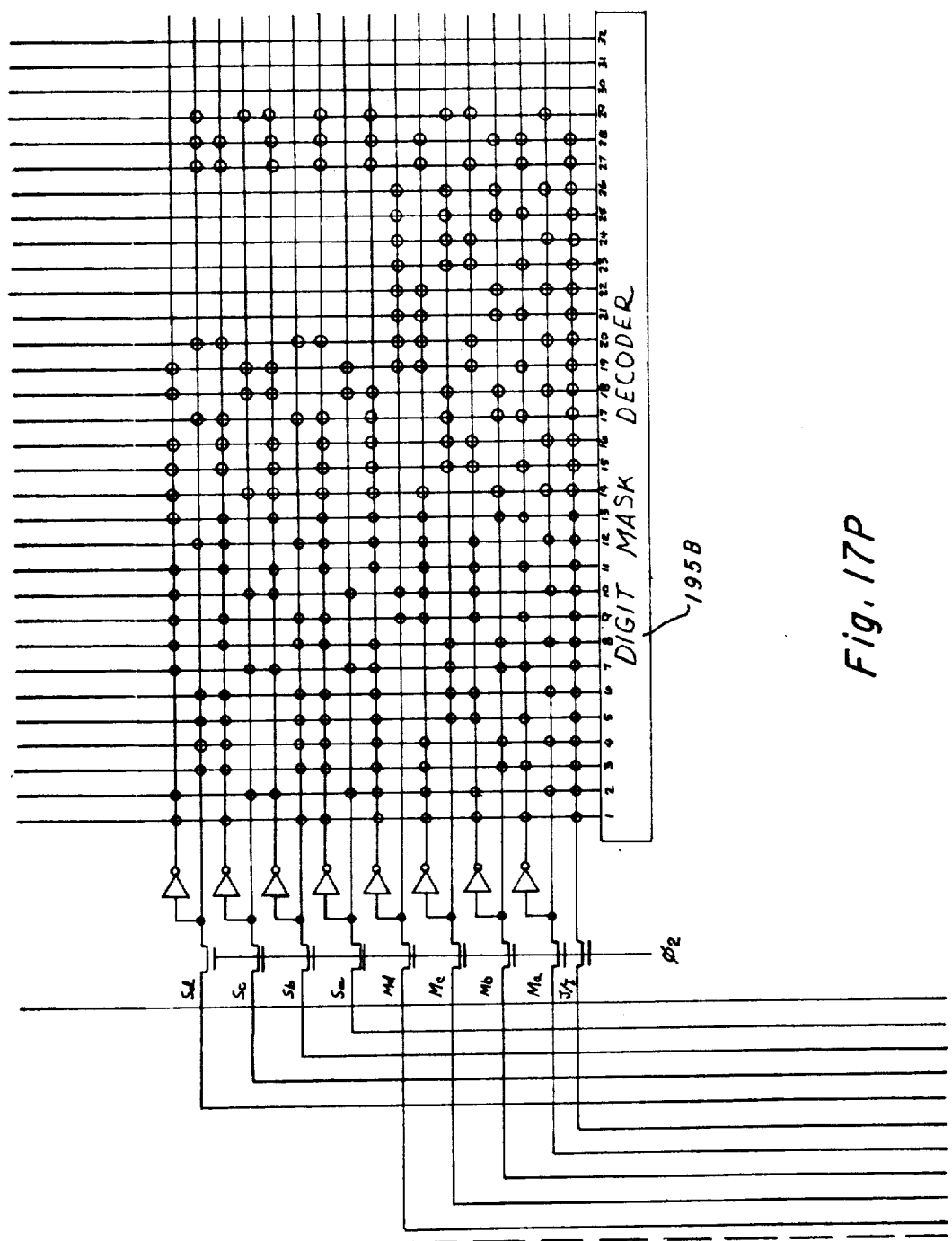
Figure 17S:
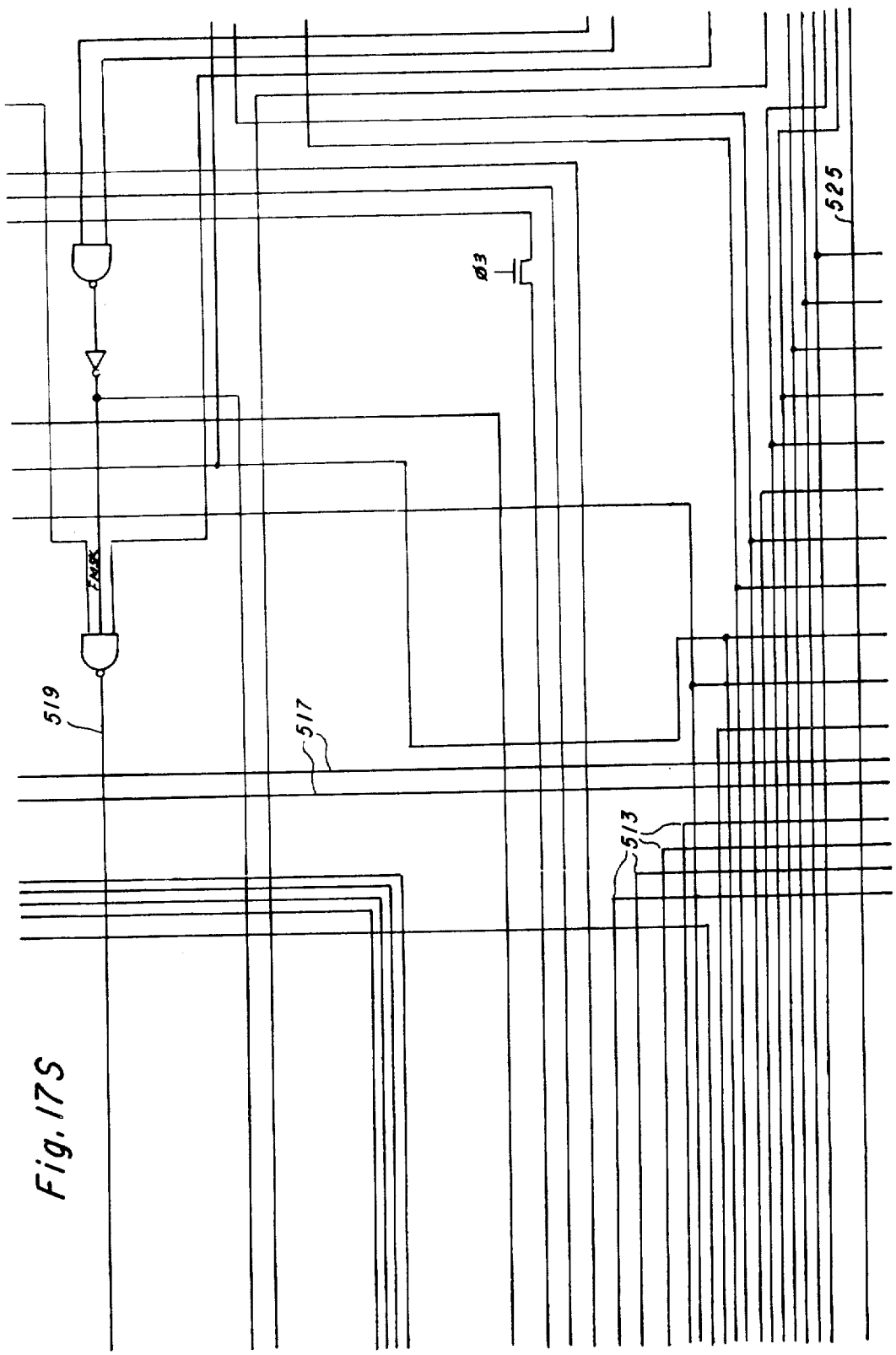
Figure 17U:
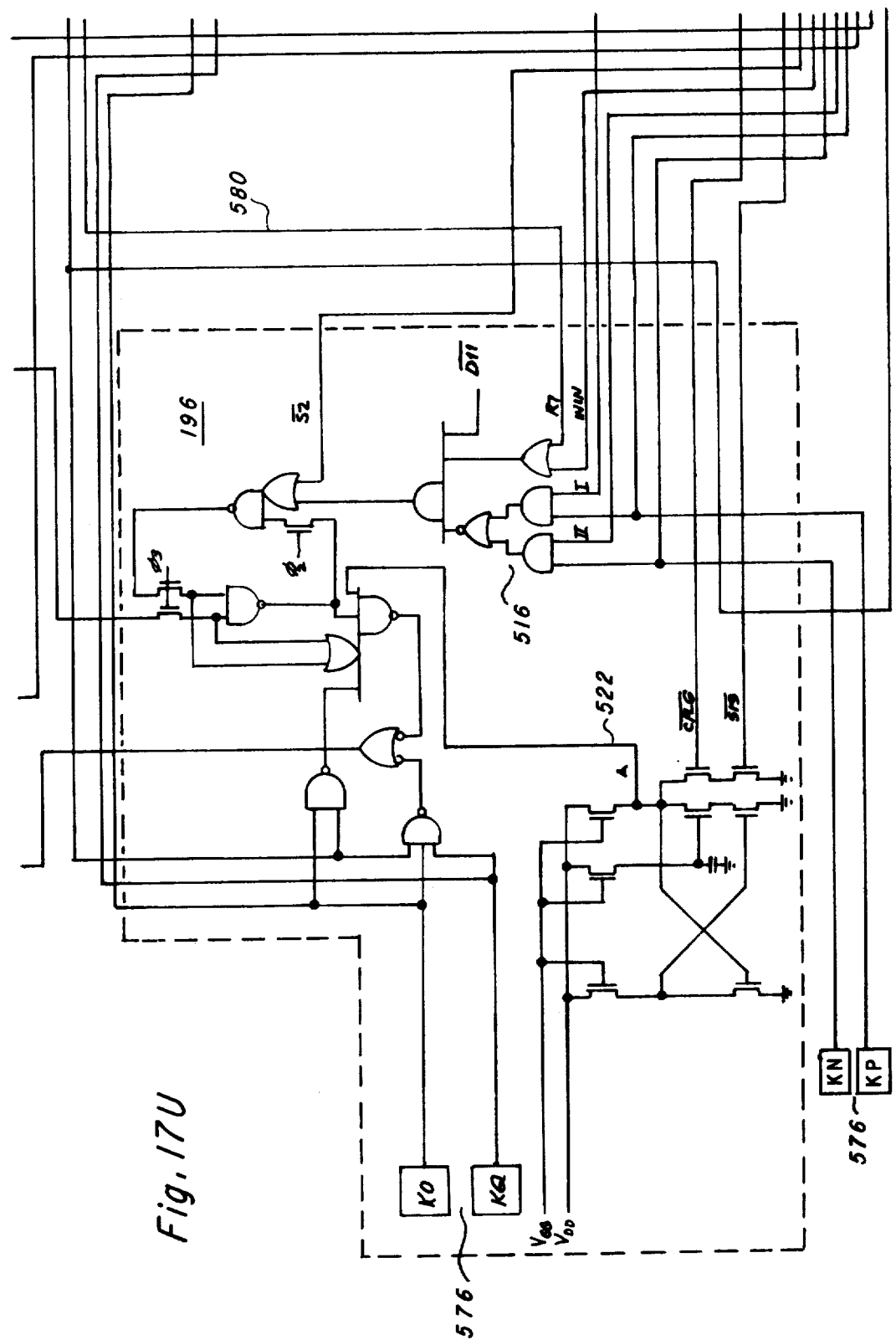
Figure 17X:
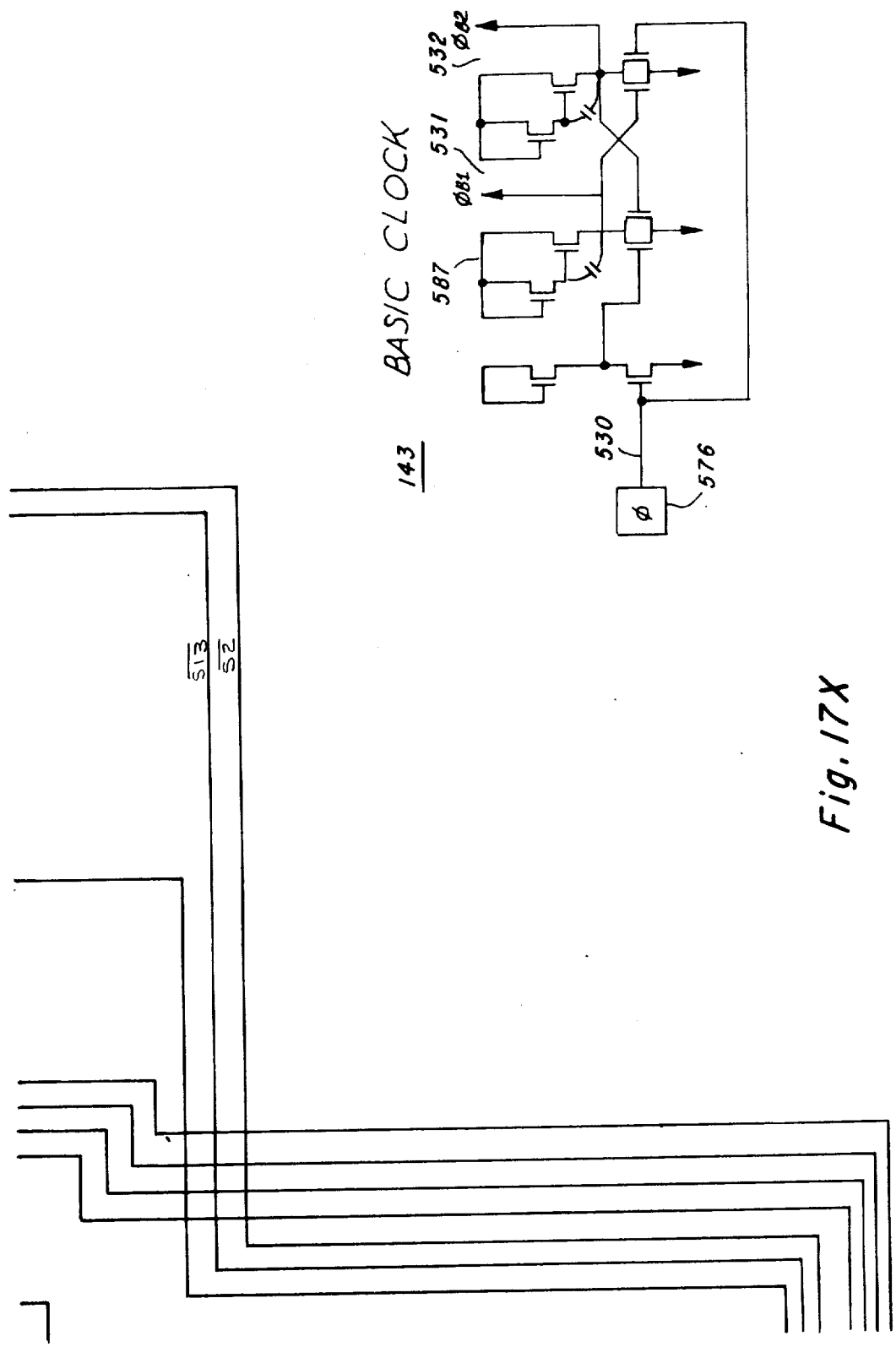
Figure 17Y:
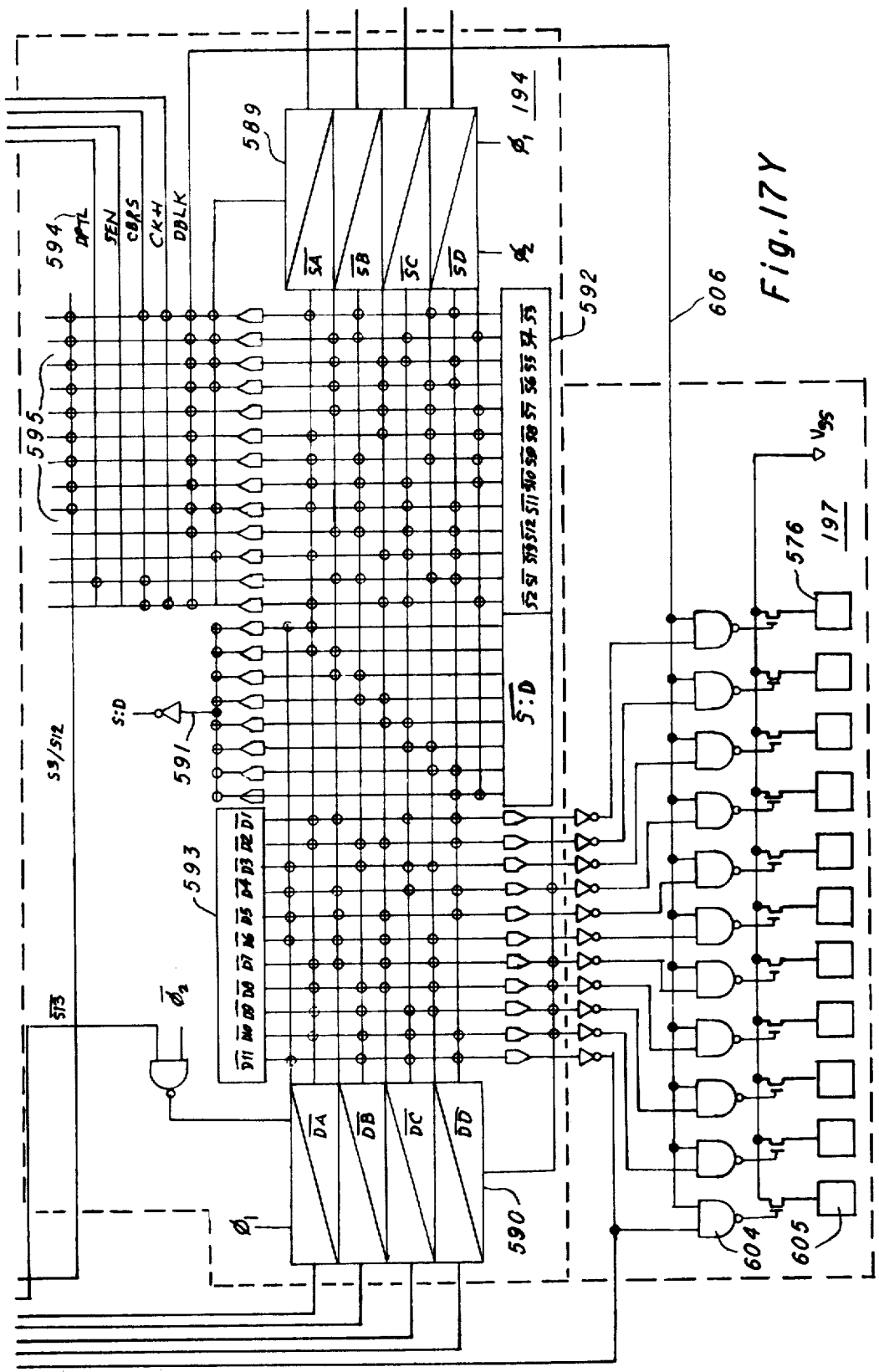
Figure 17Z:
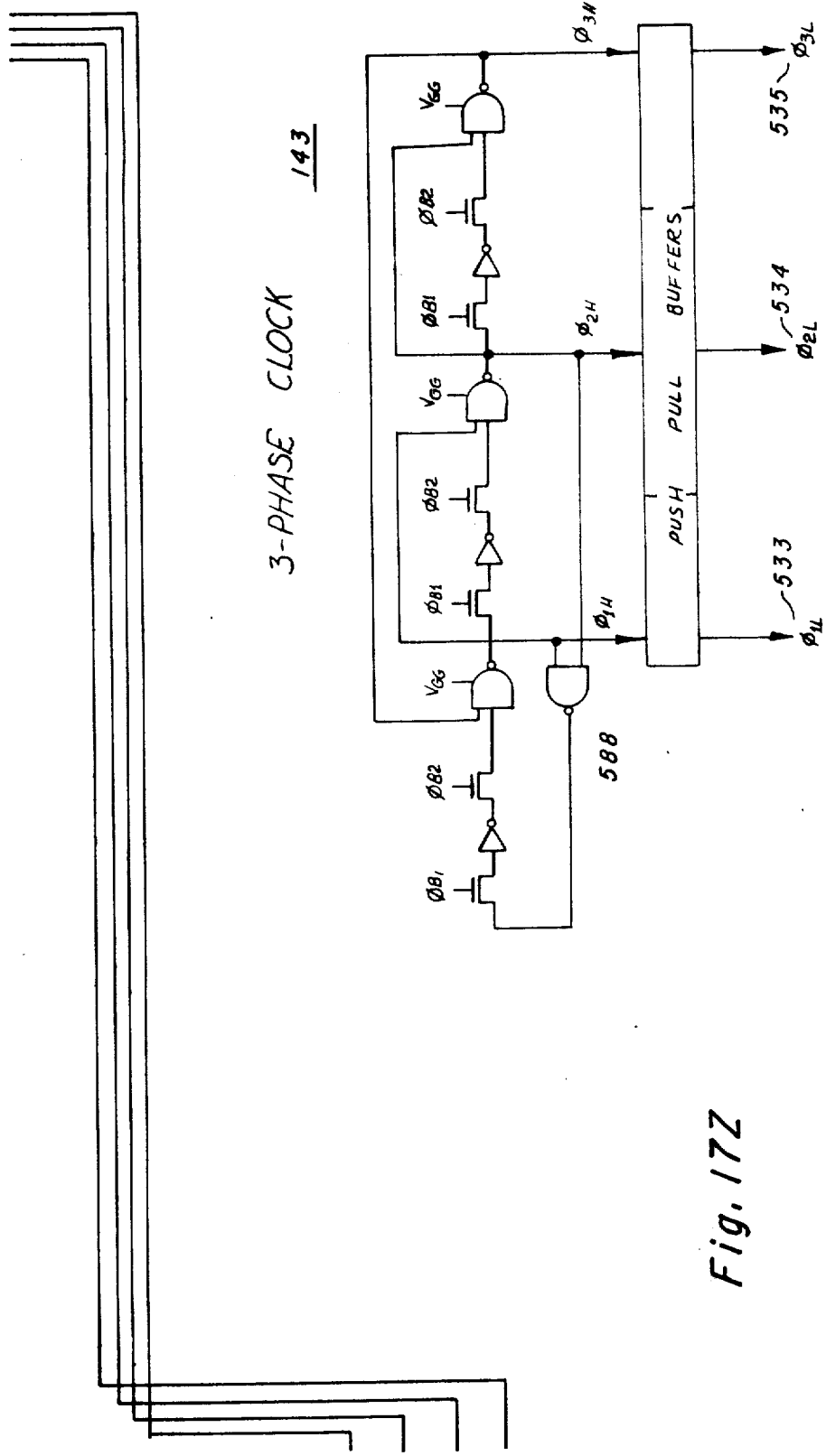

FIG. 16 illustrates the key assignment of the described calculator embodiment. Each key, e.g., 340 is a Form A normally open single pole, single throw switch, which has meaning for the particular input routine programmed in ROM 208.

It is also contemplated that some of the "Mode Switches" discussed previously in the Program Block section could in some embodiments be in the form of jumper wires, thus more permanently selecting a particular mode for a particular model or family of equipment. In this way, a "master program" involving a single embodiment of the invention could economically and feasibly cover the whole family of distinct operational characteristics.

LOGIC AND CIRCUIT DESCRIPTION OF THE MOS CALCULATOR SYSTEM EMBODIMENT

The calculator system according to the present invention has been discussed in terms of the function within each block of FIGS. 1 and 2. In the following sections the calculator system is described in terms of logic system and circuit elements which comprise the present calculator system embodiment which as previously noted is capable of being fabricated as a monolithic integrated semiconductor system utilizing contemporary MOS or MIS manufacturing technology. The complete calculator system of the present embodiment except for the keyboard illustrated separately in FIG. 16, the display element shown separately in FIGS. 12-14 and the display driver illustrated separately in FIG. 15. The logic/circuit diagram of FIG. 17 is comprised of 26 figures, FIGS. 17A through 17Z which are put together as illustrated in FIG. 17.

The functional elements described in the previous sections are identified in FIG. 17 with like numerals. In program block 201, program counter 209 provides a 9-bit address 501 to ROM 208. The data output 501 from ROM 208 is then transmitted to instruction register 190.

In control block 202, outputs 503 of instruction register 190 are distributed to jump-condition circuit 192; R decoder 191 A, control decoder 191 B, and Σ decoder 191 C of decoder 191 in control 202; and, FLAG and digit mask decoder circuits 195 A and 195 B in mask decoder circuits 195 of timing block 203. R decoder outputs 504 control U data selectors 215 and V data selectors 216 in data arithmetic logic unit 207. The condition output 507 of jump condition circuit 192 controls jump gates 508 in program counter functional element 209. Outputs 509 of Σ decoder 218 control the A data selector gates 219, the B data selector gates 220 and the C data selector gates 221 in arithmetic logic unit 207. Outputs 513 of control decoder 191 B operate the condition selector gates 514 in jump condition circuit 192. Outputs 515 of control decoder 191 B operate WAIT-KN-KP selector gate 516 of keyboard input circuit 196. Outputs 517 of control decoder 191 B operate Σ gates 218 in arithmetic logic unit 207.

In timing block 203, outputs 518 of digit and FLAG mask decoders 195 drive FA and FB FLAG operation logic gates 519 and 520. Outputs 521 of FLAG mask decoder 195 A operate keyboard synchronizing buffer control circuit 522 in keyboard input logic 196. Output 523 of FLAG mask decoder 195 A provides a synchronizing time pulse to jump-condition circuit 192. Outputs 524 of digit mask decoder 195 B is input to R decoder circuit 191 A and to FLAG mask decoder 195 B to discriminate FLAG commands from data operation commands. Output 526 from digit mask decoder 191 B provides a sub-addressing timing mask to Σ gate control circuit 527 and through the Σ decoder outputs 509 to A data selector gates 510, B data selector gates 511 and C data selector gates 512 in arithmetic logic unit 207; and, to carry-borrow detection gate 528 of jump-condition circuit 192. Output 529 of digit mask decoder 191 B provides a right shift command to Σ control circuit 527 in arithmetic logic unit 207. Output signals 536 of A register 211 of the FLAG and data storage array 206 are transmitted to AA buffer circuit 542 in segment decoder 198.

Figure 18A:
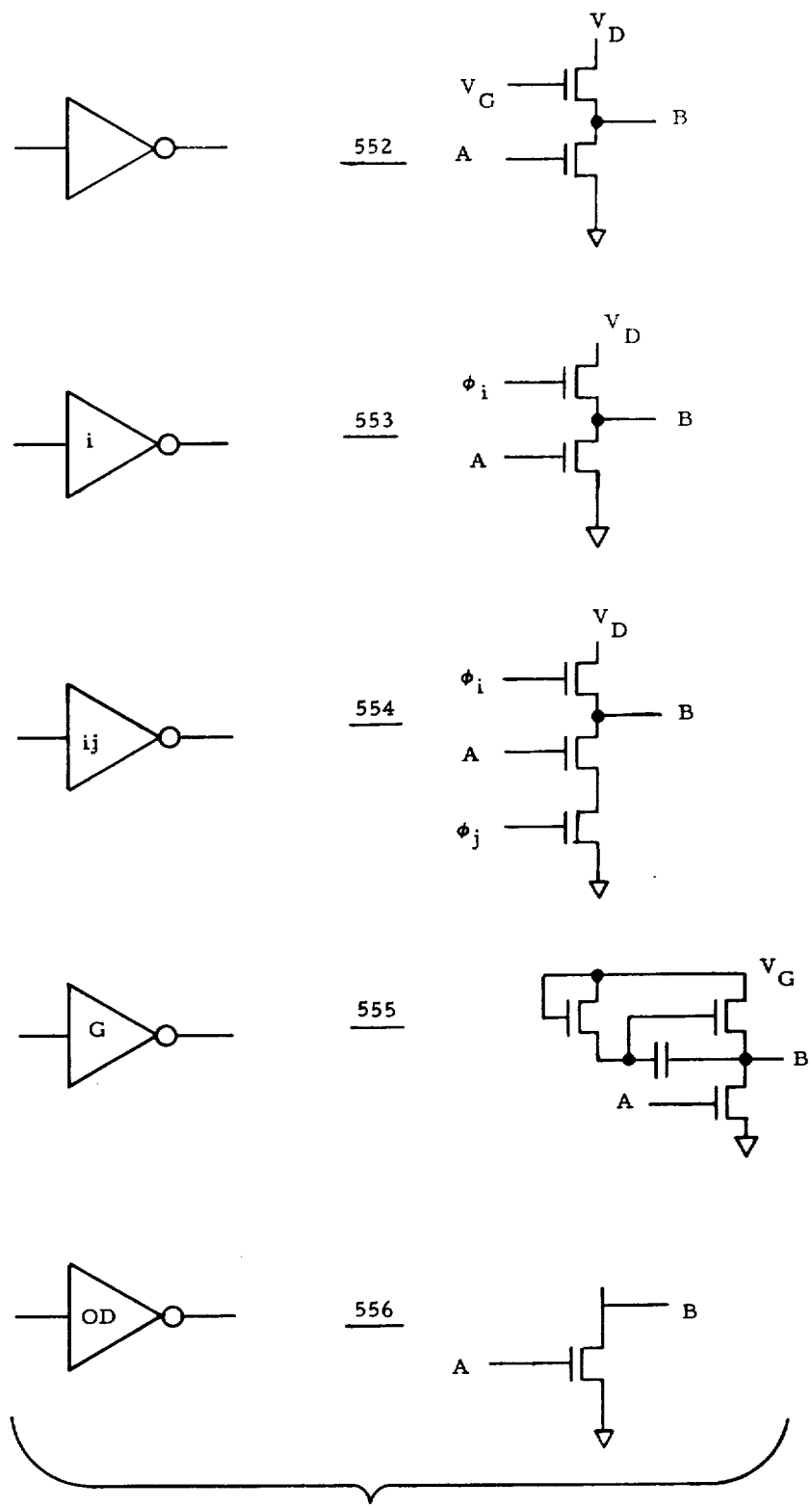
Figure 18B:
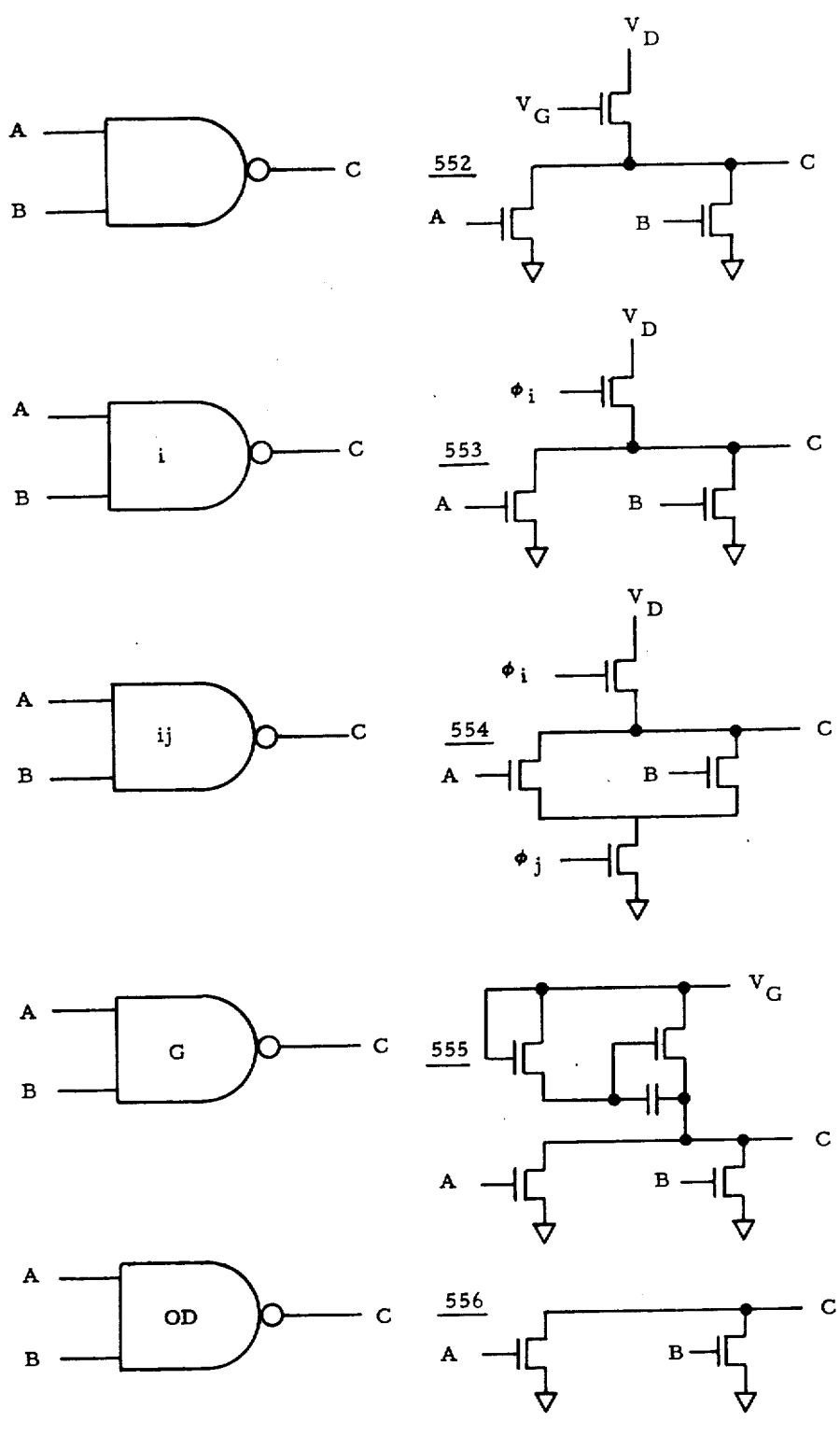

In the following sections the logic and the circuit descriptions of blocks 201-205 is described in detail. In order to better understand the calculator system, the logic symbology and its MOS circuit equivalents is here discussed with reference to FIGS. 18A-D. FIG. 17 is described in terms of conventional logic symbology using positive logic convention. However, additional notation has been included to clarify the particular MOS circuit embodiment which have been chosen to meet transient, voltage level and timing requirements of the system. FIG. 18A illustrates five different inverters which appear in FIG. 17 and their respective MOS circuit equivalents. Similarly, FIG. 18B illustrates five corresponding types of NAND gates and their respect to MOS circuit equivalents and FIG. 18C illustrates five corresponding types of NOR gates and their respect to MOS circuit equivalents. The five different types of MOS circuits shown in each of FIGS. 18A-C may be described as follows: a logic symbol 552 with no internal inscription is a conventional load ratio circuit. A logic symbol 553 with a single numeric inscription 1, 2 or 3 indicates a dynamic implementation of the logic function with clocked load $\phi I$ where I is the inscription. This type of circuit is used for lower power consumption and reduction of the number of service lines (DC voltages and clocks) required in arrays which don't require a gate bias voltage VGG. A logic symbol 554 with two numeric inscriptions IJ indicates implementation of the logic function using a special ratioless type circuit with precharges on $\phi I$ and conditional discharge on $\phi J$ where I and J are members of the set $\{1,2,3\}$ and the condition is the logical condition of conduction. This type of circuit is used to reduce power, to reduce cell size and/or to increase circuit speed. A logic symbol 555 with the inscription G infers performing of the logic function using a boot strap load circuit which is later described in detail. Finally, a logic symbol 556 with the inscription OD infers the implementation of that logic function using open-drain circuits. This type of circuit is used in wire-OR logic where only one of severalccoupled logic gates requires a load.

LOGIC AND CIRCUIT DESCRIPTION OF DATA BLOCK 204

Data block 204 comprises random access memory array shift register system 206 which is further comprised of A register 211, B register 212, C register 213, FA FLAG data storage register 226 and FB FLAG data storage register 227; and decimal arithmetic logic unit 207 and FLAG logic unit 229. Random access memory array shift register system 206 is comprised of a commutator system 545 which operates a 12 × 14 array or matrix 546 of charge storage cells 10 and 14 dynamic delays 214. Array 546 of charge storage cells 10 and delay cells 214 provide the parallel shifting storage system for three thirteen digit numbers and twenty-six binary FLAGS. The commutator system 545 is comprised of twelve shift register cells 541 (illustrated in detail in FIG. 19) arranged in serial connection by coupling the output of each intermediate cell 541 to the input of the next cell 541 in the series. In this manner cells 541 are capable of distributing common read-write control signals sequentially to adjacent rows of storage array 546. In order for the commutation to effect a stable image of rotation corresponding to the desired characteristics of fourteen parallel shifting shift registers of 13-bits in length with one input and one output for each of the fourteen columns of the array, additional means 547 and 544 are provided in the commutation circuit. NAND circuit 547 and delay element 544 eliminates multi-modal oscillations corresponding to circulation of more than one read-write control for rotation. The MOS circuit equivalents of shift register cells 541 is illustrated in FIG. 19. Each shift register cell 541 is comprised of a normal six MOS transistor shift register bit section and additionally includes a load circuit 548 which uses a capacitance boot strapping effect to given superior transient response as compared to conventional load circuits, RP pulse enable 550 from cell 543 and a kill circuit 551 which restricts the time interval of the readwrite control pulse to that of clock $\phi2$. The circuit of cell 543 is illustrated in detail in FIG. 20; circuit 543 develops the timing pulse RP by means of a double inverting amplifier circuit with an input from clock $\phi2$. The random access memory shift register system embodied in the present invention is further described in copending Patent Application Serial No. TI-4607 by Boone et al filed of even date with and assigned to the assignee of the present application. Patent Application Ser. No. TI-4607 is incorporated by reference herein.

Again, referring to FIG. 17, A data selector gates 219, B data selector gates 220 and C data selector gates 221 are coupled to and drive input means 510, 511 and 512 of A register 211 (Columns A1, A2, A4 and A8), B register 212 (Columns B1, B2, B4 and B8) and C register 213 (Columns C1, C2, C4 and C8), respectively. Output means 536, 537 and 538 of A register 211, B register 212 and C register 213, respectively complete a recirculation path through 1-bit delay elements 214 back to normal inputs NA of data selector 219, NB of data selector 220 and NC of data selector 221. In addition to the normal paths, $\Sigma$ gates 218 can be selected by the $\Sigma$ A control of A data selector 219 or by the $\Sigma$ B control of B data selector 220 or $\Sigma$ C control of C data selector 221. In addition to these paths, output means 536 and 537 of A register 211 and B register 212, respectively, transmitted through delay cells 214 are capable of being enabled to B data selector gates 220 and A data selector gates 219, respectively, by means of the exchange control in combination with the $\Sigma$ A and $\Sigma$ B controls as previously discussed with respect to FIG. 3. All of the normal $\Sigma$ and exchange controls are provided to data selectors 219, 220 and 221 by $\Sigma$ decoder 191 C.

Output means 536 of A register 211 and output means 538 of C register 213, delayed by the first half of delay cell 214, are selected (normally exclusively) to the plus side of adder 217 by U data selector 215. Similarly, output means 537 of B register 212, delayed by the first half of delay cell 214 and a constant N generated by means 524 are selected (normally exclusively) to the minus side of adder 217 by V data selector 216. Exclusive OR circuits 554 are utilized to conditionally complement the V inputs to adder 217 with respect to their normal (add) polarity at nodes 55 and where the condition of such complementation is the subtract command from output 503 of instruction register 190. U outputs 552 from U data selector 215 and the conditionally complemented V outputs 555 from exclusive OR circuits 554 are added with carry input 557 by ripple carry adder cells 556 to generate the binary sum U plus conditionally complemented V at nodes 558 and a binary carry signal at node 559. The binary sum generated at 558 and carry generated at 559 are corrected by logic unit 563 to a decimal sum and carry at T adder nodes 560 and inter-digit carry node 561 depending upon the state of CK control 564 and CBRS control 565. Controls 564 and 565 are used to select binary coding as opposed to binary-coded-decimal (BCD) operation and to block inter-digit carries in selected fields of the register data circulation.

Outputs 560 of T adder 563 can be selected by $\Sigma$ data selectors 218 through either the no-shift (NS) or delay elements 566 and left shift (LS) $\Sigma$ paths. $\Sigma$ data selectors 218 also allow a right shift path by using the inverted U at input 552 and inverted V input 553. $\Sigma$ gate control circuit 527 transmits left or right shift commands to the left or right channels of $\Sigma$ data selector 218 and enables the no-shift path when neither left shift or right shift commands are present. In addition, when a left shift command is present, $\Sigma$ gate control circuit 527 generates a leading-edge detection of digit mask control 526 which are utilized by left shift delay elements 566 in order to block the first digit to insure insertion of a zero in the least significant digit masked.

The FLAG operation logic 229, in much the same manner as the register operation logic of arithmetic logic unit 207 completes a circulation path generated by data storage array 206. The output means of the FA storage cells 568 and the FB storage cells 569 are the normal recirculating inputs to FA operational logic 519 and FB operational logic 520 of FLAG logic unit 229 and also are transmitted to FLAG selection gates 570 in jump-condition circuit 192. FLAG command inputs 518 from digit mask decoder 195 B allow a particular FLAG to be set, reset, or toggled where the particular FLAG is addressed by the SUB bit of instruction register 503 (FA or FB) and by FMSK control 519 from FLAG mask decoder 195 A (selecting one of thirteen time slots or states). In addition, FA and FB pairs of FLAGs in the same time slot (FMSK) may be exchanged by means of FFLG command 518 from digit mask decoder 195 B. FA and FB operation logic gates 519 and 520 provide FLAG data to FLAG data storage array input means 505 and 506, respectively, to complete the circulation loop for the FLAGs.

LOGIC AND CIRCUIT DESCRIPTION OF CONTROL BLOCK 202

Control block 202 is comprised of instruction register 190, R decoder 191 A, control decoder 191 B, $\Sigma$ decoder 191 C and jump-condition circuit 192.

Instruction register 190 is comprised of a set of eleven inverters 575 whose inputs are sampled from the program block ROM 208 data outputs 502 once per instruction cycle by boot strapped NAND gate 571. The R, control and $\Sigma$ decoders 191, as well as other decoders illustrated in FIG. 17 are implemented in programmable logic arrays which are similar in structure to the read only memory (ROM) decoder/encoder circuits with the exception that the decoder is not fully generated. That is, whereas in a N-bit address ROM, $2^N$ locations are decoded; in a PLA only the desired states are decoded. Consider, for example, the PLA illustrated in FIG. 21. A and B inputs 571 are presented to the first half (decoder) of a PLA in both true and complemented polarities. In this example, four product terms (decoder outputs) 572 are presented as inputs to a second (encoder) array. The circuits for the decoder gates 572 and encoder gates 573 are identical shunt gates; that is, logical NAND gates. However, since NAND-NAND logic reduces to AND-OR logic, it is convenient to use sum-of-product notation to describe the PLA circuit implementation where the dependence of a particular product term on a particular input is indicated by a circle at that juncture as for example 574. The circles also correspond to the physical placement of MOS gates by a programmable gate mask utilized during the fabrication of the MOS embodiment.

In accordance with the above symbology for decoders (PLA), Σ decoder 191 C has a four-term decoder circuit 578 and a four-line output encoder section 579 in order to decode the controls 509 from the Σ A and Σ B inputs from output 503 of instruction register 190 and digit mask output 526 of digit mask decoder 195 B and EX exchange command 504 from R decoder 191 A. Similarly, R decoder 191 A converts R field 234 output 503 of instruction 190 into the UV command CU, AU, BV, and EX 504 and the R7 WAIT condition code 580 using a seven-term decode array 581 and five-line output encoder array 582. All terms of the R decode matrix 581 are also conditioned by the true state of the I-bit 230 of instruction register 190 at output 503 and by the FLAG signal 525 in the inverted state. Control decoder 191 B decodes the controls for special keyboard instructions for keyboard condition 513, keyboard WAIT 515 and shift left and right 517. Control decoder 191 B utilizes a twelve-term decoder 583 and a nine-line output encoder array 584.

Jump-condition circuit 192 is comprised of a cross-coupled latch circuit 584 with inputs from the keyboard condition selector gates 514, carry-borrow selector gate 528 and FLAG test and compare gates 570 to the SET side of the latch; a timing input 585 to the reset side of the latch; and a gating circuit 586 to enable jump-condition control 507 to jump gates 508 when a jump instruction is decoded and the jump-condition is true.

LOGIC AND CIRCUIT DESCRIPTION OF TIMING BLOCK 203

Timing block 203 comprises a clock generator 193, a state and digit timing generator 194, digit and FLAG mask decoder arrays 195 and key input logic 196.

All timing information for the calculator system is provided by a square wave generator or oscillator (external to the monolithic semiconductor system illustrated in FIG. 17) which is approximately 250 KHz. Input clock lead C as indicated by the φ terminal 530 in FIG. 17X provides means for applying the external clock signal to the monolithic calculator system. The basic clock shown in FIG. 17X and the three phase clock shown in FIG. 17Z are both integrated into the monolithic semiconductor system. The square wave φ is immediately divided by the basic clock circuit of FIG. 17X into half frequency square waves φB1 and φB2 of opposite polarities at 531 and 532, respectively. The two phase clock outputs φB1 and φB2 are in turn divided by means of 3-bit ring counter 588 to provide the three phase clock φ1L, φ2L and φ3L at 533, 534 and 535, respectively, as the basic clocking system for all of the logic and circuit elements of the calculator system embodiment of FIG. 17.

State and digit timing generator 194 utilizes dynamic shift register elements and PLA logic to provide state counter 589, digit counter 590, state digit comparator 591, state decoder 592 and digit decoder 593. Re-encoded state decoder outputs 594 are distributed to the other functional elements to provide means for arbitrary selection of state timing on each of six independent timing buses. The state decoder outputs 595 are also distributed as required by other circuit elements of FIG. 17. In addition to providing means for deriving the correct feedback for the digit feedback shift register, the outputs of digit decoder 593 drives the output scanner 197.

Thirteen of the product terms in FLAG mask decoder 195 are used to correspond FLAG addresses from the R and Σ fields 234 and 235, respectively of instruction register 190 at output 503 to states one through thirteen as decoded from the SA, SB, SC and SD inputs of state counter S to derive the FLAG addressing signal FMSK at 596 which is then gated to FLAG operation logic 519 and 520 as the timing address of FLAG operations. Similarly, digit mask decoder 195B provides the digit mask signal 526 by associations of M field 232 of instruction register 190 at output 503 and from state counter 589. In this manner set and reset associations of arbitrary correspondence between state and mask for each of the six distinct masks is provided. In addition to the digit mask, digit mask decoder 195B also performs decoding of FLAG controls 518, shift right control 529 and constant N generator 524.

LOGIC AND CIRCUIT DESCRIPTION OF OUTPUT BLOCK 205

Segment output subsystem 198 is comprised of delay elements 542 which buffer output means 536 of the data storage array 206, segment decoder (PLA) 601 and output buffer circuit 602 which drive terminals 576 with 11-decode segment output signals. The segment decoder array has ten product terms for means of decoding numeric information for selective recombination, that is, encoding on numeric segment outputs 602; product terms for decoding FLAG information (for example, error or minus sign); and, product terms and feedback signal 603 to implement zero suppression.

The scan output subsystem 197 is comprised of 11 2-input NAND gates 604 which block digit decoder outputs 593 by digit BLANK signal 606 for inter-digit blanking capability; and, output buffer circuits 605 to drive terminals 576 effecting a scan of the keyboard and display as previously described.

LOGIC, CIRCUIT AND PROGRAM DESCRIPTION OF PROGRAM BLOCK 201

As previously described, program block 201 is comprised of program counter (PC) 209 and read-only memory (ROM) 208. Together, program counter 209 and read-only memory 208 perform the address modification required for each instruction, and provide the control block 202 with, for example, in the described embodiment an 11-bit input to the instruction register (IR) 190.

The address modification required by a current instruction is either no modification for WAIT operations, binary add one for normal incremented operations and jump operations that are not executed, or replacement of the entire 9-bit program counter with nine bits from instruction register 190 for jump operations which are executed. The no modification for WAIT operations and binary add one for normal incremented operations and jump operations which are not executed are satisfied by means of a serial input 651 to he MSD of program counter 209 from key input logic 96 in timing block 203 which either recirculates the LSD output 652 of program counter 209 or adds one to the LSD and circulates it to the MSB of the program counter 209, respectively. In either case the circulation is synchronous to the instruction cycle. The replacement of the entire 9-bit count with nine bits from instruction register 190 for jump operations which are executed is satisfied by means of parallel strobing of output 503 of instruction register 190 by the output of condition circuit 192 into the inputs 653 of all bits of program counter 209 simultaneously during state S12 of the instruction cycle.

The output of the instruction word to the control block instruction register 190 is strobed by NAND gate 654 providing a new input to instruction register 190 every instruction cycle during state S13. The serial circulation of program counter 190 is provided by means of conventional shift register bits 656 clocked by NAND gates 655 during S3 through S12. The TOM is comprised of a 1-out-of-64 decoder per instruction register 190 bit output 503 driving an array of 5 NAND gates per bit or a total of 55 NAND gates. One of these five gates is addressed by a 1-out-of-5 encoder for each bit. Hence, means is provided for storage of a maximum of 320 11-bit words, and a selection (decode and encode) is provided for random addressing of any one word. Program block 201 in the present calculator embodiment is comprised of programmable read-only memory 208 to store a fixed program; in further embodiments, however, a read-write memory replacing memory 208 would provide means for continuously varying the stored program and hence change the operation of the calculator system.

The resident program in one embodiment of the variable function calculator system provides means for the calculator operation characteristics called "Combination B" shown in Table VIII. the corresponding flowcharts for this embodiment are illustrated in FIGS. 22A to T; the resulting linear program is shown in Table VI; and the hexadecimal ROM code is shown in Table V. Finally a logic simulation result for a portion of an executing problem example is shown in Table VII.

Referring to FIG. 22, the calculator program logic flow is as follows:

1802 ROM ASSEMBLY...COMBINATION B (+-=)   TABLE V

```
ROM CODE
START END              OBJECT CODE IS 11 BITS
 000 010 TM1802    F8B2 F892 FBFE FBFC FBFF F89D FBFF FB9F 0404 FBFF FB9F FBFF 0609 FBFF FBFF FB9F 0609
 011 021 TM1802    F816 0404 FBE3 0458 043E 0441 045B 0404 0441 0440 0446 0447 0441 F8FC F81B 062A FBFE
 022 032 TM1802    F89D F895 F894 F83D 062A F83E 042A F855 F83C 042F FA3E FA1A 0604 F8BC FA9B 0634 F9DB
 033 043 TM1802    0436 F8D7 0604 F81C 0639 FA3A FB7A FBFF FB1E FB3A 0404 F8DC 061F F8DD F89E F83E 064A
 044 054 TM1802    F8FF 067E F8DD F8DE F83E 064E F81B 0644 F81E 0453 FBF8 F8B5 F815 0653 F8F5 F93E F93D
 055 065 TM1802    F89C F8DB 0604 F89C F897 0621 F855 0604 F974 066C FB8F 0663 FBE7 F935 FB8C F834 0668
 066 076 TM1802    FBE7 F935 FA50 0475 FB55 0668 F834 0471 FBE7 F935 F934 FADB 046E FBAC 0668 FB4F 0679
 077 087 TM1802    FBE7 F935 F975 047D FB4E 067E FB6E FADB 04A4 FABD FB75 FB4F 0488 FB5A F814 0493 FA7A
 088 098 TM1802    F9DB 0495 FA9B 06A5 FB7A F814 049A FA5B 049F FA5A 0688 FA5A 0688 FA3A FA9B 04A2 F814
 099 0A9 TM1802    048F F99B 04A0 F8D6 F99A 06A0 F854 FA7A 0688 FB7A 0688 FBFE FB3F 0705 FBE7 FBF2 FBF4
 0AA 0BA TM1802    F934 F837 F877 067E F8BF F83E 065D F83D 06B7 F838 04B7 FBE7 F934 F8B8 FBFF FB7F 06BC
 0BB 0CB TM1802    F8F8 F975 F895 04C0 F8D5 F974 06C6 F83D 04CB FBAE 06D4 F83D 04C4 FB8F 06CB F854 FB8E
 0CC 0DC TM1802    06D4 FBAE FBE7 FB8D FBE7 F83D 06D4 F854 FADB 04FB FB78 FB7E F83D 06F7 FB4B 04E2 FB48
 0DD 0ED TM1802    FAFA 06DA FADA F8D6 0604 FA9B 06FB FADB 06EE F814 04EB FA5B 06ED F8D4 FA7A 06EE FA5A
 0EE 0FE TM1802    FB7A FAD3 04E2 FB70 06DA FB50 FAD3 04FB FB5A FB10 C4F3 FB6E 06F7 FBF4 F81E 06FF F8B8
 0FF 10F TM1802    F838 047E F8BE F8BD 067E FB5A FA5B 0511 FA5A F814 0504 F99B 050F F99A F8D6 0705 FA1A
 110 120 TM1802    0705 F894 F816 0523 FB1B 071B FA1B 051B FB5A FA1A 0714 F81E 0523 FBE7 FBFE FBFF FBDF
 121 131 TM1802    0526 FEE7 F838 0455 064E FBFF FB3E 0729 FB3A FBDA FBF5 FB55 FB8F FBE7 0739 FA5A FB5A
 132 142 TM1802    FBE7 FB8F FBE7 0530 FB7A FBDA 0723 FB8F 0736 FA9B 0736 FB7A FA7A 0739 0000 0000 0000
 143 153 TM1802    0000 0000 0000 0000 0000 0000 0000 0000 0000 0000 0000 0000 0000 0000 0000 0000 0000
 154 164 TM1802    0000 0000 0000 0000 0000 0000 0000 0000 0000 0000 0000 0000 0000 0000 0000 0000 0000
 165 175 TM1802    0000 0000 0000 0000 0000 0000 0000 0000 0000 0000 0000 0000 0000 0000 0000 0000 0000
 176 186 TM1802    0000 0000 0000 0000 0000 0000 0000 0000 0000 0000 0000 0000 0000 0000 0000 0000 0000
 187 197 TM1802    0000 0000 0000 0000 0000 0000 0000 0000 0000 0000 0000 0000 0000 0000 0000 0000 0000
 198 1A8 TM1802    0000 0000 0000 0000 0000 0000 0000 0000 0000 0000 0000 0000 0000 0000 0000 0000 0000
 1A9 1B9 TM1802    0000 0000 0000 0000 0000 0000 0000 0000 0000 0000 0000 0000 0000 0000 0000 0000 0000
 1BA 1CA TM1802    0000 0000 0000 0000 0000 0000 0000 0000 0000 0000 0000 0000 0000 0000 0000 0000 0000
 1CB 1DB TM1802    0000 0000 0000 0000 0000 0000 0000 0000 0000 0000 0000 0000 0000 0000 0000 0000 0000
 1DC 1EC TM1802    0000 0000 0000 0000 0000 0000 0000 0000 0000 0000 0000 0000 0000 0000 0000 0000 0000
 1ED 1FD TM1802    0000 0000 0000 0000 0000 0000 0000 0000 0000 0000 0000 0000 0000 0000 0000 0000 0000
 1FE 1FF TM1802    0000 0000
```

TABLE VI

```
000  111 0100 1101       CLR     ZAFL
001  111 0110 1101               ZBFL
002  100 0000 0001               CLA    ALL
003  100 0000 0011               CLC    ALL
004  100 0000 0000       LOCK    WD11
005  111 0110 0010               ZFB    2      MAKING SURE THAT PREV OP FLAG 2 IS 0
006  100 0000 0000               WD11
007  100 0110 0000               SCAN
008  010 0000 0100               BZ     LOCK   KEY IS NOT RELEASED YET
009  100 0000 0000       IDLE    WD11
00A  100 0110 0000               SCAN
00B  100 0000 0000               WD11
00C  000 0000 1001               BO     IDLE   NOT FOUND ANYTHING
00D  100 0000 0000               WD11
00E  100 0000 0000               WD11
00F  100 0110 0000               SCAN
010  000 0000 1001               BO     IDLE   NOT FOUND ANYTHING
                         *-----INPUT ROUTINE-------------
011  111 1110 1001               TFB    9      OVERFLOW FLAG
012  010 0000 0100               BZ     LOCK   YOU MUST DO A CLEAR
013  100 0001 1100               SPWD
```

TABLE VI

```
014  010 0000 0000         BZ    CE      CLEAR ENTRY
015  010 0000 0000         BZ    DPT
016  010 0000 0000         BZ    PLEQ    -= KEY
017  010 0000 0000         BZ    S       CHANGING SIGN
018  010 0000 0100         BZ    LOCK    -= KEY
019  010 0000 0000         BZ    PLEQ
01A  010 0000 0000         BZ    MIN     - KEY
01B  010 0000 0000         BZ    DIVI
01C  010 0000 0000         BZ    MULT
01D  010 0000 0000         BZ    PLEQ    + KEY
*-----DATA ENTRY PRIME----------
01E  111 0000 0011         SFA   3       FLAG MISC    DATA ENTRY PRIME
01F  111 1110 0100   D3    TFB   4       FLAG DISPLAY
020  000 0000 0000         BO    D1
021  100 0000 0001   D2    CLA   ALL
022  111 0110 0100         ZFB   4       FLAG DISPLAY
023  111 0110 1010         ZFB   10      FLAG SIGN OF MONT OF A
024  111 0110 1011         ZFB   11      FLAG SIGN OF EXP OF A
025  111 1100 0010         TFA   2
026  000 0000 0000         BO    D1
027  111 1100 0001         TFA   1
028  010 0000 0000         BZ    D1
029  111 1010 1010         FFB   10      A NEGATIVE NUMBER
02A  111 1100 0011   D1    TFA   3       FLAG MISC
02B  010 0000 0000         BZ    D7
02C  101 1100 0001         DPTA
02D  101 1110 0101         SAKA  DPT1    PUT A 0 TO DPT OF A; ONLY LAST DPT EFFECTIVE
02E  000 0000 0100         BO    LOCK    ALWAYS BRANCH
*-----DIGIT ENTRY----------
02F  111 0100 0011   D7    ZFA   3       MISC
030  101 0110 0100         CAK   MSD1
031  000 0000 0000         BO    D5      DIGIT OVERFLOW
032  110 0010 0100         CAK   DPT7
033  010 0000 0000         BZ    D6
034  111 0010 1000   D5    SFB   8
035  000 0000 0100         BO    LOCK    DIGIT OVERFLOW
036  111 1110 0011   D6    TFB   3       DPT FLAG
037  000 0000 0000         BO    D4
038  101 1100 0101         AAKA  DPT1
039  100 1000 0101   D4    SLLA  MONT    LSD OF A IS MADE TO 0
03A  100 0000 0000         WD11
03B  100 1110 0000         SOCN
03C  100 1100 0101         AAKA  LSD1
03D  010 0000 0100         BZ    LOCK    ALWAYS BRANCH
*-----DPT ENTRY----------
03E  111 0010 0011   DPT   SFB   3       DPT FLAG
03F  000 0001 1111         BO    D3      ALWAYS BRANCH
*-----------------------
040  111 0010 0010   MIN   SFB   2       SUBTRACT COMMAND
041  111 0110 0001   PLEQ  ZFB   1       CURR OP 1
042  111 1100 0001         TFA   1       PREV OP 1
043  000 0000 0000         BO    OP2
044  111 0000 0000   OP5   SFA   0       P-FLAG
045  000 0000 0000         BO    PRE     ALWAYS BRANCH
046  111 0010 0010   DIVI  SFB   2
047  111 0010 0001   MULT  SFB   1
048  111 1100 0001         TFA   1       PREV OP 1
049  000 0000 0000         BO    OP6
04A  111 1110 0100   OP2   TFB   4       DISPLAY FLAG
04B  000 0100 0100         BO    OP5
04C  111 1110 0001         TFB   1       CURR OP FLAG 1
04D  010 0000 0000         BZ    OP1     ONLY LAST *,/ OPERATOR IS EFFECTIVE
04E  100 0000 0111   OP6   AAKC  ALL
04F  111 0100 1010         ZFA   10      SIGN OF MONT OF C
050  111 1110 1010         TFB   10      SIGN OF MONT OF A
051  000 0000 0000         BO    OP1
052  111 0000 1010         SFA   10
053  110 1100 0001   OP1   XFA   1       EXCHANGE CURRENT 1 WITH PREV 1
054  110 1100 0010         XFA   2       EXCHANGE CURRENT 2 WITH PREV 2
055  111 0110 0011   OP3   ZFB   3       DPT FLAG
056  111 0010 0100         SFB   4       FLAG DISPLAY
057  000 0000 0100         BO    LOCK    ALWAYS BRANCH
*-----CLEAR ENTRY---------
058  111 0110 0011   CE    ZFB   3       FLAG DPT
059  111 0110 1000         ZFB   8
05A  000 0010 0001         BO    D2      ALWAYS BRANCH
*----- CHANGE SIGN-------
05B  111 1010 1010   S     FFB   10
05C  000 0000 0100         BO    LOCK    ALWAYS BRANCH
*-----ADD AND SUBTRACT---------------
05D  110 1000 1011   A/S   CFA   11      COMPARING EXP SIGNS
05E  000 0000 0000         BO    AS2
05F  100 0111 0000         CAB   EXP
060  000 0000 0000         BO    AS3
```

TABLE VI

```
061  100 0001 1000        EXAB  ALL
062  110 1100 1010        XFA   10
063  100 0111 0011  AS3   SABC  EXP
064  111 1100 1011        TFA   11    SIGN OF EXP
065  000 0000 0000        BO    AS4
066  100 0001 1000        EXAB  ALL
067  110 1100 1010        XFA   10
068  101 1010 1111  AS4   SCKC  EXP1
069  010 0000 0000        BZ    AS5
06A  100 1010 1010        SRLB  MONT
06B  000 0110 1000        BO    AS4   ALWAYS BRANCH
06C  111 1100 1011  AS2   TFA   11
06D  010 0000 0000        BZ    AS6
06E  100 0001 1000  AS7   EXAB  ALL
06F  110 1100 1010        XFA   10
070  110 1100 1011        XFA   11
071  101 0010 0100  AS6   CAK   M11
072  010 0110 1110        BZ    AS7
073  100 0101 0011        AABC  EXP
074  000 0110 1000        BO    AS4   ALWAYS BRANCH
075  100 1011 0000  AS5   CAB   MONT
076  000 0000 0000        BO    AS9
077  100 0001 1000        EXAB  ALL
078  110 1100 1010        XFA   10
079  110 1000 1010  AS9   CFA   10
07A  010 0000 0000        BZ    AS8
07B  100 1011 0001        SABA  MONT
07C  000 0000 0000        BO    PRE   ALWAYS BRANCH
07D  100 1001 0001  AS8   AABA  MONT
*-----PRENORMALIZING A NUMBER----------
07E  101 0010 0100  PRE   CAK   M11
07F  010 0000 0000        BZ    A91   DATA IS ZERO
080  101 0100 0010        MSDB
081  100 1000 1010        SLLB  MONT
082  100 1011 0000        CAB   M19   IS M9 OF A NON-ZERO ?
083  010 0000 0000        BZ    A2    MSD OF A ZERO
084  100 1010 0101        SRLA  MONT
085  111 1110 1011        TFB   11    SIGN OF EXP
086  010 0000 0000        BZ    A13
087  101 1000 0101        AAKA  EXP1
088  110 0010 0100  A2    CAK   DPT7
089  010 0000 0000        BZ    A3    DPT OF A LESS THAN 7
08A  101 0110 0100        CAK   M81
08B  000 0000 0000        BO    A9
08C  100 1000 0101        SLLA  MONT
08D  111 1110 1011        TFB   11    SIGN OF EXP
08E  010 0000 0000        BZ    A4    EXP OF A IS -
08F  101 1010 0100  A5    CAK   EXP1
090  010 0000 0000        BZ    A6    EXP OF A IS ZERO
091  101 1010 0101        SAKA  EXP1
092  000 1000 1000        BO    A2    ALWAYS BRANCH
093  101 1010 0101  A13   SAKA  EXP1
094  000 1000 1000        BO    A2    ALWAYS BRANCH
095  101 1100 0101  A3    AAKA  DPT1
096  101 0110 0100        CAK   M81
097  010 0000 0000        BZ    A8    M8 OF A IS ZERO
098  111 1110 1011        TFB   11    SIGN OF EXP
099  010 1000 1111        BZ    A5    SIGN OF E OF A IS NEGATIVE
09A  110 0110 0100  A4    CAK   EXP7
09B  010 0000 0000        BZ    A7    EXP OF A LESS THAN 7
09C  111 0010 1001        SFB   9     OVERFLOW
09D  110 0110 0101        SAKA  EXP7
09E  000 0000 0000        BO    A7    ALWAYS BRANCH
09F  111 1010 1011  A6    FFB   11    CHANGE SIGN OF EXP OF A
0A0  101 1000 0101  A7    AAKA  EXP1
0A1  000 1000 1000        BO    A2    ALWAYS BRANCH
0A2  100 1000 0101  A8    SLLA  MONT
0A3  000 1000 1000        BO    A2    ALWAYS BRANCH
0A4  100 0000 0001  A91   CLA   ALL
0A5  111 1100 0000  A9    TFA   0     P-FLAG
0A6  000 0000 0000        BO    POST
0A7  100 0001 1000        EXAB  ALL
0A8  100 0000 1101        ACKA  ALL
0A9  100 0000 1011        ABKC  ALL
0AA  110 1100 1011        XFA   11
0AB  111 1100 1000        TFA   8     A SPECIAL FLAG OFR PRE ROUTINE
0AC  111 1000 1000        FFA   8
0AD  000 0111 1110        BO    PRE
0AE  111 0100 0000        ZFA   0     P-FLAG
0AF  111 1100 0001        TFA   1
0E0  000 0101 1101        BO    A/S
*-----MULTIPLY AND DIVIDE----------
0B1  111 1100 0010  M/D   TFA   2     PREV OP 2
0B2  000 0000 0000        BO    M1
0B3  111 1100 0111        TFA   7     C-REG CONTAINING A CONSTANT ?
```

TABLE VI

```
OB4  010 0000 0000            BZ    M1
OB5  100 0001 1000            EXAB  ALL
OB6  110 1100 1011            XFA   11
OB7  111 0100 0111    M1      ZFA   7      RESET THE CONSTANT FLAG IN CASE K IS RELEASED
OB8  100 0000 0000            WD11
OB9  100 1000 0000            KQCD
OBA  000 0000 0000            BO    M22
OBB  111 0000 0111            SFA   7      C-REG CONTAINS A CONSTANT
OBC  110 1000 1010    M22     CFA   10
OBD  111 0110 1010            ZFB   10
OBE  010 0000 0000            BZ    M2
OBF  111 0010 1010            SFB   10
OC0  110 1000 1011    M2      CFA   11
OC1  000 0000 0000            BO    M20       UNLIKE E SIGNS
OC2  111 1100 0010            TFA   2         * OR /
OC3  010 0000 0000            BZ    M3        /
OC4  100 0101 0001    M21     AABA  EXP
OC5  000 0000 0000            BO    M4        ALWAYS BRANCH
OC6  111 1100 0010    M20     TFA   2         * OR /
OC7  010 1100 0100            BZ    M21       /
OC8  100 0111 0000            CAB   EXP
OC9  000 0000 0000            BO    M3
OCA  111 1010 1011            FFB   11
OCB  100 0111 0001    M3      SABA  EXP
OCC  000 0000 0000            BO    M4
OCD  100 0101 0001            AABA  EXP
OCE  100 0001 1000            EXAB  ALL
OCF  100 0111 0001            SABB  EXP
OD0  100 0001 1000            EXAB  ALL
OD1  111 1100 0010            TFA   2         * OR /
OD2  000 0000 0000            BO    M4        *
OD3  111 1010 1011            FFB   11
OD4  101 0010 0100    M4      CAK   M11
OD5  010 0000 0000            BZ    M8        TAKE CARE OF 0/A, 0/0, A*0 THE RESULT IS 0
OD6  100 1000 0111            AAKC  MONT
OD7  100 1000 0001            CLA   MONT
OD8  111 1100 0010            TFA   2         PREV OP 2
OD9  000 0000 0000            BO    M5        MULTIPLY
ODA  100 1011 0100    M6      CCB   MONT
ODB  010 0000 0000            BZ    M7
ODC  100 1011 0111            SCBC  MONT
ODD  101 0000 0101            AAKA  M11
ODE  000 1101 1010            BO    M6
ODF  101 0010 0101            SAKA  M11       OVFLOW
OE0  111 0010 1001            SFB   9
OE1  000 0000 0100            BO    LOCK      ALWAYS BRANCH
OE2  101 0110 0100    M7      CAK   MSD1
OE3  000 0000 0000            BO    M8        DIVISION DONE, WITH OR WITHOUT REMAINDER
OE4  101 0010 0100            CAK   M11
OE5  000 0000 0000            BO    M23
OE6  111 1110 1011            TFB   11        SIGN OF EXP OF A
OE7  010 0000 0000            BZ    M24
OE8  101 1010 0100            CAK   EXP1
OE9  000 0000 0000            BO    M25
OEA  111 0010 1011            SFB   11
OEB  101 1000 0101    M24     AAKA  EXP1
OEC  000 0000 0000            BO    M23       ALWAYS BRANCH
OED  101 1010 0101    M25     SAKA  EXP1
OEE  100 1000 0101    M23     SLLA  MONT
OEF  101 0010 1100            CCK   M11
OF0  010 1110 0010            BZ    M7
OF1  100 1000 1111            SLLC  MONT
OF2  000 1101 1010            BO    M6        ALWAYS BRANCH
OF3  100 1010 1111    M9      SRLC  MONT
OF4  101 0010 1100            CCK   M11
OF5  010 0000 0000            BZ    M8
OF6  100 1010 0101            SRLA  MONT
OF7  100 1110 1111    M5      SCKC  LSD1
OF8  010 1111 0011            BZ    M9
OF9  100 1001 0001            AABA  MONT
OFA  000 1111 0111            BO    M5        ALWAYS BRANCH
OFB  100 0000 1011    M8      ABKC  ALL
OFC  111 1110 0001            TFB   1         CURR OP 1
OFD  000 0000 0000            BO    M12
OFE  111 0100 0111            ZFA   7
OFF  111 1100 0111    M12     TFA   7         CONSTANT IN C-REG ?
100  010 0111 1110            BZ    PRE
101  111 0100 0001            ZFA   1         PREV OP 1
102  111 0100 0010            ZFA   2         RESET PREV OP 2
103  000 0111 1110            BO    PRE       ALWAYS BRANCH
                     *-----POST NORMALIZATION ROUTINE--------
104  100 1010 0101    P2      SRLA  MONT
105  101 1010 0100    POST    CAK   EXP1
106  010 0000 0000            BZ    P1
```

TABLE VI

```
107  101 1010 0101         SAKA  EXP1
108  111 1110 1011         TFB   11    SIGN OF EXP OF A
109  011 0000 0100         BZ    P2
10A  110 0110 0100         CAK   EXP7
10B  010 0000 0000         BZ    P7
10C  110 0110 0101         SAKA  EXP7
10D  111 0010 1001         SFB   9     OVERFLOW
10E  001 0000 0101         BO    POST  ALWAYS BRANCH
10F  101 1110 0101   P7    SAKA  DPT1
110  001 0000 0101         BO    POST     ALWAYS BRANCH
111  111 0110 1011   P1    ZFB   11
112  111 1110 1001         TFB   9     OVERFLOW
113  010 0000 0000         BZ    OP4   NOT SET DESIRED DPT OR LOSE TRAILING 0 IF OVFLOW
114  100 1110 0100   P5    CAK   LSD1
115  000 0000 0000         BO    P4
116  101 1110 0100         CAK   DPT1
117  010 0000 0000         BZ    P4
118  100 1010 0101         SRLA  MONT     GETTING RID OF TRAILING ZEROS
119  101 1110 0101         SAKA  DPT1
11A  001 0001 0100         BO    P5    ALWAYS BRANCH
11B  111 1110 0001   P4    TFB   1     CURR OP 1
11C  010 0000 0000         BZ    OP4     INTERMEDIATE RESULT IN FLOATING MODE
11D  100 0001 1000         EXAB  ALL
11E  100 0000 0001         CLA   ALL
11F  100 0000 0000         WD11
120  100 0010 0000         KPCD
121  010 0000 0000         BZ    P3    FIXED POINT MODE
122  100 0001 1000         EXAB  ALL     FLOATING MODE
123  111 1100 0111   OP4   TFA   7     CONSTANT IN C-REG ?
124  010 0101 0101         BZ    OP3
125  000 0100 1110         BO    OP6   ALWAYS BRANCH
126  100 0000 0000   P3    WD11
127  100 1100 0001         SOCP
128  000 0000 0000         BO    NEXT
129  100 1100 0101   NEXT  AAKA  LSD1  RESET COND CODE
12A  100 0010 0101         SRLA  ALL   DESIRED DECIMAL PLACE GOES TO EXP OF A
12B  100 0001 1010         SLLB  ALL   ACTUAL DECIMAL PLACE GOES TO EXP OF B
12C  100 1010 1010         SRLB  MONT
12D  100 0111 0000         CAB   EXP
12E  100 0001 1000         EXAB  ALL
12F  000 0000 0000         BO    P6
130  101 1010 0101   P8    SAKA  EXP1
131  100 1010 0101         SRLA  MONT
132  100 0001 1000         EXAB  ALL
133  100 0111 0000         CAB   EXP
134  100 0001 1000         EXAB  ALL
135  011 0011 0000         BZ    P8
136  100 1000 0101   P9    SLLA  MONT
137  100 0010 0101         SRLA  ALL
138  001 0010 0011         BO    OP4   ALWAYS BRANCH
139  100 0111 0000         CAB   EXP
13A  001 0011 0110         BO    P9       DESIRED DPT = ACTUAL DPT
13B  101 0110 0100         CAK   MSD1  A8 NON-ZERO ?
13C  001 0011 0110         BO    P9    CAN NOT ADJUST TO EQUAL DPT
13D  100 1000 0101         SLLA  MONT
13E  101 1000 0101         AAKA  EXP1
13F  001 0011 1001         BO    P6    ALWAYS BRANCH
```

TABLE VII ... EXAMPLE INSTRUCTION TRACE ... DATA CARD 157 ($7.79 -= $) ...

| PC | I-REG | A-REG | B-REG | C-REG | FLAGS (A) | FLAGS (B) | C | KPP | KNP | KDP | KQP |
|----|-------|-------|-------|-------|-----------|-----------|---|-----|-----|-----|-----|
| 00F | 460 | 00003249202 | 00000000000 | 00003249202 | 01000000000 | 00001000000000 | 0 | 9 | 9 | 9 | 9 |
| 010 | 009 | 00003249202 | 00000000000 | 00003249202 | 01000000000 | 00001000000000 | 1 | 9 | 9 | 9 | 9 |
| 011 | 7E9 | 00003249202 | 00000000000 | 00003249202 | 01000000000 | 00001000000000 | 1 | 9 | 9 | 9 | 9 |
| 012 | 204 | 00003249202 | 00000000000 | 00003249202 | 01000000000 | 00001000000000 | 1 | 9 | 8 | 9 | 9 |
| 013 | 41C | 00003249202 | 00000000000 | 00003249202 | 01000000000 | 00001000000000 | 1 | 9 | 9 | 9 | 9 |
| 014 | 253 | 00003249202 | 00000000000 | 00003249202 | 01000000000 | 00001000000000 | 1 | 9 | 9 | 9 | 9 |
| 015 | 239 | 00003249202 | 00000000000 | 00003249202 | 01000000000 | 00001000000000 | 1 | 9 | 9 | 7 | 9 |
| 016 | 23C | 00003249202 | 00000000000 | 00003249202 | 01000000000 | 00001000000000 | 1 | 9 | 9 | 6 | 9 |
| 017 | 256 | 00003249202 | 00000000000 | 00003249202 | 01000000000 | 00001000000000 | 1 | 9 | 9 | 5 | 9 |
| 018 | 239 | 00003249202 | 00000000000 | 00003249202 | 01000000000 | 00001000000000 | 1 | 9 | 9 | 4 | 9 |
| 019 | 23C | 00003249202 | 00000000000 | 00003249202 | 01000000000 | 00001000000000 | 1 | 9 | 9 | 3 | 9 |
| 01A | 204 | 00003249202 | 00000000000 | 00003249202 | 01000000000 | 00001000000000 | 1 | 9 | 9 | 2 | 9 |
| 01B | 241 | 00003249202 | 00000000000 | 00003249202 | 01000000000 | 00001000000000 | 1 | 9 | 9 | 1 | 9 |
| 01C | 242 | 00003249202 | 00000000000 | 00003249202 | 01000000000 | 00001000000000 | 1 | 9 | 9 | 0 | 9 |
| 01D | 23C | 00003249202 | 00000000000 | 00003249202 | 01000000000 | 00001000000000 | 1 | 9 | 9 | 0 | 9 |
| 01E | 703 | 00003249202 | 00000000000 | 00003249202 | 01010000000 | 00001000000000 | 0 | 9 | 9 | 0 | 9 |
| 01F | 7E4 | 00003249202 | 00000000000 | 00003249202 | 01010000000 | 00001000000000 | 1 | 9 | 9 | 0 | 9 |
| 020 | 025 | 00003249202 | 00000000000 | 00003249202 | 01010000000 | 00001000000000 | 1 | 9 | 9 | 0 | 9 |
| 021 | 401 | 00000000000 | 00000000000 | 00003249202 | 01010000000 | 00001000000000 | 1 | 9 | 9 | 0 | 9 |
| 022 | 764 | 00000000000 | 00000000000 | 00003249202 | 01010000000 | 00000000000000 | 1 | 9 | 9 | 0 | 9 |
| 023 | 76A | 00000000000 | 00000000000 | 00003249202 | 01010000000 | 00000000000000 | 1 | 9 | 9 | 0 | 9 |
| 024 | 76B | 00000000000 | 00000000000 | 00003249202 | 01010000000 | 00000000000000 | 1 | 9 | 9 | 0 | 9 |
| 025 | 7C3 | 00000000000 | 00000000000 | 00003249202 | 01010000000 | 00000000000000 | 0 | 9 | 9 | 0 | 9 |
| 026 | 22A | 00000000000 | 00000000000 | 00003249202 | 01010000000 | 00000000000000 | 1 | 9 | 9 | 0 | 9 |

TABLE VII...

| PC | I-REG | A-REG | B-REG | C-REG | FLAGS (A) | FLAGS (B) | C | KP | KN | KO | KQ |
|---|---|---|---|---|---|---|---|---|---|---|---|
| 02A | 743 | 00000000000 | 00000000000 | 00003249202 | 01000000000 | 00000000000 | 1 | 9 | 9 | 0 | 9 |
| 02B | 564 | 00000000000 | 00000000000 | 00003249202 | 01000000000 | 00000000000 | 0 | 9 | 9 | 0 | 0 |
| 02C | 02F | 00000000000 | 00000000000 | 00003249202 | 01000000000 | 00000000000 | 0 | 9 | 9 | 0 | 0 |
| 02D | 624 | 00000000000 | 00000000000 | 00003249202 | 01000000000 | 00000000000 | 0 | 9 | 9 | 0 | 0 |
| 02E | 231 | 00000000000 | 00000000000 | 00003249202 | 01000000000 | 00000000000 | 1 | 9 | 9 | 0 | 0 |
| 031 | 7E3 | 00000000000 | 00000000000 | 00003249202 | 01000000000 | 00000000000 | 1 | 9 | 9 | 0 | 9 |
| 032 | 034 | 00000000000 | 00000000000 | 00003249202 | 01000000000 | 00000000000 | 1 | 9 | 9 | 0 | 0 |
| 034 | 485 | 00000000000 | 00000000000 | 00003249202 | 01000000000 | 00000000000 | 1 | 9 | 9 | 0 | 0 |
| 035 | 400 | 00000000000 | 00000000000 | 00003249202 | 01000000000 | 00000000000 | 1 | 9 | 9 | 9 | 0 |
| 036 | 4E1 | 00000000600 | 00000000000 | 00003249202 | 01000000000 | 00000000000 | 0 | 9 | 5 | 9 | 0 |
| 037 | 4C5 | 00000000700 | 00000000000 | 00003249202 | 01000000000 | 00000000000 | 0 | 9 | 5 | 9 | 0 |
| 038 | 204 | 00000000700 | 00000000000 | 00003249202 | 01000000000 | 00000000000 | 1 | 9 | 5 | 9 | 0 |
| 004 | 400 | 00000000700 | 00000000000 | 00003249202 | 01000000000 | 00000000000 | 1 | 9 | 9 | 9 | 0 |
| 005 | 762 | 00000000700 | 00000000000 | 00003249202 | 01000000000 | 00000000000 | 1 | 9 | 9 | 9 | 9 |
| 006 | 400 | 00000000700 | 00000000000 | 00003249202 | 01000000000 | 00000000000 | 1 | 9 | 9 | 9 | 9 |
| 007 | 460 | 00000000700 | 00000000000 | 00003249202 | 01000000000 | 00000000000 | 1 | 9 | 8 | 8 | 9 |
| 008 | 204 | 00000000700 | 00000000000 | 00003249202 | 01000000000 | 00000000000 | 1 | 9 | 8 | 8 | 9 |
| 009 | 400 | 00000000700 | 00000000000 | 00003249202 | 01000000000 | 00000000000 | 1 | 9 | 9 | 9 | 9 |
| 00A | 460 | 00000000700 | 00000000000 | 00003249202 | 01000000000 | 00000000000 | 0 | 9 | 8 | 9 | 9 |
| 00B | 400 | 00000000700 | 00000000000 | 00003249202 | 01000000000 | 00000000000 | 0 | 9 | 9 | 9 | 9 |
| 00C | 009 | 00000000700 | 00000000000 | 00003249202 | 01000000000 | 00000000000 | 1 | 9 | 9 | 9 | 9 |
| 00D | 400 | 00000000700 | 00000000000 | 00003249202 | 01000000000 | 00000000000 | 1 | 9 | 9 | 9 | 9 |
| 00E | 400 | 00000000700 | 00000000000 | 00003249202 | 01000000000 | 00000000000 | 1 | 9 | 9 | 9 | 9 |
| 00F | 460 | 00000000700 | 00000000000 | 00003249202 | 01000000000 | 00000000000 | 0 | 9 | 8 | 8 | 9 |
| 010 | 009 | 00000000700 | 00000000000 | 00003249202 | 01000000000 | 00000000000 | 1 | 9 | 8 | 8 | 9 |
| 011 | 7E9 | 00000000700 | 00000000000 | 00003249202 | 01000000000 | 00000000000 | 1 | 9 | 8 | 8 | 9 |
| 012 | 204 | 00000000700 | 00000000000 | 00003249202 | 01000000000 | 00000000000 | 1 | 9 | 9 | 8 | 9 |
| 013 | 41C | 00000000700 | 00000000000 | 00003249202 | 01000000000 | 00000000000 | 1 | 9 | 9 | 9 | 9 |
| 014 | 253 | 00000000700 | 00000000000 | 00003249202 | 01000000000 | 00000000000 | 1 | 9 | 9 | 8 | 9 |
| 015 | 239 | 00000000700 | 00000000000 | 00003249202 | 01000000000 | 00000000000 | 1 | 9 | 9 | 7 | 9 |
| 039 | 723 | 00000000700 | 00000000000 | 00003249202 | 01000000000 | 00010000000 | 1 | 9 | 9 | 7 | 9 |
| 03A | 01F | 00000000700 | 00000000000 | 00003249202 | 01000000000 | 00010000000 | 1 | 9 | 9 | 7 | 9 |
| 01F | 7E4 | 00000000700 | 00000000000 | 00003249202 | 01000000000 | 00010000000 | 1 | 9 | 9 | 7 | 9 |
| 020 | 025 | 00000000700 | 00000000000 | 00003249202 | 01000000000 | 00010000000 | 1 | 9 | 9 | 7 | 9 |
| 025 | 7C3 | 00000000700 | 00000000000 | 00003249202 | 01000000000 | 00010000000 | 1 | 9 | 9 | 7 | 9 |
| 026 | 22A | 00000000700 | 00000000000 | 00003249202 | 01000000000 | 00010000000 | 1 | 9 | 0 | 7 | 9 |
| 027 | 5C1 | 00000000701 | 00000000000 | 00003249202 | 01000000000 | 00010000000 | 1 | 9 | 9 | 7 | 9 |
| 028 | 5E5 | 00000000700 | 00000000000 | 00003249202 | 01000000000 | 00010000000 | 1 | 9 | 9 | 7 | 9 |
| 029 | 004 | 00000000700 | 00000000000 | 00003249202 | 01000000000 | 00010000000 | 1 | 9 | 9 | 7 | 9 |
| 004 | 400 | 00000000700 | 00000000000 | 00003249202 | 01000000000 | 00010000000 | 1 | 9 | 9 | 9 | 9 |
| 005 | 762 | 00000000700 | 00000000000 | 00003249202 | 01000000000 | 00010000000 | 1 | 9 | 9 | 9 | 9 |
| 006 | 400 | 00000000700 | 00000000000 | 00003249202 | 01000000000 | 00010000000 | 1 | 9 | 9 | 9 | 9 |
| 007 | 460 | 00000000700 | 00000000000 | 00003249202 | 01000000000 | 00010000000 | 1 | 9 | 8 | 8 | 9 |
| 008 | 204 | 00000000700 | 00000000000 | 00003249202 | 01000000000 | 00010000000 | 1 | 9 | 8 | 8 | 9 |
| 009 | 400 | 00000000700 | 00000000000 | 00003249202 | 01000000000 | 00010000000 | 1 | 9 | 9 | 9 | 9 |
| 00A | 460 | 00000000700 | 00000000000 | 00003249202 | 01000000000 | 00010000000 | 0 | 9 | 8 | 8 | 9 |
| 00B | 400 | 00000000700 | 00000000000 | 00003249202 | 01000000000 | 00010000000 | 0 | 9 | 9 | 9 | 9 |
| 00C | 009 | 00000000700 | 00000000000 | 00003249202 | 01000000000 | 00010000000 | 1 | 9 | 9 | 9 | 9 |
| 00D | 400 | 00000000700 | 00000000000 | 00003249202 | 01000000000 | 00010000000 | 1 | 9 | 9 | 9 | 9 |
| 00E | 400 | 00000000700 | 00000000000 | 00003249202 | 01000000000 | 00010000000 | 1 | 9 | 9 | 9 | 9 |
| 00F | 460 | 00000000700 | 00000000000 | 00003249202 | 01000000000 | 00010000000 | 0 | 9 | 8 | 8 | 9 |
| 010 | 009 | 00000000700 | 00000000000 | 00003249202 | 01000000000 | 00010000000 | 0 | 9 | 8 | 8 | 9 |
| 011 | 7F9 | 00000000700 | 00000000000 | 00003249202 | 01000000000 | 00010000000 | 1 | 9 | 8 | 8 | 9 |
| 012 | 204 | 00000000700 | 00000000000 | 00003249202 | 01000000000 | 00010000000 | 1 | 9 | 8 | 8 | 9 |
| 013 | 41C | 00000000700 | 00000000000 | 00003249202 | 01000000000 | 00010000000 | 1 | 9 | 9 | 9 | 9 |
| 014 | 253 | 00000000700 | 00000000000 | 00003249202 | 01000000000 | 00010000000 | 1 | 9 | 9 | 8 | 9 |
| 015 | 239 | 00000000700 | 00000000000 | 00003249202 | 01000000000 | 00010000000 | 1 | 9 | 9 | 7 | 9 |
| 016 | 23C | 00000000700 | 00000000000 | 00003249202 | 01000000000 | 00010000000 | 1 | 9 | 9 | 6 | 9 |
| 017 | 256 | 00000000700 | 00000000000 | 00003249202 | 01000000000 | 00010000000 | 1 | 9 | 9 | 5 | 9 |
| 018 | 238 | 00000000700 | 00000000000 | 00003249202 | 01000000000 | 00010000000 | 1 | 9 | 9 | 4 | 9 |
| 019 | 23C | 00000000700 | 00000000000 | 00003249202 | 01000000000 | 00010000000 | 1 | 9 | 9 | 3 | 9 |
| 01A | 204 | 00000000700 | 00000000000 | 00003249202 | 01000000000 | 00010000000 | 1 | 9 | 9 | 2 | 9 |
| 01B | 241 | 00000000700 | 00000000000 | 00003249202 | 01000000000 | 00010000000 | 1 | 9 | 9 | 1 | 9 |
| 01C | 242 | 00000000700 | 00000000000 | 00003249202 | 01000000000 | 00010000000 | 1 | 9 | 9 | 0 | 9 |
| 01D | 23C | 00000000700 | 00000000000 | 00003249202 | 01000000000 | 00010000000 | 1 | 9 | 9 | 0 | 9 |
| 01E | 703 | 00000000700 | 00000000000 | 00003249202 | 01010000000 | 00010000000 | 1 | 9 | 9 | 0 | 9 |
| 01F | 7E4 | 00000000700 | 00000000000 | 00003249202 | 01010000000 | 00010000000 | 1 | 9 | 9 | 0 | 9 |
| 020 | 025 | 00000000700 | 00000000000 | 00003249202 | 01010000000 | 00010000000 | 1 | 9 | 9 | 0 | 9 |
| 025 | 7C3 | 00000000700 | 00000000000 | 00003249202 | 01010000000 | 00010000000 | 0 | 9 | 9 | 0 | 9 |
| 026 | 22A | 00000000700 | 00000000000 | 00003249202 | 01010000000 | 00010000000 | 1 | 9 | 0 | 0 | 9 |
| 02A | 743 | 00000000700 | 00000000000 | 00003249202 | 01000000000 | 00010000000 | 1 | 9 | 9 | 0 | 9 |
| 02B | 564 | 00000000700 | 00000000000 | 00003249202 | 01000000000 | 00010000000 | 0 | 9 | 9 | 0 | 0 |
| 02C | 02F | 00000000700 | 00000000000 | 00003249202 | 01000000000 | 00010000000 | 1 | 9 | 9 | 0 | 0 |
| 02D | 624 | 00000000700 | 00000000000 | 00003249202 | 01000000000 | 00010000000 | 0 | 9 | 9 | 0 | 0 |
| 02E | 231 | 00000000700 | 00000000000 | 00003249202 | 01000000000 | 00010000000 | 1 | 9 | 9 | 0 | 0 |
| 031 | 7E3 | 00000000700 | 00000000000 | 00003249202 | 01000000000 | 00010000000 | 0 | 9 | 9 | 0 | 9 |
| 032 | 034 | 00000000700 | 00000000000 | 00003249202 | 01000000000 | 00010000000 | 1 | 9 | 9 | 0 | 9 |
| 033 | 5C5 | 00000000701 | 00000000000 | 00003249202 | 01000000000 | 00010000000 | 1 | 9 | 9 | 0 | 9 |
| 034 | 485 | 00000007001 | 00000000000 | 00003249202 | 01000000000 | 00010000000 | 1 | 9 | 9 | 0 | 9 |
| 035 | 400 | 00000007001 | 00000000000 | 00003249202 | 01000000000 | 00010000000 | 1 | 9 | 9 | 9 | 9 |
| 036 | 4E1 | 00000007601 | 00000000000 | 00003249202 | 01000000000 | 00010000000 | 0 | 9 | 5 | 9 | 9 |
| 037 | 4C5 | 00000007701 | 00000000000 | 00003249202 | 01000000000 | 00010000000 | 0 | 9 | 5 | 9 | 9 |
| 038 | 204 | 00000007701 | 00000000000 | 00003249202 | 01000000000 | 00010000000 | 1 | 9 | 5 | 9 | 9 |
| 004 | 400 | 00000007701 | 00000000000 | 00003249202 | 01000000000 | 00010000000 | 1 | 9 | 9 | 9 | 9 |
| 005 | 762 | 00000007701 | 00000000000 | 00003249202 | 01000000000 | 00010000000 | 1 | 9 | 9 | 9 | 9 |
| 006 | 400 | 00000007701 | 00000000000 | 00003249202 | 01000000000 | 00010000000 | 1 | 9 | 9 | 9 | 9 |
| 007 | 460 | 00000007701 | 00000000000 | 00003249202 | 01000000000 | 00010000000 | 1 | 9 | 8 | 8 | 9 |
| 008 | 204 | 00000007701 | 00000000000 | 00003249202 | 01000000000 | 00010000001 | 1 | 9 | 8 | 8 | 9 |
| 009 | 400 | 00000007701 | 00000000000 | 00003249202 | 01000000000 | 00010000000 | 1 | 9 | 9 | 9 | 9 |
| 00A | 460 | 00000007701 | 00000000000 | 00003249202 | 01000000000 | 00010000000 | 0 | 9 | 8 | 8 | 9 |
| 008 | 400 | 00000007701 | 00000000000 | 00003249202 | 01000000000 | 00010000000 | 0 | 9 | 9 | 9 | 9 |

TABLE VII....

| PC | I-REG | A-REG | B-REG | C-REG | FLAGS (A) | FLAGS (B) | C | KP | KN | KO | KQ |
|---|---|---|---|---|---|---|---|---|---|---|---|
| 00C | 009 | 00000007701 | 00000000000 | 00003249202 | 01000000000 | 00010000000 | 1 | 0 | 9 | 0 | 0 |
| 00D | 400 | 00000007701 | 00000000000 | 00003249202 | 01000000000 | 00010000000 | 1 | 0 | 0 | 0 | 0 |
| 00E | 400 | 00000007701 | 00000000000 | 00003249202 | 01000000000 | 00010000000 | 1 | 0 | 0 | 0 | 0 |
| 00F | 460 | 00000007701 | 00000000000 | 00003249202 | 01000000000 | 00010000000 | 0 | 0 | 8 | 8 | 0 |
| 010 | 009 | 00000007701 | 00000000000 | 00003249202 | 01000000000 | 00010000000 | 1 | 0 | 8 | 8 | 0 |
| 011 | 7E9 | 00000007701 | 00000000000 | 00003249202 | 01000000000 | 00010000000 | 1 | 0 | 8 | 8 | 0 |
| 012 | 204 | 00000007701 | 00000000000 | 00003249202 | 01000000000 | 00010000000 | 1 | 0 | 8 | 8 | 0 |
| 013 | 41C | 00000007701 | 00000000000 | 00003249202 | 01000000000 | 00010000000 | 1 | 0 | 8 | 8 | 0 |
| 014 | 253 | 00000007701 | 00000000000 | 00003249202 | 01000000000 | 00010000000 | 1 | 0 | 9 | 8 | 0 |
| 015 | 239 | 00000007701 | 00000000000 | 00003249202 | 01000000000 | 00010000000 | 1 | 0 | 0 | 7 | 0 |
| 016 | 23C | 00000007701 | 00000000000 | 00003249202 | 01000000000 | 00010000000 | 1 | 0 | 0 | 6 | 9 |
| 017 | 256 | 00000007701 | 00000000000 | 00003249202 | 01000000000 | 00010000000 | 1 | 0 | 0 | 5 | 9 |
| 018 | 238 | 00000007701 | 00000000000 | 00003249202 | 01000000000 | 00010000000 | 1 | 0 | 0 | 4 | 0 |
| 019 | 23C | 00000007701 | 00000000000 | 00003249202 | 01000000000 | 00010000000 | 1 | 0 | 0 | 3 | 0 |
| 01A | 204 | 00000007701 | 00000000000 | 00003249202 | 01000000000 | 00010000000 | 1 | 0 | 0 | 2 | 9 |
| 01B | 241 | 00000007701 | 00000000000 | 00003249202 | 01000000000 | 00010000000 | 1 | 0 | 0 | 1 | 9 |
| 01C | 242 | 00000007701 | 00000000000 | 00003249202 | 01000000000 | 00010000000 | 1 | 0 | 0 | 0 | 9 |
| 01D | 23C | 00000007701 | 00000000000 | 00003249202 | 01000000000 | 00010000000 | 1 | 0 | 0 | 0 | 9 |
| 01E | 703 | 00000007701 | 00000000000 | 00003249202 | 01010000000 | 00010000000 | 1 | 0 | 0 | 0 | 9 |
| 01F | 7E4 | 00000007701 | 00000000000 | 00003249202 | 01010000000 | 00010000000 | 1 | 0 | 0 | 0 | 0 |
| 020 | 025 | 00000007701 | 00000000000 | 00003249202 | 01010000000 | 00010000000 | 1 | 0 | 0 | 0 | 0 |
| 025 | 7C3 | 00000007701 | 00000000000 | 00003249202 | 01010000000 | 00010000000 | 1 | 0 | 0 | 0 | 9 |
| 026 | 22A | 00000007701 | 00000000000 | 00003249202 | 01000000000 | 00010000000 | 1 | 0 | 0 | 0 | 9 |
| 02A | 743 | 00000007701 | 00000000000 | 00003249202 | 01000000000 | 00010000000 | 0 | 0 | 0 | 0 | 0 |
| 02B | 564 | 00000007701 | 00000000000 | 00003249202 | 01000000000 | 00010000000 | 1 | 0 | 0 | 0 | 0 |
| 02C | 02F | 00000007701 | 00000000000 | 00003249202 | 01000000000 | 00010000000 | 1 | 0 | 0 | 0 | 0 |
| 02D | 624 | 00000007701 | 00000000000 | 00003249202 | 01000000000 | 00010000000 | 0 | 9 | 0 | 0 | 0 |
| 02E | 231 | 00000007701 | 00000000000 | 00003249202 | 01000000000 | 00010000000 | 1 | 0 | 0 | 0 | 0 |
| 031 | 7E3 | 00000007701 | 00000000000 | 00003249202 | 01000000000 | 00010000000 | 0 | 0 | 0 | 0 | 0 |
| 032 | 034 | 00000007701 | 00000000000 | 00003249202 | 01000000000 | 00010000000 | 1 | 0 | 0 | 0 | 0 |
| 033 | 5C5 | 00000007002 | 00000000000 | 00003249202 | 01000000000 | 00010000000 | 1 | 0 | 0 | 0 | 9 |
| 034 | 485 | 00000077002 | 00000000000 | 00003249202 | 01000000000 | 00010000000 | 1 | 0 | 0 | 0 | 0 |
| 035 | 400 | 00000077002 | 00000000000 | 00003249202 | 01000000000 | 00010000000 | 1 | 0 | 0 | 0 | 9 |
| 036 | 4E1 | 00000077802 | 00000000000 | 00003249202 | 01000000000 | 00010000000 | 0 | 0 | 7 | 0 | 0 |
| 037 | 4C5 | 00003077902 | 00000000000 | 00003249202 | 01000000000 | 00010000000 | 0 | 9 | 7 | 0 | 0 |
| 038 | 204 | 00003077902 | 00000000000 | 00003249202 | 01000000000 | 00010000000 | 1 | 0 | 7 | 9 | 0 |
| 004 | 400 | 00000077902 | 00000000000 | 00003249202 | 01000000000 | 00010000000 | 1 | 0 | 9 | 9 | 0 |
| 005 | 762 | 00000077902 | 00000000000 | 00003249202 | 01000000000 | 00010000000 | 1 | 0 | 0 | 0 | 0 |
| 006 | 400 | 00000077902 | 00000000000 | 00003249202 | 01000000000 | 00010000000 | 1 | 0 | 0 | 0 | 0 |
| 007 | 460 | 00000077902 | 00000000000 | 00003249202 | 01000000000 | 00010000000 | 1 | 0 | 8 | 8 | 0 |
| 008 | 204 | 00000077902 | 00000000000 | 00003249202 | 01000000000 | 00010000000 | 1 | 0 | 8 | 8 | 0 |
| 009 | 400 | 00000077902 | 00000000000 | 00003249202 | 01000000000 | 00010000000 | 1 | 0 | 0 | 0 | 0 |
| 00A | 460 | 00000077902 | 00000000000 | 00003249202 | 01000000000 | 00010000000 | 0 | 0 | 8 | 8 | 0 |
| 00B | 400 | 00000077902 | 00000000000 | 00003249202 | 01000000000 | 00010000000 | 1 | 0 | 0 | 0 | 0 |
| 00C | 009 | 00000077902 | 00000000000 | 00003249202 | 01000000000 | 00010000000 | 1 | 0 | 0 | 0 | 0 |
| 00D | 400 | 00000077902 | 00000000000 | 00003249202 | 01000000000 | 00010000000 | 1 | 0 | 0 | 9 | 0 |
| 00E | 400 | 00000077902 | 00000000000 | 00003249202 | 01000000000 | 00010000000 | 1 | 0 | 0 | 9 | 0 |
| 00F | 460 | 00000077902 | 00000000000 | 00003249202 | 01000000000 | 00010000000 | 0 | 0 | 8 | 8 | 0 |
| 010 | 009 | 00000077902 | 00000000000 | 00003249202 | 01000000000 | 00010000000 | 1 | 0 | 8 | 8 | 0 |
| 011 | 7E9 | 00000077902 | 00000000000 | 00003249202 | 01000000000 | 00010000000 | 1 | 0 | 8 | 8 | 0 |
| 012 | 204 | 00000077902 | 00000000000 | 00003249202 | 01000000000 | 00010000000 | 1 | 0 | 8 | 8 | 0 |
| 013 | 41C | 00000077902 | 00000000000 | 00003249202 | 01000000000 | 00010000000 | 1 | 0 | 0 | 0 | 0 |
| 014 | 253 | 00000077902 | 00000000000 | 00003249202 | 01000000000 | 00010000000 | 1 | 0 | 0 | 8 | 0 |
| 015 | 239 | 00000077902 | 00000000000 | 00003249202 | 01000000000 | 00010000000 | 1 | 0 | 0 | 7 | 0 |
| 016 | 23C | 00000077902 | 00000000000 | 00003249202 | 01000000000 | 00010000000 | 1 | 0 | 0 | 6 | 0 |
| 017 | 256 | 00000077902 | 00000000000 | 00003249202 | 01000000000 | 00010000000 | 1 | 0 | 0 | 5 | 0 |
| 018 | 238 | 00000077902 | 00000000000 | 00003249202 | 01000000000 | 00010000100 | 1 | 0 | 0 | 4 | 0 |
| 03B | 72A | -00000077902 | 00000000000 | 00003249202 | 01000000000 | 00010000100 | 1 | 0 | 0 | 4 | 0 |
| 03C | 761 | -00000077902 | 00000000000 | 00003249202 | 01000000000 | 00010000100 | 0 | 0 | 0 | 4 | 0 |
| 03D | 7C1 | -00000077902 | 00000000000 | 00003249202 | 01000000000 | 00010000100 | 0 | 0 | 0 | 4 | 9 |
| 03E | 045 | -00000077902 | 00000000000 | 00003249202 | 01000000000 | 00010000100 | 1 | 0 | 0 | 4 | 0 |
| 03F | 700 | -00000077902 | 00000000000 | 00003249202 | 11000000000 | 00010000100 | 1 | 0 | 0 | 4 | 0 |
| 040 | 079 | -00000077902 | 00000000000 | 00003249202 | 11000000000 | 00010000100 | 1 | 0 | 0 | 4 | 9 |
| 079 | 524 | -00000077902 | 00000000000 | 00003249202 | 11000000000 | 00010000100 | 1 | 0 | 0 | 4 | 0 |
| 07A | 29F | -00000077902 | 00000000000 | 00003249202 | 11000000000 | 00010000100 | 1 | 0 | 0 | 4 | 0 |
| 07B | 542 | -00000077902 | 01000000000 | 00003249202 | 11000000000 | 00010000100 | 1 | 9 | 9 | 4 | 9 |
| 07C | 48A | -00000077902 | 10000000000 | 00003249202 | 11000000000 | 00010000100 | 1 | 9 | 9 | 4 | 0 |
| 07D | 480 | -00000077902 | 10000000000 | 00003249202 | 11000000000 | 00010000100 | 0 | 0 | 0 | 4 | 0 |
| 07E | 283 | -00000077902 | 10000000000 | 00003249202 | 11000000000 | 00010000100 | 1 | 0 | 0 | 4 | 0 |
| 083 | 624 | -00000077902 | 10000000000 | 00003249202 | 11000000000 | 00010000100 | 0 | 0 | 0 | 4 | 9 |
| 084 | 290 | -00000077902 | 10000000000 | 00003249202 | 11000000000 | 00010000100 | 1 | 0 | 0 | 4 | 0 |
| 090 | 5C5 | -00000077903 | 10000000000 | 00003249202 | 11000000000 | 00010000100 | 1 | 0 | 0 | 4 | 0 |
| 091 | 564 | -00000077903 | 10000000000 | 00003249202 | 11000000000 | 00010000100 | 0 | 9 | 0 | 4 | 9 |
| 092 | 29D | -00000077903 | 10000000000 | 00003249202 | 11000000000 | 00010000100 | 1 | 0 | 0 | 4 | 0 |
| 090 | 485 | -00000077903 | 10000000000 | 00003249202 | 11000000000 | 00010000100 | 1 | 0 | 0 | 4 | 0 |
| 09E | 083 | -00000779003 | 10000000000 | 00003249202 | 11000000000 | 00010000100 | 1 | 0 | 0 | 4 | 0 |
| 083 | 624 | -00000779003 | 10000000000 | 00003249202 | 11000000000 | 00010000100 | 0 | 0 | 0 | 4 | 9 |
| 084 | 290 | -00000779003 | 10000000000 | 00003249202 | 11000000000 | 00010000100 | 1 | 0 | 0 | 4 | 0 |
| 090 | 5C5 | -00000779004 | 10000000000 | 00003249202 | 11000000000 | 00010000100 | 1 | 0 | 0 | 4 | 0 |
| 091 | 564 | -00000779004 | 10000000000 | 00003249202 | 11000000000 | 00010000100 | 0 | 0 | 0 | 4 | 0 |
| 092 | 29D | -00000779004 | 10000000000 | 00003249202 | 11000000000 | 00010000100 | 1 | 9 | 0 | 4 | 9 |
| 090 | 485 | -00007790004 | 10000000000 | 00003249202 | 11000000000 | 00010000100 | 1 | 9 | 0 | 4 | 0 |
| 09E | 083 | -00007790004 | 10000000000 | 00003249202 | 11000000000 | 00010000100 | 1 | 9 | 0 | 4 | 0 |
| 083 | 624 | -00007790004 | 10000000000 | 00003249202 | 11000000000 | 00010000100 | 0 | 0 | 0 | 4 | 9 |
| 084 | 290 | -00007790004 | 10000000000 | 00003249202 | 11000000000 | 00010000100 | 1 | 0 | 0 | 4 | 0 |
| 090 | 5C5 | -00007790005 | 10000000000 | 00003249202 | 11000000000 | 00010000100 | 1 | 9 | 0 | 4 | 0 |
| 091 | 564 | -00007790005 | 10000000000 | 00003249202 | 11000000000 | 00010000100 | 1 | 0 | 0 | 4 | 0 |
| 092 | 29D | -00007790005 | 10000000000 | 00003249202 | 11000000000 | 00010000100 | 1 | 9 | 0 | 4 | 9 |
| 090 | 485 | -00077900005 | 10000000000 | 00003249202 | 11000000000 | 00010000100 | 1 | 9 | 0 | 4 | 9 |
| 09E | 083 | -00077900005 | 10000000000 | 00003249202 | 11000000000 | 00010000100 | 0 | 0 | 0 | 4 | 0 |
| 083 | 624 | -00077900005 | 10000000000 | 00003249202 | 11000000000 | 00010000100 | 0 | 0 | 0 | 4 | 9 |
| 084 | 290 | -00077900005 | 10000000000 | 00003249202 | 11000000000 | 00010000100 | 1 | 0 | 0 | 4 | 0 |
| 090 | 5C5 | -00077900006 | 10000000000 | 00003249202 | 11000000000 | 00010000100 | 1 | 9 | 0 | 4 | 0 |

TABLE VII ...

| PC | I-REG | A-REG | B-REG | C-REG | FLAGS (A) | FLAGS (B) | C | KP | KN | KO | KQ |
|---|---|---|---|---|---|---|---|---|---|---|---|
| 091 | 564 | -00077900006 | 10000000000 | 00003249202 | 110000000000 | 000100000100 | 0 | 9 | 9 | 4 | 9 |
| 092 | 29D | -00077900006 | 10000000000 | 00003249202 | 110000000000 | 000100000100 | 1 | 9 | 9 | 4 | 9 |
| 09D | 485 | -00779000006 | 10000000000 | 00003249202 | 110000000000 | 000100000100 | 1 | 9 | 9 | 4 | 9 |
| 09E | 083 | -00779000006 | 10000000000 | 00003249202 | 110000000000 | 000100000100 | 1 | 9 | 9 | 4 | 9 |
| 083 | 624 | -00779000006 | 10000000000 | 00003249202 | 110000000000 | 000100000100 | 0 | 9 | 9 | 4 | 9 |
| 084 | 290 | -00779000006 | 10000000000 | 00003249202 | 110000000000 | 000100000100 | 1 | 9 | 9 | 4 | 9 |
| 090 | 5C5 | -00779000007 | 10000000000 | 00003249202 | 110000000000 | 000100000100 | 1 | 9 | 9 | 4 | 9 |
| 091 | 564 | -00779000007 | 10000000000 | 00003249202 | 110000000000 | 000100000100 | 0 | 9 | 9 | 4 | 9 |
| 092 | 29D | -00779000007 | 10000000000 | 00003249202 | 110000000000 | 000100000100 | 1 | 9 | 9 | 4 | 9 |
| 09D | 485 | -07790000007 | 10000000000 | 00003249202 | 110000000000 | 000100000100 | 1 | 9 | 9 | 4 | 9 |
| 09E | 083 | -07790000007 | 10000000000 | 00003249202 | 110000000000 | 000100000100 | 1 | 9 | 9 | 4 | 9 |
| 083 | 624 | -07790000007 | 10000000000 | 00003249202 | 110000000000 | 000100000100 | 1 | 9 | 9 | 4 | 9 |
| 084 | 290 | -07790000007 | 10000000000 | 00003249202 | 110000000000 | 000100000100 | 1 | 9 | 9 | 4 | 9 |
| 085 | 564 | -07790000007 | 10000000000 | 00003249202 | 110000000000 | 000100000100 | 1 | 9 | 9 | 4 | 9 |
| 086 | 0A0 | -07790000007 | 10000000000 | 00003249202 | 110000000000 | 000100000100 | 1 | 9 | 9 | 4 | 9 |
| 0A0 | 7C0 | -07790000007 | 10000000000 | 00003249202 | 110000000000 | 000100000100 | 0 | 9 | 9 | 4 | 9 |
| 0A1 | 100 | -07790000007 | 10000000000 | 00003249202 | 110000000000 | 000100000100 | 1 | 9 | 9 | 4 | 9 |
| 0A2 | 418 | -10000000000 | 07790000007 | 00003249202 | 110000000000 | 000100000100 | 1 | 9 | 9 | 4 | 9 |
| 0A3 | 40D | -00003249202 | 07790000007 | 00003249202 | 110000000000 | 000100000100 | 1 | 9 | 9 | 4 | 9 |
| 0A4 | 40B | -00003249202 | 07790000007 | 07790000007 | 110000000000 | 000100000100 | 1 | 9 | 9 | 4 | 9 |
| 0A5 | 6CB | -00003249202 | 07790000007 | 07790000007 | 110000000000 | 000100000100 | 1 | 9 | 9 | 4 | 9 |
| 0A6 | 7C8 | -00003249202 | 07790000007 | 07790000007 | 110000000000 | 000100000100 | 1 | 9 | 9 | 4 | 9 |
| 0A7 | 788 | -00003249202 | 07790000007 | 07790000007 | 110000001000 | 000100000100 | 1 | 9 | 9 | 4 | 9 |
| 0A8 | 079 | -00003249202 | 07790000007 | 07790000007 | 110000001000 | 000100000100 | 1 | 9 | 9 | 4 | 9 |
| 079 | 524 | -00003249202 | 07790000007 | 07790000007 | 110000001000 | 000100000100 | 1 | 9 | 9 | 4 | 9 |
| 07A | 29F | -00003249202 | 07790000007 | 07790000007 | 110000001000 | 000100000100 | 1 | 9 | 9 | 4 | 9 |
| 07B | 542 | -00003249202 | 01000000007 | 07790000007 | 110000001000 | 000100000100 | 1 | 9 | 9 | 4 | 9 |
| 07C | 48A | -00003249202 | 10000000007 | 07790000007 | 110000001000 | 000100000100 | 1 | 9 | 9 | 4 | 9 |
| 07D | 480 | -00003249202 | 10000000007 | 07790000007 | 110000001000 | 000100000100 | 0 | 9 | 9 | 4 | 9 |
| 07E | 283 | -00003249202 | 10000000007 | 07790000007 | 110000001000 | 000100000100 | 1 | 9 | 9 | 4 | 9 |
| 083 | 624 | -00003249202 | 10000000007 | 07790000007 | 110000001000 | 000100000100 | 0 | 9 | 9 | 4 | 9 |
| 084 | 290 | -00003249202 | 10000000007 | 07790000007 | 110000001000 | 000100000100 | 1 | 9 | 9 | 4 | 9 |
| 090 | 5C5 | -00003249203 | 10000000007 | 07790000007 | 110000001000 | 000100000100 | 1 | 9 | 9 | 4 | 9 |
| 091 | 564 | -00003249203 | 10000000007 | 07790000007 | 110000001000 | 000100000100 | 0 | 9 | 9 | 4 | 9 |
| 092 | 29D | -00003249203 | 10000000007 | 07790000007 | 110000001000 | 000100000100 | 1 | 9 | 9 | 4 | 9 |
| 09D | 485 | -00032492003 | 10000000007 | 07790000007 | 110000001000 | 000100000100 | 1 | 9 | 9 | 4 | 9 |
| 09E | 083 | -00032492003 | 10000000007 | 07790000007 | 110000001000 | 000100000100 | 1 | 9 | 9 | 4 | 9 |
| 083 | 624 | -00032492003 | 10000000007 | 07790000007 | 110000001000 | 000100000100 | 0 | 9 | 9 | 4 | 9 |
| 084 | 290 | -00032492003 | 10000000007 | 07790000007 | 110000001000 | 000100000100 | 1 | 9 | 9 | 4 | 9 |
| 090 | 5C5 | -00032492004 | 10000000007 | 07790000007 | 110000001000 | 000100000100 | 1 | 9 | 9 | 4 | 9 |
| 091 | 564 | -00032492004 | 10000000007 | 07790000007 | 110000001000 | 000100000100 | 0 | 9 | 9 | 4 | 9 |
| 092 | 29D | -00032492004 | 10000000007 | 07790000007 | 110000001000 | 000100000100 | 1 | 9 | 9 | 4 | 9 |
| 09D | 485 | -00324920004 | 10000000007 | 07790000007 | 110000001000 | 000100000100 | 1 | 9 | 9 | 4 | 9 |
| 09E | 083 | -00324920004 | 10000000007 | 07790000007 | 110000001000 | 000100000100 | 1 | 9 | 9 | 4 | 9 |
| 083 | 624 | -00324920004 | 10000000007 | 07790000007 | 110000001000 | 000100000100 | 0 | 9 | 9 | 4 | 9 |
| 084 | 290 | -00324920004 | 10000000007 | 07790000007 | 110000001000 | 000100000100 | 1 | 9 | 9 | 4 | 9 |
| 090 | 5C5 | -00324920005 | 10000000007 | 07790000007 | 110000001000 | 000100000100 | 1 | 9 | 9 | 4 | 9 |
| 091 | 564 | -00324920005 | 10000000007 | 07790000007 | 110000001000 | 000100000100 | 0 | 9 | 9 | 4 | 9 |
| 092 | 29D | -00324920005 | 10000000007 | 07790000007 | 110000001000 | 000100000100 | 1 | 9 | 9 | 4 | 9 |
| 09D | 485 | -03249200005 | 10000000007 | 07790000007 | 110000001000 | 000100000100 | 1 | 9 | 9 | 4 | 9 |
| 09E | 083 | -03249200005 | 10000000007 | 07790000007 | 110000001000 | 000100000100 | 1 | 9 | 9 | 4 | 9 |
| 083 | 624 | -03249200005 | 10000000007 | 07790000007 | 110000001000 | 000100000100 | 0 | 9 | 9 | 4 | 9 |
| 084 | 290 | -03249200005 | 10000000007 | 07790000007 | 110000001000 | 000100000100 | 1 | 9 | 9 | 4 | 9 |
| 090 | 5C5 | -03249200006 | 10000000007 | 07790000007 | 110000001000 | 000100000100 | 1 | 9 | 9 | 4 | 9 |
| 091 | 564 | -03249200006 | 10000000007 | 07790000007 | 110000001000 | 000100000100 | 1 | 9 | 9 | 4 | 9 |
| 092 | 29D | -03249200006 | 10000000007 | 07790000007 | 110000001000 | 000100000100 | 1 | 9 | 9 | 4 | 9 |
| 093 | 7E8 | -03249200006 | 10000000007 | 07790000007 | 110000001000 | 000100000100 | 1 | 9 | 9 | 4 | 9 |
| 094 | 28A | -03249200006 | 10000000007 | 07790000007 | 110000001000 | 000100000100 | 1 | 9 | 9 | 4 | 9 |
| 095 | 664 | -03249200006 | 10000000007 | 07790000007 | 110000001000 | 000100000100 | 0 | 9 | 9 | 4 | 9 |
| 096 | 298 | -03249200006 | 10000000007 | 07790000007 | 110000001000 | 000100000100 | 1 | 9 | 9 | 4 | 9 |
| 098 | 585 | -03249200016 | 10000000007 | 07790000007 | 110000001000 | 000100000100 | 1 | 9 | 9 | 4 | 9 |
| 09C | 083 | -03249200016 | 10000000007 | 07790000007 | 110000001000 | 000100000100 | 1 | 9 | 9 | 4 | 9 |
| 083 | 624 | -03249200016 | 10000000007 | 07790000007 | 110000001000 | 000100000100 | 0 | 9 | 9 | 4 | 9 |
| 084 | 290 | -03249200016 | 10000000007 | 07790000007 | 110000001000 | 000100000100 | 1 | 9 | 9 | 4 | 9 |
| 090 | 5C5 | -03249200017 | 10000000007 | 07790000007 | 110000001000 | 000100000100 | 1 | 9 | 9 | 4 | 9 |
| 091 | 564 | -03249200017 | 10000000007 | 07790000007 | 110000001000 | 000100000100 | 1 | 9 | 9 | 4 | 9 |
| 092 | 29D | -03249200017 | 10000000007 | 07790000007 | 110000001000 | 000100000100 | 1 | 9 | 9 | 4 | 9 |
| 093 | 7E8 | -03249200017 | 10000000007 | 07790000007 | 110000001000 | 000100000100 | 1 | 9 | 9 | 4 | 9 |
| 094 | 28A | -03249200017 | 10000000007 | 07790000007 | 110000001000 | 000100000100 | 1 | 9 | 9 | 4 | 9 |
| 095 | 664 | -03249200017 | 10000000007 | 07790000007 | 110000001000 | 000100000100 | 0 | 9 | 9 | 4 | 9 |
| 096 | 298 | -03249200017 | 10000000007 | 07790000007 | 110000001000 | 000100000100 | 1 | 9 | 9 | 4 | 9 |
| 098 | 585 | -03249200027 | 10000000007 | 07790000007 | 110000001000 | 000100000100 | 1 | 9 | 9 | 4 | 9 |
| 09C | 083 | -03249200027 | 10000000007 | 07790000007 | 110000001000 | 000100000100 | 1 | 9 | 9 | 4 | 9 |
| 083 | 624 | -03249200027 | 10000000007 | 07790000007 | 110000001000 | 000100000100 | 1 | 9 | 9 | 4 | 9 |
| 084 | 290 | -03249200027 | 10000000007 | 07790000007 | 110000001000 | 000100000100 | 1 | 9 | 9 | 4 | 9 |
| 085 | 564 | -03249200027 | 10000000007 | 07790000007 | 110000001000 | 000100000100 | 1 | 9 | 9 | 4 | 9 |
| 086 | 0A0 | -03249200027 | 10000000007 | 07790000007 | 110000001000 | 000100000100 | 1 | 9 | 9 | 4 | 9 |
| 0A0 | 7C0 | -03249200027 | 10000000007 | 07790000007 | 110000001000 | 000100000100 | 0 | 9 | 9 | 4 | 9 |
| 0A1 | 100 | -03249200027 | 10000000007 | 07790000007 | 110000001000 | 000100000100 | 1 | 9 | 9 | 4 | 9 |
| 0A2 | 418 | -10000000007 | 03249200027 | 07790000007 | 110000001000 | 000100000100 | 1 | 9 | 9 | 4 | 9 |
| 0A3 | 40D | -07790000007 | 03249200027 | 07790000007 | 110000001000 | 000100000100 | 1 | 9 | 9 | 4 | 9 |
| 0A4 | 40B | -07790000007 | 03249200027 | 03249200027 | 110000001000 | 000100000100 | 1 | 9 | 9 | 4 | 9 |
| 0A5 | 6CB | -07790000007 | 03249200027 | 03249200027 | 110000001000 | 000100000100 | 1 | 9 | 9 | 4 | 9 |
| 0A6 | 7C8 | -07790000007 | 03249200027 | 03249200027 | 110000000000 | 000100000100 | 1 | 9 | 9 | 4 | 9 |
| 0A7 | 788 | -07790000007 | 03249200027 | 03249200027 | 110000000000 | 000100000100 | 1 | 9 | 9 | 4 | 9 |
| 0A8 | 079 | -07790000007 | 03249200027 | 03249200027 | 110000000000 | 000100000100 | 1 | 9 | 9 | 4 | 9 |
| 0A9 | 740 | -07790000007 | 03249200027 | 03249200027 | 010000000000 | 000100000100 | 1 | 9 | 9 | 4 | 9 |
| 0AA | 7C1 | -07790000007 | 03249200027 | 03249200027 | 010000000000 | 000100000100 | 0 | 9 | 9 | 4 | 9 |
| 0AB | 058 | -07790000007 | 03249200027 | 03249200027 | 010000000000 | 000100000100 | 1 | 9 | 9 | 4 | 9 |
| 0AC | 7C2 | -07790000007 | 03249200027 | 03249200027 | 010000000000 | 000100000100 | 1 | 9 | 9 | 4 | 9 |
| 0AD | 082 | -07790000007 | 03249200027 | 03249200027 | 010000000000 | 000100000100 | 1 | 9 | 9 | 4 | 9 |

TABLE VII...

| PC | I-REG | A-REG | B-REG | C-REG | FLAGS (A) | FLAGS (B) | C | KP | KN | KO | KQ |
|---|---|---|---|---|---|---|---|---|---|---|---|
| 082 | 747 | -07790000007 | 03249200027 | 03249200027 | 010000000000 | 000100000100 | 1 | 9 | 9 | 4 | 9 |
| 083 | 400 | -07790000007 | 03249200027 | 03249200027 | 010000000000 | 000100000100 | 1 | 9 | 9 | 9 | 9 |
| 084 | 480 | -07790000007 | 03249200027 | 03249200027 | 010000000000 | 000100000100 | 1 | 9 | 9 | 9 | 8 |
| 085 | 087 | -07790000007 | 03249200027 | 03249200027 | 010000000000 | 000100000100 | 1 | 9 | 9 | 9 | 9 |
| 087 | 68A | -07790000007 | 03249200027 | 03249200027 | 010000000000 | 000100000100 | 1 | 9 | 9 | 9 | 8 |
| 088 | 76A | 07790000007 | 03249200027 | 03249200027 | 010000000000 | 000100000000 | 1 | 9 | 9 | 9 | 9 |
| 089 | 2B9 | 07790000007 | 03249200027 | 03249200027 | 010000000000 | 000100000000 | 1 | 9 | 9 | 9 | 9 |
| 08A | 72A | -07790000007 | 03249200027 | 03249200027 | 010000000000 | 000100000100 | 1 | 9 | 9 | 9 | 9 |
| 08B | 688 | -07790000007 | 03249200027 | 03249200027 | 010000000000 | 000100000100 | 0 | 9 | 9 | 9 | 9 |
| 08C | 0C1 | -07790000007 | 03249200027 | 03249200027 | 010000000000 | 000100000100 | 1 | 9 | 9 | 9 | 9 |
| 08D | 7C2 | -07790000007 | 03249200027 | 03249200027 | 010000000000 | 000100000100 | 1 | 9 | 9 | 9 | 9 |
| 08E | 2C6 | -07790000007 | 03249200027 | 03249200027 | 010000000000 | 000100000100 | 1 | 9 | 9 | 9 | 9 |
| 08F | 451 | -07790000027 | 03249200027 | 03249200027 | 010000000000 | 000100000100 | 1 | 9 | 9 | 9 | 9 |
| 0C0 | 0CF | -07790000027 | 03249200027 | 03249200027 | 010000000000 | 000100000100 | 1 | 9 | 9 | 9 | 9 |
| 0CF | 524 | -07790000027 | 03249200027 | 03249200027 | 010000000000 | 000100000100 | 1 | 9 | 9 | 9 | 9 |
| 0D0 | 2F6 | -07790000027 | 03249200027 | 03249200027 | 010000000000 | 000100000100 | 1 | 9 | 9 | 9 | 8 |
| 0D1 | 487 | -07790000027 | 03249200027 | 07790000027 | 010000000000 | 000100000100 | 1 | 9 | 9 | 9 | 9 |
| 0D2 | 481 | -00000000027 | 03249200027 | 07790000027 | 010000000000 | 000100000100 | 1 | 9 | 9 | 9 | 8 |
| 0D3 | 7C2 | -00000000027 | 03249200027 | 07790000027 | 010000000000 | 000100000100 | 1 | 9 | 9 | 9 | 9 |
| 0D4 | 0F2 | -00000000027 | 03249200027 | 07790000027 | 010000000000 | 000100000100 | 1 | 9 | 9 | 9 | 8 |
| 0F2 | 4EF | -00000000027 | 03249200027 | 07790000927 | 010000000000 | 000100000100 | 0 | 9 | 9 | 9 | 8 |
| 0F3 | 2EE | -00000000027 | 03249200027 | 07790000927 | 010000000000 | 000100000100 | 1 | 9 | 9 | 9 | 9 |
| 0EE | 4AF | -00000000027 | 03249200027 | 00779000027 | 010000000000 | 000100000100 | 1 | 9 | 9 | 9 | 9 |
| 0EF | 52C | -00000000027 | 03249200027 | 00779000027 | 010000000000 | 000100000100 | 1 | 9 | 9 | 9 | 9 |
| 0F0 | 2F6 | -00000000027 | 03249200027 | 00779000027 | 010000000000 | 000100000100 | 1 | 9 | 9 | 9 | 8 |
| 0F1 | 4A5 | -00000000027 | 03249200027 | 00779000027 | 010000000000 | 000100000100 | 1 | 9 | 9 | 9 | 8 |
| 0F2 | 4EF | -00000000027 | 03249200027 | 00779000927 | 010000000000 | 000100000100 | 0 | 9 | 9 | 9 | 8 |
| 0F3 | 2EE | -00000000027 | 03249200027 | 00779000927 | 010000000000 | 000100000100 | 1 | 9 | 9 | 9 | 8 |
| 0EE | 4AF | -00000000027 | 03249200027 | 00077900027 | 010000000000 | 000100000100 | 1 | 9 | 9 | 9 | 9 |
| 0EF | 52C | -00000000027 | 03249200027 | 00077900027 | 010000000000 | 000100000100 | 1 | 9 | 9 | 9 | 8 |
| 0F0 | 2F6 | -00000000027 | 03249200027 | 00077900027 | 010000000000 | 000100000100 | 1 | 9 | 9 | 9 | 8 |
| 0F1 | 4A5 | -00000000027 | 03249200027 | 00077900027 | 010000000000 | 000100000100 | 1 | 9 | 9 | 9 | 9 |
| 0F2 | 4EF | -00000000027 | 03249200027 | 00077900927 | 010000000000 | 000100000100 | 0 | 9 | 9 | 9 | 8 |
| 0F3 | 2EE | -00000000027 | 03249200027 | 00077900927 | 010000000000 | 000100000100 | 1 | 9 | 9 | 9 | 9 |
| 0EE | 4AF | -00000000027 | 03249200027 | 00007790027 | 010000000000 | 000100000100 | 1 | 9 | 9 | 9 | 9 |
| 0EF | 52C | -00000000027 | 03249200027 | 00007790027 | 010000000000 | 000100000100 | 1 | 9 | 9 | 9 | 8 |
| 0F0 | 2F6 | -00000000027 | 03249200027 | 00007790027 | 010000000000 | 000100000100 | 1 | 9 | 9 | 9 | 9 |
| 0F1 | 4A5 | -00000000027 | 03249200027 | 00007790027 | 010000000000 | 000100000100 | 1 | 9 | 9 | 9 | 8 |
| 0F2 | 4EF | -00000000027 | 03249200027 | 00007790927 | 010000000000 | 000100000100 | 0 | 9 | 9 | 9 | 8 |
| 0F3 | 2EE | -00000000027 | 03249200027 | 00007790927 | 010000000000 | 000100000100 | 1 | 9 | 9 | 9 | 8 |
| 0EE | 4AF | -00000000027 | 03249200027 | 00000779027 | 010000000000 | 000100000100 | 1 | 9 | 9 | 9 | 9 |
| 0EF | 52C | -00000000027 | 03249200027 | 00000779027 | 010000000000 | 000100000100 | 1 | 9 | 9 | 9 | 9 |
| 0F0 | 2F6 | -00000000027 | 03249200027 | 00000779027 | 010000000000 | 000100000100 | 1 | 9 | 9 | 9 | 8 |
| 0F1 | 4A5 | -00000000027 | 03249200027 | 00000779027 | 010000000000 | 000100000100 | 1 | 9 | 9 | 9 | 8 |
| 0F2 | 4EF | -00000000027 | 03249200027 | 00000779927 | 010000000000 | 000100000100 | 0 | 9 | 9 | 9 | 9 |
| 0F3 | 2EE | -00000000027 | 03249200027 | 00000779927 | 010000000000 | 000100000100 | 1 | 9 | 9 | 9 | 9 |
| 0EE | 4AF | -00000000027 | 03249200027 | 00000077027 | 010000000000 | 000100000100 | 1 | 9 | 9 | 9 | 9 |
| 0EF | 52C | -00000000027 | 03249200027 | 00000077927 | 010000000000 | 000100000100 | 1 | 9 | 9 | 9 | 8 |
| 0F0 | 2F6 | -00000000027 | 03249200027 | 00000077927 | 010000000000 | 000100000100 | 1 | 9 | 9 | 9 | 8 |
| 0F1 | 4A5 | -00000000027 | 03249200027 | 00000077927 | 010000000000 | 000100000100 | 1 | 9 | 9 | 9 | 8 |
| 0F2 | 4EF | -00000000027 | 03249200027 | 00000077827 | 010000000000 | 000100000100 | 1 | 9 | 9 | 9 | 9 |
| 0F3 | 2EE | -00000000027 | 03249200027 | 00000077827 | 010000000000 | 000100000100 | 1 | 9 | 9 | 9 | 9 |
| 0F4 | 491 | -03249200027 | 03249200027 | 00000077827 | 010000000000 | 000100000100 | 1 | 9 | 9 | 9 | 9 |
| 0F5 | 0F2 | -03249200027 | 03249200027 | 00000077827 | 010000000000 | 000100000100 | 1 | 9 | 9 | 9 | 9 |
| 0F2 | 4EF | -03249200027 | 03249200027 | 00000077727 | 010000000000 | 000100000100 | 0 | 9 | 9 | 9 | 9 |
| 0F3 | 2EE | -03249200027 | 03249200027 | 00000077727 | 010000000000 | 000100000100 | 1 | 9 | 9 | 9 | 9 |
| 0F4 | 491 | -06498400027 | 03249200027 | 00000077727 | 010000000000 | 000100000100 | 1 | 9 | 9 | 9 | 9 |
| 0F5 | 0F2 | -06498400027 | 03249200027 | 00000077727 | 010000000000 | 000100000100 | 1 | 9 | 9 | 9 | 8 |
| 0F2 | 4EF | -06498400027 | 03249200027 | 00000077627 | 010000000000 | 000100000100 | 1 | 9 | 9 | 9 | 9 |
| 0F3 | 2EE | -06498400027 | 03249200027 | 00000077627 | 010000000000 | 000100000100 | 1 | 9 | 9 | 9 | 9 |
| 0F4 | 491 | -09747600027 | 03249200027 | 00000077627 | 010000000000 | 000100000100 | 1 | 9 | 9 | 9 | 9 |
| 0F5 | 0F2 | -09747600027 | 03249200027 | 00000077627 | 010000000000 | 000100000100 | 1 | 9 | 9 | 9 | 9 |
| 0F2 | 4EF | -09747600027 | 03249200027 | 00000077527 | 010000000000 | 000100000100 | 1 | 9 | 9 | 9 | 9 |
| 0F3 | 2EE | -09747600027 | 03249200027 | 00000077527 | 010000000000 | 000100000100 | 1 | 9 | 9 | 9 | 8 |
| 0F4 | 491 | -12996800027 | 03249200027 | 00000077527 | 010000000000 | 000100000100 | 1 | 9 | 9 | 9 | 9 |
| 0F5 | 0F2 | -12996800027 | 03249200027 | 00000077527 | 010000000000 | 000100000100 | 1 | 9 | 9 | 9 | 9 |
| 0F2 | 4EF | -12996800027 | 03249200027 | 00000077427 | 010000000000 | 000100000100 | 1 | 9 | 9 | 9 | 8 |
| 0F3 | 2EE | -12996800027 | 03249200027 | 00000077427 | 010000000000 | 000100000100 | 1 | 9 | 9 | 9 | 9 |
| 0F4 | 491 | -16246000027 | 03249200027 | 00000077427 | 010000000000 | 000100000100 | 1 | 9 | 9 | 9 | 9 |
| 0F5 | 0F2 | -16246000027 | 03249200027 | 00000077427 | 010000000000 | 000100000100 | 1 | 9 | 9 | 9 | 9 |
| 0F2 | 4EF | -16246000027 | 03249200027 | 00000077327 | 010000000000 | 000100000100 | 1 | 9 | 9 | 9 | 9 |
| 0F3 | 2EE | -16246000027 | 03249200027 | 00000077327 | 010000000000 | 000100000100 | 1 | 9 | 9 | 9 | 8 |
| 0F4 | 491 | -19495200027 | 03249200027 | 00000077327 | 010000000000 | 000100000100 | 1 | 9 | 9 | 9 | 9 |
| 0F5 | 0F2 | -19495200027 | 03249200027 | 00000077327 | 010000000000 | 000100000100 | 1 | 9 | 9 | 9 | 9 |
| 0F2 | 4EF | -19495200027 | 03249200027 | 00000077227 | 010000000000 | 000100000100 | 1 | 9 | 9 | 9 | 8 |
| 0F3 | 2EE | -19495200027 | 03249200027 | 00000077227 | 010000000000 | 000100000100 | 1 | 9 | 9 | 9 | 9 |
| 0F4 | 491 | -22744400027 | 03249200027 | 00000077227 | 010000000000 | 000100000100 | 1 | 9 | 9 | 9 | 9 |
| 0F5 | 0F2 | -22744400027 | 03249200027 | 00000077227 | 010000000000 | 000100000100 | 1 | 9 | 9 | 9 | 9 |
| 0F2 | 4EF | -22744400027 | 03249200027 | 00000077127 | 010000000000 | 000100000100 | 1 | 9 | 9 | 9 | 8 |
| 0F3 | 2EE | -22744400027 | 03249200027 | 00000077127 | 010000000000 | 000100000100 | 1 | 9 | 9 | 9 | 9 |
| 0F4 | 491 | -25993600027 | 03249200027 | 00000077127 | 010000000000 | 000100000100 | 1 | 9 | 9 | 9 | 9 |
| 0F5 | 0F2 | -25993600027 | 03249200027 | 00000077127 | 010000000000 | 000100000100 | 1 | 9 | 9 | 9 | 9 |
| 0F2 | 4EF | -25993600027 | 03249200027 | 00000077027 | 010000000000 | 000100000100 | 1 | 9 | 9 | 9 | 8 |
| 0F3 | 2EE | -25993600027 | 03249200027 | 00000077027 | 010000000000 | 000100000100 | 1 | 9 | 9 | 9 | 8 |
| 0F4 | 491 | -29242800027 | 03249200027 | 00000077027 | 010000000000 | 000100000100 | 1 | 9 | 9 | 9 | 8 |
| 0F5 | 0F2 | -29242800027 | 03249200027 | 00000077027 | 010000000000 | 000100000100 | 1 | 9 | 9 | 9 | 9 |
| 0F2 | 4EF | -29242800027 | 03249200027 | 00000077927 | 010000000000 | 000100000100 | 0 | 9 | 9 | 9 | 8 |
| 0F3 | 2EE | -29242800027 | 03249200027 | 00000077927 | 010000000000 | 000100000100 | 1 | 9 | 9 | 9 | 8 |
| 0EE | 4AF | -29242800027 | 03249200027 | 00000007727 | 010000000000 | 000100000100 | 1 | 9 | 9 | 9 | 9 |
| 0EF | 52C | -29242800027 | 03249200027 | 00000007727 | 010000000000 | 000100000100 | 1 | 9 | 9 | 9 | 8 |
| 0F0 | 2F6 | -29242800027 | 03249200027 | 00000007727 | 010000000000 | 000100000100 | 1 | 9 | 9 | 9 | 8 |
| 0F1 | 4A5 | -02924280027 | 03249200027 | 00000007727 | 010000000000 | 000100000100 | 1 | 9 | 9 | 9 | 8 |

TABLE VII...

| PC | I-REG | A-REG | B-REG | C-REG | FLAGS (A) | FLAGS (B) | C | KP | KN | KO | KQ |
|---|---|---|---|---|---|---|---|---|---|---|---|
| 0F2 | 4EF | -02924280027 | 03249200027 | 00000007627 | 010000000000 | 000100000100 | 1 | 9 | 9 | 9 | 8 |
| 0F3 | 2EE | -02924280027 | 03249200027 | 00000007627 | 000000007627 | 000100000100 | 1 | 9 | 9 | 9 | 8 |
| 0F4 | 491 | -06173480027 | 03249200027 | 00000007627 | 010000000000 | 000100000100 | 1 | 9 | 9 | 9 | 8 |
| 0F5 | 0F2 | -06173480027 | 03249200027 | 00000007627 | 010000000000 | 000100000100 | 1 | 9 | 9 | 9 | 8 |
| 0F2 | 4EF | -06173480027 | 03249200027 | 00000007527 | 010000000000 | 000100000100 | 1 | 9 | 9 | 9 | 8 |
| 0F3 | 2EE | -06173480027 | 03249200027 | 00000007527 | 010000000000 | 000100000100 | 1 | 9 | 9 | 9 | 8 |
| 0F4 | 491 | -09422680027 | 03249200027 | 00000007527 | 010000000000 | 000100000100 | 1 | 9 | 9 | 9 | 8 |
| 0F5 | 0F2 | -09422680027 | 03249200027 | 00000007527 | 010000000000 | 000100000100 | 1 | 9 | 9 | 9 | 8 |
| 0F2 | 4EF | -09422680027 | 03249200027 | 00000007427 | 010000000000 | 000100000100 | 1 | 9 | 9 | 9 | 8 |
| 0F3 | 2EE | -09422680027 | 03249200027 | 00000007427 | 010000000000 | 000100000100 | 1 | 9 | 9 | 9 | 8 |
| 0F4 | 491 | -12671880027 | 03249200027 | 00000007427 | 010000000000 | 000100000100 | 1 | 9 | 9 | 9 | 8 |
| 0F5 | 0F2 | -12671880027 | 03249200027 | 00000007427 | 010000000000 | 000100000100 | 1 | 9 | 9 | 9 | 8 |
| 0F2 | 4EF | -12671880027 | 03249200027 | 00000007327 | 010000000000 | 000100000100 | 1 | 9 | 9 | 9 | 8 |
| 0F3 | 2EE | -12671880027 | 03249200027 | 00000007327 | 010000000000 | 000100000100 | 1 | 9 | 9 | 9 | 8 |
| 0F4 | 491 | -15921080027 | 03249200027 | 00000007327 | 010000000000 | 000100000100 | 1 | 9 | 9 | 9 | 8 |
| 0F5 | 0F2 | -15921080027 | 03249200027 | 00000007327 | 010000000000 | 000100000100 | 1 | 9 | 9 | 9 | 8 |
| 0F2 | 4EF | -15921080027 | 03249200027 | 00000007227 | 010000000000 | 000100000100 | 1 | 9 | 9 | 9 | 8 |
| 0F3 | 2EE | -15921080027 | 03249200027 | 00000007227 | 010000000000 | 000100000100 | 1 | 9 | 9 | 9 | 8 |
| 0F4 | 491 | -19170280027 | 03249200027 | 00000007227 | 010000000000 | 000100000100 | 1 | 9 | 9 | 9 | 8 |
| 0F5 | 0F2 | -19170280027 | 03249200027 | 00000007227 | 010000000000 | 000100000100 | 1 | 9 | 9 | 9 | 8 |
| 0F2 | 4EF | -19170280027 | 03249200027 | 00000007127 | 010000000000 | 000100000100 | 1 | 9 | 9 | 9 | 8 |
| 0F3 | 2EE | -19170280027 | 03249200027 | 00000007127 | 010000000000 | 000100000100 | 1 | 9 | 9 | 9 | 8 |
| 0F4 | 491 | -22419480027 | 03249200027 | 00000007127 | 010000000000 | 000100000100 | 1 | 9 | 9 | 9 | 8 |
| 0F5 | 0F2 | -22419480027 | 03249200027 | 00000007127 | 010000000000 | 000100000100 | 1 | 9 | 9 | 9 | 8 |
| 0F2 | 4EF | -22419480027 | 03249200027 | 00000007027 | 010000000000 | 000100000100 | 1 | 9 | 9 | 9 | 8 |
| 0F3 | 2EE | -22419480027 | 03249200027 | 00000007027 | 010000000000 | 000100000100 | 1 | 9 | 9 | 9 | 8 |
| 0F4 | 491 | -25668680027 | 03249200027 | 00000007027 | 010000000000 | 000100000100 | 1 | 9 | 9 | 9 | 8 |
| 0F5 | 0F2 | -25668680027 | 03249200027 | 00000007027 | 010000000000 | 000100000100 | 1 | 9 | 9 | 9 | 8 |
| 0F2 | 4EF | -25668680027 | 03249200027 | 00000007927 | 010000000000 | 000100000100 | 0 | 9 | 9 | 9 | 9 |
| 0F3 | 2EE | -25668680027 | 03249200027 | 00000007927 | 010000000000 | 000100000100 | 1 | 9 | 9 | 9 | 8 |
| 0EE | 4AF | -25668680027 | 03249200027 | 00000000727 | 010000000000 | 000100000100 | 1 | 9 | 9 | 9 | 8 |
| 0EF | 52C | -25668680027 | 03249200027 | 00000000727 | 010000000000 | 000100000100 | 1 | 9 | 9 | 9 | 8 |
| 0F0 | 2F6 | -25668680027 | 03249200027 | 00000000727 | 010000000000 | 000100000100 | 1 | 9 | 9 | 9 | 8 |
| 0F1 | 4A5 | -02566868027 | 03249200027 | 00000000727 | 010000000000 | 000100000100 | 1 | 9 | 9 | 9 | 8 |
| 0F2 | 4EF | -02566868027 | 03249200027 | 00000000627 | 010000000000 | 000100000100 | 1 | 9 | 9 | 9 | 8 |
| 0F3 | 2EE | -02566868027 | 03249200027 | 00000000627 | 010000000000 | 000100000100 | 1 | 9 | 9 | 9 | 8 |
| 0F4 | 491 | -05816068027 | 03249200027 | 00000000627 | 010000000000 | 000100000100 | 1 | 9 | 9 | 9 | 8 |
| 0F5 | 0F2 | -05816068027 | 03249200027 | 00000000627 | 010000000000 | 000100000100 | 1 | 9 | 9 | 9 | 8 |
| 0F2 | 4EF | -05816068027 | 03249200027 | 00000000527 | 010000000000 | 000100000100 | 1 | 9 | 9 | 9 | 8 |
| 0F3 | 2EE | -05816068027 | 03249200027 | 00000000527 | 010000000000 | 000100000100 | 1 | 9 | 9 | 9 | 8 |
| 0F4 | 491 | -09065268027 | 03249200027 | 00000000527 | 010000000000 | 000100000100 | 1 | 9 | 9 | 9 | 8 |
| 0F5 | 0F2 | -09065268027 | 03249200027 | 00000000527 | 010000000000 | 000100000100 | 1 | 9 | 9 | 9 | 8 |
| 0F2 | 4EF | -09065268027 | 03249200027 | 00000000427 | 010000000000 | 000100000100 | 1 | 9 | 9 | 9 | 8 |
| 0F3 | 2EE | -09065268027 | 03249200027 | 00000000427 | 010000000000 | 000100000100 | 1 | 9 | 9 | 9 | 8 |
| 0F4 | 491 | -12314468027 | 03249200027 | 00000000427 | 010000000000 | 000100000100 | 1 | 9 | 9 | 9 | 8 |
| 0F5 | 0F2 | -12314468027 | 03249200027 | 00000000427 | 010000000000 | 000100000100 | 1 | 9 | 9 | 9 | 8 |
| 0F2 | 4EF | -12314468027 | 03249200027 | 00000000327 | 010000000000 | 000100000100 | 1 | 9 | 9 | 9 | 8 |
| 0F3 | 2EE | -12314468027 | 03249200027 | 00000000327 | 010000000000 | 000100000100 | 1 | 9 | 9 | 9 | 8 |
| 0F4 | 491 | -15563668027 | 03249200027 | 00000000327 | 010000000000 | 000100000100 | 1 | 9 | 9 | 9 | 8 |
| 0F5 | 0F2 | -15563668027 | 03249200027 | 00000000327 | 010000000000 | 000100000100 | 1 | 9 | 9 | 9 | 8 |
| 0F2 | 4EF | -15563668027 | 03249200027 | 00000000227 | 010000000000 | 000100000100 | 1 | 9 | 9 | 9 | 8 |
| 0F3 | 2EE | -15563668027 | 03249200027 | 00000000227 | 010000000000 | 000100000100 | 1 | 9 | 9 | 9 | 8 |
| 0F4 | 491 | -18812868027 | 03249200027 | 00000000227 | 010000000000 | 000100000100 | 1 | 9 | 9 | 9 | 8 |
| 0F5 | 0F2 | -18812868027 | 03249200027 | 00000000227 | 010000000000 | 000100000100 | 1 | 9 | 9 | 9 | 8 |
| 0F2 | 4EF | -18812868027 | 03249200027 | 00000000127 | 010000000000 | 000100000100 | 1 | 9 | 9 | 9 | 8 |
| 0F3 | 2EE | -18812868027 | 03249200027 | 00000000127 | 010000000000 | 000100000100 | 1 | 9 | 9 | 9 | 8 |
| 0F4 | 491 | -22062068027 | 03249200027 | 00000000127 | 010000000000 | 000100000100 | 1 | 9 | 9 | 9 | 8 |
| 0F5 | 0F2 | -22062068027 | 03249200027 | 00000000127 | 010000000000 | 000100000100 | 1 | 9 | 9 | 9 | 8 |
| 0F2 | 4EF | -22062068027 | 03249200027 | 00000000027 | 010000000000 | 000100000100 | 1 | 9 | 9 | 9 | 8 |
| 0F3 | 2EE | -22062068027 | 03249200027 | 00000000027 | 010000000000 | 000100000100 | 1 | 9 | 9 | 9 | 8 |
| 0F4 | 491 | -25311268027 | 03249200027 | 00000000027 | 010000000000 | 000100000100 | 1 | 9 | 9 | 9 | 8 |
| 0F5 | 0F2 | -25311268027 | 03249200027 | 00000000027 | 010000000000 | 000100000100 | 1 | 9 | 9 | 9 | 8 |
| 0F2 | 4EF | -25311268027 | 03249200027 | 00000000927 | 010000000000 | 000100000100 | 0 | 9 | 9 | 9 | 9 |
| 0F3 | 2EE | -25311268027 | 03249200027 | 00000000927 | 010000000000 | 000100000100 | 1 | 9 | 9 | 9 | 8 |
| 0EE | 4AF | -25311268027 | 03249200027 | 00000000027 | 010000000000 | 000100000100 | 1 | 9 | 9 | 9 | 8 |
| 0EF | 52C | -25311268027 | 03249200027 | 00000000027 | 010000000000 | 000100000100 | 0 | 9 | 9 | 9 | 9 |
| 0F0 | 2F6 | -25311268027 | 03249200027 | 00000000027 | 010000000000 | 000100000100 | 1 | 9 | 9 | 9 | 8 |
| 0F6 | 408 | -25311268027 | 03249200027 | 03249200027 | 010000000000 | 000100000100 | 1 | 9 | 9 | 9 | 8 |
| 0F7 | 7E1 | -25311268027 | 03249200027 | 03249200027 | 010000000000 | 000100000100 | 1 | 9 | 9 | 9 | 8 |
| 0F8 | 0FA | -25311268027 | 03249200027 | 03249200027 | 010000000000 | 000100000100 | 1 | 9 | 9 | 9 | 8 |
| 0FA | 7C7 | -25311268027 | 03249200027 | 03249200027 | 010000000000 | 000100000100 | 1 | 9 | 9 | 9 | 8 |
| 0FB | 279 | -25311268027 | 03249200027 | 03249200027 | 010000000000 | 000100000100 | 1 | 9 | 9 | 9 | 8 |
| 0FC | 741 | -25311268027 | 03249200027 | 03249200027 | 000000000000 | 000100000100 | 1 | 9 | 9 | 9 | 8 |
| 0FD | 742 | -25311268027 | 03249200027 | 03249200027 | 000000000000 | 000100000100 | 1 | 9 | 9 | 9 | 8 |
| 0FE | 079 | -25311268027 | 03249200027 | 03249200027 | 000000000000 | 000100000100 | 1 | 9 | 9 | 9 | 8 |
| 079 | 524 | -25311268027 | 03249200027 | 03249200027 | 000000000000 | 000100000100 | 1 | 9 | 9 | 9 | 8 |
| 07A | 29F | -25311268027 | 03249200027 | 03249200027 | 000000000000 | 000100000100 | 1 | 9 | 9 | 9 | 8 |
| 07B | 542 | -25311268027 | 01000000027 | 03249200027 | 000000000000 | 000100000100 | 1 | 9 | 9 | 9 | 9 |
| 07C | 48A | -25311268027 | 10000000027 | 03249200027 | 000000000000 | 000100000100 | 1 | 9 | 9 | 9 | 8 |
| 07D | 480 | -25311268027 | 10000000027 | 03249200027 | 000000000000 | 000100000100 | 1 | 9 | 9 | 9 | 8 |
| 07E | 283 | -25311268027 | 10000000027 | 03249200027 | 000000000000 | 000100000100 | 1 | 9 | 9 | 9 | 8 |
| 07F | 4A5 | -02531126827 | 10000000027 | 03249200027 | 000000000000 | 000100000100 | 1 | 9 | 9 | 9 | 8 |
| 080 | 7E8 | -02531126827 | 10000000027 | 03249200027 | 000000000000 | 000100000100 | 1 | 9 | 9 | 9 | 8 |
| 081 | 28E | -02531126827 | 10000000027 | 03249200027 | 000000000000 | 000100000100 | 1 | 9 | 9 | 9 | 8 |
| 082 | 585 | -02531126837 | 10000000027 | 03249200027 | 000000000000 | 000100000100 | 1 | 9 | 9 | 9 | 8 |
| 083 | 624 | -02531126837 | 10000000027 | 03249200027 | 000000000000 | 000100000100 | 1 | 9 | 9 | 9 | 8 |
| 084 | 290 | -02531126837 | 10000000027 | 03249200027 | 000000000000 | 000100000100 | 1 | 9 | 9 | 9 | 8 |
| 085 | 564 | -02531126837 | 10000000027 | 03249200027 | 000000000000 | 000100000100 | 1 | 9 | 9 | 9 | 8 |
| 086 | 0A0 | -02531126837 | 10000000027 | 03249200027 | 000000000000 | 000100000100 | 1 | 9 | 9 | 9 | 8 |
| 0A0 | 7C0 | -02531126837 | 10000000027 | 03249200027 | 000000000000 | 000100000100 | 1 | 9 | 9 | 9 | 8 |
| 0A1 | 100 | -02531126837 | 10000000027 | 03249200027 | 000000000000 | 000100000100 | 1 | 9 | 9 | 9 | 8 |
| 100 | 5A4 | -02531126837 | 10000000027 | 03249200027 | 000000000000 | 000100000100 | 1 | 9 | 9 | 9 | 8 |

TABLE VII...
| PC | I-REG | A-REG | B-REG | C-REG | FLAGS (A) | FLAGS (B) | C | KP | KN | KO | KQ |
|---|---|---|---|---|---|---|---|---|---|---|---|
| 101 | 30C | -02531126837 | 10000000027 | 03249200027 | 000000000000 | 000100000100 | 1 | 9 | 9 | 9 | R |
| 102 | 5A5 | -02531126827 | 10000000027 | 03249200027 | 000000000000 | 000100000100 | 1 | 9 | 9 | 9 | R |
| 103 | 7FB | -02531126827 | 10000000027 | 03249200027 | 000000000000 | 000100000100 | 1 | 9 | 9 | 9 | 9 |
| 104 | 2FF | -02531126827 | 10000000027 | 03249200027 | 000000000000 | 000100000100 | 1 | 9 | 9 | 9 | 9 |
| 105 | 664 | -02531126827 | 10000000027 | 03249200027 | 000000000000 | 000100000100 | 0 | 9 | 9 | 9 | R |
| 106 | 30A | -02531126827 | 10000000027 | 03249200027 | 000000000000 | 000100000100 | 1 | 9 | 9 | 9 | R |
| 10A | 5E5 | -02531126826 | 10000000027 | 03249200027 | 000000000000 | 000100000100 | 1 | 9 | 9 | 9 | 9 |
| 10B | 100 | -02531126826 | 10000000027 | 03249200027 | 000000000000 | 000100000100 | 1 | 9 | 9 | 9 | R |
| 100 | 5A4 | -02531126826 | 10000000027 | 03249200027 | 000000000000 | 000100000100 | 1 | 9 | 9 | 9 | 9 |
| 101 | 30C | -02531126826 | 10000000027 | 03249200027 | 000000000000 | 000100000100 | 1 | 9 | 9 | 9 | R |
| 102 | 5A5 | -02531126816 | 10000000027 | 03249200027 | 000000000000 | 000100000100 | 1 | 9 | 9 | 9 | R |
| 103 | 7FB | -02531126816 | 10000000027 | 03249200027 | 000000000000 | 000100000100 | 1 | 9 | 9 | 9 | 9 |
| 104 | 2FF | -02531126816 | 10000000027 | 03249200027 | 000000000000 | 000100000100 | 1 | 9 | 9 | 9 | 9 |
| 105 | 664 | -02531126816 | 10000000027 | 03249200027 | 000000000000 | 000100000100 | 0 | 9 | 9 | 9 | R |
| 106 | 30A | -02531126816 | 10000000027 | 03249200027 | 000000000000 | 000100000100 | 1 | 9 | 9 | 9 | B |
| 10A | 5E5 | -02531126815 | 10000000027 | 03249200027 | 000000000000 | 000100000100 | 1 | 9 | 9 | 9 | 9 |
| 10B | 100 | -02531126815 | 10000000027 | 03249200027 | 000000000000 | 000100000100 | 1 | 9 | 9 | 9 | R |
| 100 | 5A4 | -02531126815 | 10000000027 | 03249200027 | 000000000000 | 000100000100 | 1 | 9 | 9 | 9 | R |
| 101 | 30C | -02531126815 | 10000000027 | 03249200027 | 000000000000 | 000100000100 | 1 | 9 | 9 | 9 | R |
| 102 | 5A5 | -02531126805 | 10000000027 | 03249200027 | 000000000000 | 000100000100 | 1 | 9 | 9 | 9 | R |
| 103 | 7EB | -02531126805 | 10000000027 | 03249200027 | 000000000000 | 000100000100 | 1 | 9 | 9 | 9 | R |
| 104 | 2FF | -02531126805 | 10000000027 | 03249200027 | 000000000000 | 000100000100 | 1 | 9 | 9 | 9 | R |
| 105 | 664 | -02531126805 | 10000000027 | 03249200027 | 000000000000 | 000100000100 | 0 | 9 | 9 | 9 | R |
| 106 | 30A | -02531126805 | 10000000027 | 03249200027 | 000000000000 | 000100000100 | 1 | 9 | 9 | 9 | 9 |
| 10A | 5E5 | -02531126804 | 10000000027 | 03249200027 | 000000000000 | 000100000100 | 1 | 9 | 9 | 9 | R |
| 10B | 100 | -02531126804 | 10000000027 | 03249200027 | 000000000000 | 000100000100 | 1 | 9 | 9 | 9 | 9 |
| 100 | 5A4 | -02531126804 | 10000000027 | 03249200027 | 000000000000 | 000100000100 | 0 | 9 | 9 | 9 | 9 |
| 101 | 30C | -02531126804 | 10000000027 | 03249200027 | 000000000000 | 000100000100 | 1 | 9 | 9 | 9 | R |
| 10C | 76B | -02531126804 | 10000000027 | 03249200027 | 000000000000 | 000100000100 | 1 | 9 | 9 | 9 | 9 |
| 10D | 7E9 | -02531126804 | 10000000027 | 03249200027 | 000000000000 | 000100000100 | 1 | 9 | 9 | 9 | R |
| 10E | 31E | -02531126804 | 10000000027 | 03249200027 | 000000000000 | 000100000100 | 1 | 9 | 9 | 9 | R |
| 10F | 4F4 | -02531126804 | 10000000027 | 03249200027 | 000000000000 | 000100000100 | 1 | 9 | 9 | 9 | R |
| 110 | 116 | -02531126804 | 10000000027 | 03249200027 | 000000000000 | 000100000100 | 1 | 9 | 9 | 9 | R |
| 116 | 7E1 | -02531126804 | 10000000027 | 03249200027 | 000000000000 | 000100000100 | 1 | 9 | 9 | 9 | 9 |
| 117 | 31E | -02531126804 | 10000000027 | 03249200027 | 000000000000 | 000100000100 | 1 | 9 | 9 | 9 | R |
| 118 | 418 | -10000000027 | 02531126804 | 03249200027 | 000000000000 | 000100000100 | 1 | 9 | 9 | 9 | 9 |
| 119 | 401 | -00000000000 | 02531126804 | 03249200027 | 000000000000 | 000100000100 | 1 | 9 | 9 | 9 | R |
| 11A | 400 | -00000000000 | 02531126804 | 03249200027 | 000000000000 | 000100000100 | 1 | 9 | 9 | 9 | 9 |
| 11B | 420 | -00000000000 | 02531126804 | 03249200027 | 000000000000 | 000100000100 | 1 | 9 | 9 | 9 | 9 |
| 11C | 321 | -00000000000 | 02531126804 | 03249200027 | 000000000000 | 000100000100 | 1 | 9 | 9 | 9 | 9 |
| 11D | 418 | -02531126804 | 00000000000 | 03249200027 | 000000000000 | 000100000100 | 1 | 9 | 9 | 9 | 9 |
| 11E | 7C7 | -02531126804 | 00000000000 | 03249200027 | 000000000000 | 000100000100 | 1 | 9 | 9 | 9 | 9 |
| 11F | 250 | -02531126804 | 00000000000 | 03249200027 | 000000000000 | 000100000100 | 1 | 9 | 9 | 9 | 9 |
| 120 | 049 | -02531126804 | 00000000000 | 03249200027 | 000000000000 | 000100000100 | 1 | 9 | 9 | 9 | 9 |
| 049 | 407 | -02531126804 | 00000000000 | 02531126804 | 000000000000 | 000100000100 | 1 | 9 | 9 | 9 | 9 |
| 04A | 74A | -02531126804 | 00000000000 | 02531126804 | 000000000000 | 000100000100 | 1 | 9 | 9 | 9 | 9 |
| 04B | 7EA | -02531126804 | 00000000000 | 02531126804 | 000000000000 | 000100000100 | 1 | 9 | 9 | 9 | 9 |
| 04C | 04E | -02531126804 | 00000000000 | 02531126804 | 000000000000 | 000100000100 | 1 | 9 | 9 | 9 | 9 |
| 04D | 70A | -02531126804 | 00000000000 | 02531126804 | 000000000100 | 000100000100 | 1 | 9 | 9 | 9 | 9 |
| 04E | 6C1 | -02531126804 | 00000000000 | 02531126804 | 000000000100 | 000100000100 | 1 | 9 | 9 | 9 | 9 |
| 04F | 6C2 | -02531126804 | 00000000000 | 02531126804 | 000000000100 | 000100000100 | 1 | 9 | 9 | 9 | 9 |
| 050 | 763 | -02531126804 | 00000000000 | 02531126804 | 000000000100 | 000100000100 | 1 | 9 | 9 | 9 | 9 |
| 051 | 724 | -02531126804 | 00000000000 | 02531126804 | 000000000100 | 000100000100 | 1 | 9 | 9 | 9 | 9 |
| 052 | 004 | -02531126804 | 00000000000 | 02531126804 | 000000000100 | 000100000100 | 1 | 9 | 9 | 9 | 9 |
| 004 | 400 | -02531126804 | 00000000000 | 02531126804 | 000000000100 | 000100000100 | 1 | 9 | 9 | 9 | 9 |
| 005 | 762 | -02531126804 | 00000000000 | 02531126804 | 000000000100 | 000100000100 | 1 | 9 | 9 | 9 | 9 |
| 006 | 400 | -02531126804 | 00000000000 | 02531126804 | 000000000100 | 000100000100 | 1 | 9 | 9 | 9 | 9 |
| 007 | 460 | -02531126804 | 00000000000 | 02531126804 | 000000000100 | 000100000100 | 1 | 9 | B | B | 9 |
| 008 | 204 | -02531126804 | 00000000000 | 02531126804 | 000000000100 | 000100000100 | 1 | 9 | B | B | 9 |
| 009 | 400 | -02531126804 | 00000000000 | 02531126804 | 000000000100 | 000100000100 | 1 | 9 | 9 | 9 | 9 |
| 00A | 460 | -02531126804 | 00000000000 | 02531126804 | 000000000100 | 000100000100 | 0 | 9 | R | R | 9 |
| 00B | 400 | -02531126804 | 00000000000 | 02531126804 | 000000000100 | 000100000100 | 0 | 9 | 9 | 9 | 9 |
| 00C | 009 | -02531126804 | 00000000000 | 02531126804 | 000000000100 | 000100000100 | 1 | 9 | 9 | 9 | 9 |
| 00D | 400 | -02531126804 | 00000000000 | 02531126804 | 000000000100 | 000100000100 | 1 | 9 | 9 | 9 | 9 |
| 00E | 400 | -02531126804 | 00000000000 | 02531126804 | 000000000100 | 000100000100 | 1 | 9 | 9 | 9 | 9 |
TABLE VIII
Problems with the  Keyboard Configuration
| Problem | Key | Display |
|---|---|---|
| $-a - b + c =$ | | 0 |
| | C | 0 |
| | − | 0 |
| | a | $-a$ |
| | | $-a$ |
| | − | $-b$ |
| | b | $(-a - b)$ |
| | + | |
| |  | $c$ |
| | | $(-a - b + c)$ |
| $a \div b^3 =$ | | 0 |
| | C | 0 |
| | K  | 0 |
| | a | a |
| | | a |
| | ÷ | |
| | b | b |
| | | $(a/b)$ |
| | = | |
| | | $(a/b^2)$ |

TABLE VIII-continued

Problems with the ➕ ➖ 🟰 Keyboard Configuration

| Problem | Key | Display |
|---|---|---|
| | = | $(a/b^3)$ |
| $a^4 =$ | | 0 |
| | C | 0 |
| | K ↓ | |
| | a | a |
| | × | a |
| | = | $(a^2)$ |
| | = | $(a^3)$ |
| | = | $(a^4)$ |
| $a \div b =$ | | 0 |
| | C | 0 |
| $c \div b =$ | | |
| | K ↓ | |
| $d \div b =$ | a | a |
| | ÷ | a |
| | b | b |
| | = | $(a/b)$ |
| | c | c |
| | = | $(c/b)$ |
| | d | d |
| | = | $(d/b)$ |
| $a^4 \times b =$ | | 0 |
| | C | 0 |
| | K ↓ | |
| | a | a |
| | × | a |
| | b | b |
| | = | $(ab)$ |
| | = | $(a^2b)$ |
| | = | $(a^3b)$ |
| | = | $(a^4b)$ |
| $(-a) \times b =$ | | 0 |
| | C | 0 |
| | − | 0 |
| | a | a |
| | × | $-a$ |
| | b | b |
| | = | $-(ab)$ |
| $a \div (-b) =$ | | 0 |
| | C | |
| | a | a |
| | ÷ | a |
| | b | b |
| | +/− | $-b$ |
| | = | $-(a/b)$ |
| $a \times (-b) \div (-c) =$ | | 0 |
| | C | |
| | a | a |
| | × | a |
| | b | b |
| | +/− | $-b$ |
| | ÷ | $-(ab)$ |
| | c | c |
| | +/− | $-c$ |
| | = | $(ab/c)$ |

TABLE VIII-continued

Problems with the  Keyboard Configuration

| Problem | Key | Display |
|---|---|---|
| $\frac{(a + b - c) \times d}{e} - f =$ | C | 0 |
| | a | a |
| | + | |
| | b | b  (a + b) |
| | − | |
| | c | −c  (a + b − c) |
| | × | |
| | d | d  (a + b − c)d |
| | ÷ | |
| | e | e  (a + b − c)d/e |
| | − | |
| | f | −f  (a + b − c)d/e − f |
| | = | |
| a × b = | C | 0 |
| a × c = | K ↓ | 0 |
| a × d = | a | a |
| | × | |
| | b | b  (ab) |
| | = | |
| | c | c  (ac) |
| | = | |
| | d | d  (ad) |
| | = | |

FIG. 22A gives a key to the flowchart notation; the shape of the box is used to distinguish the various classes of instructions, and the inscriptions in the box are used to specify the particular instruction within the indicated class.

The circular symbol is used for labels, as for example, the GO and CONT labels on FIG. 22A. Rectangles symbolize assignments. For register operations arrow notation is used with subscripts indicative of the Digit Mask. For flag operations, with the extra-lined rectangle, the instruction is given, along with either menmonic or alpha numeric identification of the flag(s) to be so modified. The oval symbol is used for all test operations, including Test Flag, Compare Flag, and Compare Register instructions. The diamond symbol is used for Branch Conditional instructions, where the indicated conditions relate to the preceding test or register (carry/borrow) operation. The hexagonal symbol is used for WAIT operations. In addition to the WAIT condition, for example, D11 or KN, associated operations, for example Add One, are also indicated.

Referring to FIG. 22B through T, the program flowcharts can be corresponded to the linear program Table VI as follows:

In Table VI the first three-digit column counts the ROM locations (PC values) in hexadecimal code from $000_{16}$ ($0_{10}$) through $13F_{16}$ ($319_{10}$). The next eleven-bit column reflect the binary-code contents of the ROM which is programmed at each of the PC locations, that is the IR code which would be detected and executed if the PC value became equivalent to that indicated, row by row. The next column gives programming labels by which some routines are known. The next column gives the instruction mnemonic, as described in the functional description section above. The remainder of the table is devoted to comments relating to the operational meaning of the instructions, as appropriate. The ROM locations of individual instructions on the flowcharts FIG. 22 are indicated by the three-digit hexadecimal codes in proximity of the instruction symbol.

Referring to FIG. 22B, the basic control routine is shown which connects the four basic operation ($\pm, =, \times, \div$) routines and determines the current operation and previous operation status by means of the flag test and update decision tree shown. The linear program is given in Table VI beginning at location 040, lable MIN (corresponding to =) and continuing through location 057, with an "always branch" to LOCK.

Referring to FIG. 22C, the routines for Clear Entry (CE), Decimal Point (DPT), Clear (C), and Data Entry are shown. Clear is located at 000 through 003 and provides means to clear all flags and the A and C registers, returning to LOCK. Clear Entry is at location 058 and branches to the 02 routine at 021 to clear the A register and related flags. Data Entry is the control routine for input of number key and decimal point switch routines, beginning at location 01E.

Referring to FIG. 22D, all operating routines terminate in LOCK which provides means for suppression of double-key entry and multiple execution of single operation entries by testing for quiescence (open-circuit) of all momentary keyboard inputs. LOCK resides at locations 004 through 008, branching to IDLE on confirmation of quiescence. In two WAIT loops at locations 009 through 010, IDLE provides means for defeating leading-edge key bounce and transient noise.

Referring to FIG. 22E, OPN provides means for polling of keyboard operation inputs (KO keys) to determine which operation is being requested. This is accomplished with a list of Branch Conditional instructions, where the sequence of their execution corresponds to the order of key connections to the Digit scanning outputs, and by means of the WAIT D11 instruction to synchronize the polling to the scan cycle, and by association of KO→Cond with the WAIT instruction to permit conditional branching on the state of the keyboard inputs, OPN is located between 011 and 01D on the ROM and terminates with a jump to Data Entry for numeric inputs, if no previous jump is executed.

Referring to FIG. 22F, NBR provides means for polling and scan-encoding the numeric keyboard inputs, for example number keys and Point Position Switches. This is done by the single instruction WAIT(D11 + KN) at location 03A by means of association of (A-1 " A) to subtract "one" from the mantissa of A for each instruction cycle of the wait.

Referring to FIGS. 22G, H, I, J, K, L, and M, the Add/Substract (AS) and Prenormalize (PRE) are shown. These routines involve a variety of testing and formating procedures in addition to the actual perfomance of ADD or SUBSTRACT.

Referring to FIGS. 22N, O,P,Q,R,S, and T, the Multiply/Divide (MD) and Postnormalize (POST) routines are shown. These routines employ repetitive additions and substractions in combination with shift, test, and counting procedures in order to accomplish the desired function.

FIG. 23 illustrates the physical relationship between the above described signals and functions of the present embodiment and the packaging techniques of contemporary integrated circuit technology. For example, the input/output terminals of the present embodiment can be connected to a ceramic or plastic package lead frame using wire conductors and thermal compression bonding to provide means for allowing the system to become more accessible to conventional DIP/printed circuit board handling and usage.

In the described MOS embodiment of the calculator system of the invention, $V_{SS}-V_{DD}$ and $V_{DD}-V_{GG}$ are for example, nominally 7.2 volts under normal operating conditions (8.1 volts maximum; 6.6 volts minimum). The clock ($\phi$) frequency is nominally 250 KHz, minimum 200 KHz and maximum 330 KHz.

PROGRAMMING OF THE CALCULATOR SYSTEM FOR NON-CALCULATOR FUNCTIONS

The calculator system of the present invention is a variable function calculator system in that it may be programmed to perform functions other than the desk top calculator functions previously described. The variable functionability of the system is essentially provided by the programmability of various subsystems such as the programmable read-only-memory and the programmable logic arrays utilized in the system. As previously stated, these programmable subsystems are programmed during the fabrication of MOS or MIS embodiments by merely modifying the gate-insulator mask.

In further calculator embodiments, a large number of diverse functions utilizing additional keys on a keyboard and/or additional programs stored in the ROM could provide a system including, for example, right shift, exchange operand, square root, exponential operations, logarithmic operations, double and triple zero operation, and key sequence recognition.

Being that the calculator system of the invention includes program control, data control arithmetic and logic means and input/output subsystems in various embodiments the system may be programmed to perform non-calculator functions. For example, the calculator system may be programmed to perform meter functions such as for a digital volt meter, event counting, meter smoothing, taxi-fare meter, an odometer, scale meter to measure weight, etc. The system may also be programmed to perform cash register operations, act as a controller, arithmetic teaching unit, clock, display decoder, automobile rally computer, etc.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A calculator system implemented in large-scale-integrated semiconductor means comprising:
    (a) addressable storage means included in the semiconductor means for storing fixed program instructions to control the operation of the calculator system;
    (b) a plurality of separate control means included in the semiconductor means coupled to said addressable storage means and responsive to said program instructions for decoding the program instructions and generating control signals in accordance with said program instructions;
    (c) data register means included in the semiconductor means for storing and shifting in parallel a plurality of multi-bit words of coded information;
    (d) parallel arithmetic-logic means included in the semiconductor means coupled to said control means and to said data register means for performing parallel arithmetic and logic operations on said multi-bit words in accordance with said control signals to provide resulting answers;
    (e) input means coupled to said data register means for inputting said coded information into said data register means; and
    (f) output means for outputting said resulting answer.

2. The calculator system of claim 1 including means coupled to said parallel arithmetic means and to said data register means for storing said resulting answer in said data register means.

3. The calculator system of claim 1 wherein said addressable storage means comprises a read-only-memory array.

4. The calculator system of claim 1 wherein said control means are comprised of decoder-encoder arrays for decoding said program instructions into signals of one coded format and encoding said signals of one coded format into control signals of another coded format.

5. The calculator system of claim 1 wherein said data register means is comprised of:
    (a) a random access memory array having rows and columns of memory cells, each of said memory cells including:
        (i) input means for introducing coded information into the memory cell;
        (ii) output means for reading information out of the memory cell;
        (iii) write control means for addressing the memory cell in order to write information into the memory cell, and
        (iv) read control means for addressing the memory cell in order to read information out of the memory cell; and
    (b) commutator means selectively coupled to said write control means and to said read control means for selectively applying write and read signals to the write and read control means of the rows of memory cells to store and shift in parallel said plurality of multi-bit words.

6. The calculator system according to claim 5 wherein each of said plurality of multi-bit words is a binary coded decimal number.

7. The calculator system of claim 5 wherein:
(a) the read control means of all of the memory cells in the first row of the memory array are coupled to the write control means of all of the memory cells in the last row of the memory array and the read control means of all of the memory cells in each intermediate row of the memory array are coupled to the write control means of all of the memory cells in the last row of the memory array and the read control means of all of the memory cells in each intermediate row of the memory array are coupled to the write control means of all of the memory cells in an adjacent row of the memory array to provide a common read/write control means for each adjacent row of memory cells and a common read/write control means for the first and last rows of the memory array; and wherein
(b) said commutator means is selectively coupled to said common read/write means for applying write/read signals to such common read/write means whereby a plurality of multi-bit words is read out of one of said rows of memory cells while another plurality of multi-bit words is written into an adjacent row of memory cells.

8. A data processing system implemented in large-scale-integrated semiconductor means employing insulated gate field effect transistors, comprising:
(a) a word addressable read-only-memory array for storing program instruction words to control the operation of the system, the read-only-memory array being gate programmable in manufacture to provide a variety of different functions for the system;
(b) control means connected to the read-only-memory to receive the instruction words and generate command signals;
(c) addressing means including a register coupled to said read-only memory array for addressing the read-only-memory array to provide a sequence of program instruction words for operating said system, each address of the register representing a different instruction word;
(d) conditional circuit means coupled to said addressing means and responsive to signals representing the presence of selected conditional states in said data processing system and for altering the address in the register of said addressing means when one or more of said selected conditions is present thereby providing means for altering the addressing of instruction words;
(e) data storage means for storing and recalling in bit-parallel format a plurality of multi-bit words of information;
(f) bit-parallel arithmetic logic means coupled to said control means to receive command signals and coupled to said data storage means for receiving multi-bit words from the data storage means and performing arithmetic and logic operations on said multi-bit words in accordance with the command signals to provide resulting outputs;
(g) input/output means coupled to said data storage means and to the arithmetic-logic means and controlled by command signals from said control means for inputting selected words of said information into the arithmetic-logic means from said data storage means and coupling the resulting outputs from the arithmetic-logic means to the data storage means.

9. A data processing system according to claim 8 wherein the data storage means is an array of random access memory cells.

10. In a data processing system of the type implemented in large-scale-integrated semiconductor means employing insulated gate field effect transistors, data storage means in the form of an array of memory cells, means for generating address signals for sequentially addressing the array, transfer means connected to the data storage means to control transfer of data in and out of the data storage means, arithmetic means connected to the transfer means to receive data from the data storage means, a read-only-memory for storing a large number of instruction words, control means connected to the read-only-memory to receive instruction words therefrom and operative to generate command signals for controlling the operation of the system, and means connected to receive address signals from the means for generating address signals and to receive command signals from control means for generating a plurality of different timing mask signals such timing mask signals being connected to the transfer means for controlling the transfer of data from the storage means to the arithmetic means.

11. In apparatus according to claim 10, the means for generating timing mask signals including a gate programmable logic array connected to receive address signals and command signals as inputs.

12. In apparatus according to claim 11, the address signals being encoded and applied to inputs of said logic array.

13. A monolithic semiconductor unit for providing data processing functions comprising data storage means including an array of memory cells, arithmetic logic means connected to receive selected data from the data storage means and to perform arithmetic and logic functions then transfer data back to the data storage means, means in said unit for providing instruction codes, control means connected to receive the instruction codes and for generating a plurality of control signals for defining operation of the arithmetic logic means and other logic means in the unit, the control means including a plurality of logic array means which are mask-programmable in manufacture connected to receive parts of the instruction codes and functioning to generate specific control signals of said plurality of control signals, means in the unit connected to receive the specific control signals and operative in response thereto, the control means further including additional logic array means mask-programmable in manufacture connected to receive some of said plurality of control signals and functioning to generate further ones of said plurality of control signals and further means in the unit connected to receive the further ones of the control signals and operative in response thereto.

14. A calculator system implementing in a monolithic semiconductor unit comprising:
(a) addressable storage means for storing fixed program instructions to control the operation of the calculator system, said storage means being of the gate-programmable type;

(b) control means including a plurality of separate gate-programmable decoder means coupled to said addressable storage means and responsive to said program instructions for generating control signals in accordance with said program instructions;

(c) data memory means for storing a plurality of multi-digit data words of coded information in bit-parallel format;

(d) bit-parallel arithmetic-logic means connected to the control means to receive control signals and having an input for receiving data words for performing bit-parallel arithmetic and logic operations to said data words, one digit at a time in accordance with said control signals;

(e) selector means connected to the control means to receive the control signals and coupling said data memory means to the input of the arithmetic logic means and coupling the output of the arithmetic logic means to the data memory means, in accordance with said control signals; and (f) keyboard means and display means external to the monolithic semiconductor unit means for entering numerical information and operational commands and displaying numerical information from the data memory means.

15. A calculator system according to claim 14 wherein the selector means can couple the output of the arithmetic means to any one of a plurality of separate word locations in the data memory means.

16. A calculator system according to claim 15 wherein the data memory means is organized as a plurality of separate registers and said locations are separate registers.

17. An electronic digital processing system implemented in a large-scale-integrated semiconductor device comprising:

(a) addressable storage means included in the semiconductor device for storing fixed program instructions to control the operation of the system, the addressable storage means including a read-only-memory which is mask programmable in manufacture;

(b) a plurality of separate control means included in the semiconductor device coupled to receive said program instructions from said addressable storage means for decoding the program instructions and generating control signals in accordance with said program instructions, each of the separate control means including a logic array which is mask programmable in manufacture;

(c) data storage means having a plurality of storage locations included in the semiconductor device for storing and recalling in bit-parallel format a plurality of data words;

(d) transfer means included in the semiconductor device connected to the data storage means to control transfer of data in and out of selected storage locations, the transfer means being connected to one of said control means and responsive to the control signals;

(e) bit-parallel arithmetic-logic means included in the semiconductor device coupled to one of said control means and to said data storage means via said transfer means for performing parallel arithmetic and logic operations on selected ones of said data words in accordance with said control signals to provide output data words, means coupling the output data words from the arithmetic-logic means via said transfer means to storage locations in the data storage means;

(f) input/output means coupled to said data storage means via said transfer means for inputting said data words into and outputting said data words from said storage means.

18. A system according to claim 17 wherein addressing means are included in the semiconductor device connected to the addressable storage means, and conditional circuit means are included in the semiconductor device and connected to the addressing means and responsive to the presence of selected conditional states in the system for altering an address in the addressing means thereby providing means for altering the addressing of instruction words.

19. A system according to claim 18 wherein at least one of said conditional states is generated in response to an input to a terminal of the semiconductor device.

20. A system according to claim 19 wherein the addressing means includes means for incrementing the address therein and the conditional circuit means causes the addess to jump to an address derived from the programming instructions.

* * * * *